(12) United States Patent
Lee et al.

(10) Patent No.: US 11,392,346 B2
(45) Date of Patent: Jul. 19, 2022

(54) ELECTRONIC DEVICE FOR PROVIDING VOICE-BASED SERVICE USING EXTERNAL DEVICE, EXTERNAL DEVICE AND OPERATION METHOD THEREOF

(71) Applicant: Samsung Electronics Co., Ltd., Gyeonggi-do (KR)

(72) Inventors: Yo-Han Lee, Gyeonggi-do (KR); Jung-Kyun Ryu, Gyeonggi-do (KR); Jun Ho Park, Seoul (KR); Won-Sik Song, Seoul (KR); Jong Chan Won, Gyeonggi-do (KR); Seungyong Lee, Gyeonggi-do (KR); Young-Su Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 116 days.

(21) Appl. No.: 16/757,075

(22) PCT Filed: Oct. 17, 2018

(86) PCT No.: PCT/KR2018/012243
§ 371 (c)(1),
(2) Date: Apr. 17, 2020

(87) PCT Pub. No.: WO2019/078608
PCT Pub. Date: Apr. 25, 2019

(65) Prior Publication Data
US 2020/0257496 A1    Aug. 13, 2020

(30) Foreign Application Priority Data

Oct. 17, 2017 (KR) ........................ 10-2017-0134608

(51) Int. Cl.
*G06F 3/16* (2006.01)
*H02J 50/00* (2016.01)
(Continued)

(52) U.S. Cl.
CPC ............ *G06F 3/167* (2013.01); *G06F 1/3287* (2013.01); *G10L 15/30* (2013.01)

(58) Field of Classification Search
USPC ........................................ 704/1–10, 200–275
See application file for complete search history.

(56) References Cited

U.S. PATENT DOCUMENTS 8,559,659 B2 * 10/2013 Chu .................... H04M 1/6041
320/114
9,247,572 B2    1/2016 Bynum et al.
(Continued)

FOREIGN PATENT DOCUMENTS

KR    10-2012-0041628 A    5/2012
KR    10-2016-0111473 A    9/2016
(Continued)

OTHER PUBLICATIONS

Korean Search Report dated Nov. 21, 2021.
Notice of Patent Grant dated May 9, 2022.

*Primary Examiner* — Marcellus J Augustin
(74) *Attorney, Agent, or Firm* — Cha & Reiter, LLC

(57) ABSTRACT

Various embodiments of the present invention relate to: an electronic device for providing a voice-based service to a user by additionally using an input/output function of an external device connected through near-field communication; a server device; and an operation method thereof. The electronic device according to various embodiments of the present invention includes: a housing; a display exposed through a portion of the housing; a speaker; a microphone; a wireless charging circuit; a wireless communication circuit; a battery; a processor operatively connected to the display, the speaker, the microphone, the charging circuit, the communication circuit, and the battery; and a memory operatively connected to the processor, wherein the memory can store instructions which upon being executed cause the (Continued)

processor to: receive information about an external wireless charging device from the external wireless charging device through the charging circuit; control the charging circuit to charge the battery with power received from the external wireless charging device; transmit at least a portion of the received information to an external server through the communication circuit; receive a response from the external server through the communication circuit, the response being related to a voice-based service using the microphone, the speaker, and/or the display; and at least partially activate, deactivate, or change the voice-based service on the basis of at least a portion of the response while charging the battery.

14 Claims, 27 Drawing Sheets

(51) Int. Cl.
*H02J 50/20* (2016.01)
*G06F 1/3287* (2019.01)
*G10L 15/30* (2013.01)

(56) References Cited

U.S. PATENT DOCUMENTS

| | | | |
|---|---|---|---|
| 10,396,586 B1* | 8/2019 | Chen | H02J 7/00034 |
| 2012/0098485 A1 | 4/2012 | Kang et al. | |
| 2012/0214462 A1* | 8/2012 | Chu | H02J 50/90 |
| | | | 455/418 |
| 2015/0011160 A1* | 1/2015 | Jurgovan | G06F 1/1632 |
| | | | 455/41.1 |
| 2015/0207542 A1 | 7/2015 | Zeine | |
| 2016/0094083 A1 | 3/2016 | Park et al. | |
| 2016/0360332 A1 | 12/2016 | Shin et al. | |
| 2017/0110117 A1 | 4/2017 | Chakladar et al. | |
| 2017/0206896 A1 | 7/2017 | Ko et al. | |
| 2018/0215280 A1* | 8/2018 | Lee | B60R 25/23 |
| 2018/0322879 A1* | 11/2018 | Bhaya | G06F 40/279 |

FOREIGN PATENT DOCUMENTS

| | | |
|---|---|---|
| KR | 10-2016-0143148 A | 12/2016 |
| KR | 10-2017-0038358 A | 4/2017 |
| KR | 10-2017-0044426 A | 4/2017 |
| KR | 10-2017-0065228 A | 6/2017 |
| KR | 10-2017-0086814 A | 7/2017 |
| WO | 2015-156477 A1 | 10/2015 |

* cited by examiner

ELECTRONIC DEVICE FOR PROVIDING VOICE-BASED SERVICE USING EXTERNAL DEVICE, EXTERNAL DEVICE AND OPERATION METHOD THEREOF

CLAIM OF PRIORITY

This application is a National Phase Entry of PCT International Application No. PCT/KR2018/012243, which was filed on Oct. 17, 2018, and claims a priority to Korean Patent Application No. 10-2017-0134608, which was filed on Oct. 17, 2017, the contents of which are incorporated herein by reference.

TECHNICAL FIELD

Various embodiments of the disclosure relate to an electronic device for providing a voice-based service to a user by additionally using an input/output function of an external device connected through short-distance communication, a server device, and a method for operating the same.

BACKGROUND ART

There has been increasing attention to Internet of Things (IOT) technology for connecting multiple electronic devices (for example, home appliances, portable devices, and the like) having sensor and communication functions incorporated therein through a network.

Each of multiple electronic devices connected through a network includes an input/output module (for example, a microphone and a speaker) capable of processing at least a partial input/output function. In addition, each of the multiple electronic devices connected through a network may control the input/output module in order to provide a voice-based service to the user.

DISCLOSURE OF INVENTION

Technical Problem

Each of the multiple electronic devices connected through a network may basically control the input/output module related thereto in order to provide a voice-based service to the user. Each of the multiple electronic devices connected through a network may neither process the input/output data thereof by additionally using an input/output module of an external device nor control the input/output module related thereto in order to process input/output data of the external device.

For example, when a device for supplying power to an external device through wireless charging includes a microphone and a speaker, the microphone and the speaker are solely used to process input/output data regarding wireless charging. The microphone and the speaker cannot be used to process input/output data regarding the external device.

Therefore, there is a need to provide an electronic device capable of providing an extended input/output data processing function by additionally using the input/output module of the external device.

Solution to Problem

An electronic device according to various embodiments of the disclosure may include: a housing; a display exposed through a part of the housing; a speaker; a microphone; a wireless charging circuit; a wireless communication circuit; a battery; a processor operatively connected to the display, the speaker, the microphone, the charging circuit, the communication circuit, and the battery; and a memory operatively connected to the processor. The memory may be configured to store instructions which, when executed, cause the processor to: receive, from an external wireless charger, information regarding the external wireless charger through the charging circuit; control the charging circuit so as to charge the battery with power received from the external wireless charger; transmit at least a part of the received information to an external server through the communication circuit; receive a response from the external server through the communication circuit, the response being related to a voice-based service using the microphone, the speaker, and/or the display; and at least partially activate, deactivate, or change the voice-based service based on at least a part of the response while charging the battery.

An electronic device according to various embodiments of the disclosure may include: a housing; a microphone and an output module exposed through a part of the housing; a wireless communication circuit; a processor positioned inside the housing and operatively connected to the microphone, the output module, and the wireless communication circuit; and a memory positioned inside the housing and operatively connected to the processor. The memory may be configured to store instructions which, when executed, cause the processor to: establish short-distance communication with an external device by using the wireless communication circuit; transmit identification information of the external device to a server; activate a function regarding a voice recognition function; recognize a voice speech including a trigger voice and a voice command by using the microphone; request the server to provide feedback data regarding the voice command; receive the feedback data regarding the voice command and output information of the feedback data; and output the received feedback data by using the output module, based on the received output information.

An electronic device according to various embodiments of the disclosure may include: a housing; a speaker; a microphone; a wireless charging circuit; a wireless communication circuit; a processor operatively connected to the speaker, the microphone, the charging circuit, and the communication circuit; and a memory operatively connected to the processor. The memory may be configured to store instructions which, when executed, cause the processor to: receive, from an external mobile device including a display, information regarding the mobile device through the charging circuit; control the charging circuit so as to charge the mobile device wirelessly; transmit at least a part of the received information to an external server through the communication circuit; receive a response from the external server through the communication circuit, the response being related to a voice-based service using a microphone, a speaker, and/or the display of the mobile device; and at least partially activate, deactivate, or change the voice-based service based on at least a part of the response while charging the mobile device.

Advantageous Effects of Invention

According to various embodiments, input/output data may be processed by additionally using an input/output module of an external device, thereby providing an expanded voice-based service to a user. An electronic device may process input/output data by additionally using an input/output module of an external device, which is not currently used, thereby improving the input/output data processing performance, and expanding the input/output data processing function.

BEST MODE FOR CARRYING OUT THE INVENTION

Prior to describing an embodiment of the disclosure, an integrated intelligence system to which an embodiment of the disclosure may be applied will now be described.

Figure 1:
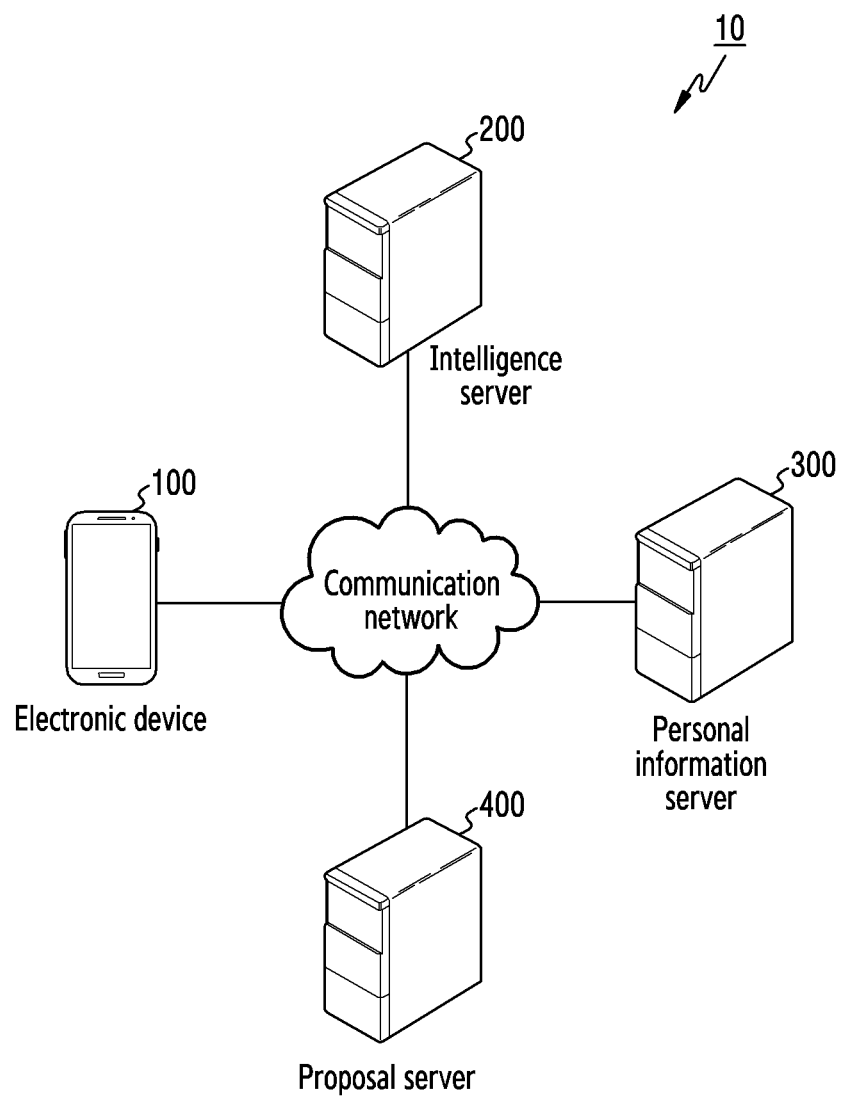
FIG. 1 is a diagram illustrating an integrated intelligence system according to various embodiments of the disclosure.

FIG. 1 is a diagram illustrating an integrated intelligence system according to various embodiments of the disclosure.

Referring to FIG. 1, the integrated intelligence system 10 may include a user terminal 100, an intelligence server 200, a personal information server 300, or a proposal server 400.

The user terminal 100 may provide a service necessary for a user through an app (or application program) (for example, alarm app, message app, picture (gallery) app, or the like) stored inside the user terminal 100. For example, the user terminal 100 may execute and operate another app through an intelligence app (or voice recognition app) stored inside the user terminal 100. A user input for executing and operating the other app through the intelligence app inside the user terminal 100 may be received. The user input may be received, for example, through a physical button, a touch pad, a voice input, a remote input, or the like. According to an embodiment, the user terminal 100 may correspond to various kinds of terminal devices (or electronic devices) that can be connected to the Internet, such as a mobile phone, a smartphone, a personal digital assistant (PDA), a laptop computer, or the like.

According to an embodiment, the user terminal 100 may receive the user's speech as a user input. The user terminal 100 may receive the user's speech and may produce a command that operates an app based on the user's speech. Accordingly, the user terminal 100 may operate the app by using the command.

The intelligence server 200 may receive a user voice input from the user terminal 100 through a communication network and may change the same to text data. In another embodiment, the intelligence server 200 may produce (or select) a path rule based on the text data. The path rule may include information regarding an action (or operation) for performing a function of the app, or information regarding a parameter necessary to execute the action. In addition, the path rule may include the order of the operations of the app. The user terminal 100 may receive the path rule, may select an app according to the path rule, and may execute an action included in the path rule in connection with the selected app.

The term "path rule" as used herein may generally refer to a sequence of states needed by an electronic device to perform a task requested by a user, but is not limited thereto. In other words, the path rule may include information regarding a sequence of states. The task may be an action that an intelligent app can provide, for example. The task may include producing a schedule, transmitting a picture to a desired counterpart, or providing weather information. The user terminal 100 may successively have at least one or more states (for example, operating state of the user terminal 100), thereby performing the task.

According to an embodiment, the path rule may be provided or produced by an artificial intelligent (AI) system. The AI system may be a rule-base system or a neural network-based system (for example, feedforward neural network (FNN) or recurrent neural network (RNN)). Alternatively, the AI system may be a combination of the above-mentioned systems, or an AI system different therefrom. According to an embodiment, the path rule may be selected from a set of path rules defined in advance, or may be produced in real time in response to a user request. For example, the AI system may select at least a path rule from multiple predefined path rules, or may produce a path rule dynamically (or in real time). In addition, the user terminal 100 may use a hybrid system to provide the path rule.

According to an embodiment, the user terminal 100 may execute the action and may display a screen corresponding to the state of the user terminal 100 that executed the action on the display. As another example, the user terminal 100 may execute the action and may not display the result of performing the action on the display. The user terminal 100 may execute multiple operations, for example, and may display the result of only some of the multiple actions on the display. The user terminal 100 may display only the result of executing the last action in the order, for example, on the display. As another example, the user terminal 100 may display the result of receiving the user's input and executing the action on the display.

The personal information server 300 may include a database in which user information is stored. For example, the personal information server 300 may receive user information (for example, context information, app execution, and the like) from the user terminal 100 and may store the same in the database. The intelligence server 200 may receive the user information from the personal information server 300 through a communication network and may use the same when producing a path rule regarding a user input. According to an embodiment, the user terminal 100 may receive user information from the personal information server 300 through a communication network and may use the same as information for managing the database.

The proposal server 400 may include a database storing information regarding introduction of a function or an application inside the terminal, or a function to be provided. For example, the proposal server 400 may include a database regarding a function that the user can use after receiving user information of the user terminal 100 from the personal information server 300. The user terminal 100 may receive information regarding the function to be provided, from the proposal server 400 through a communication network, and may provide the information to the user.

Figure 2:
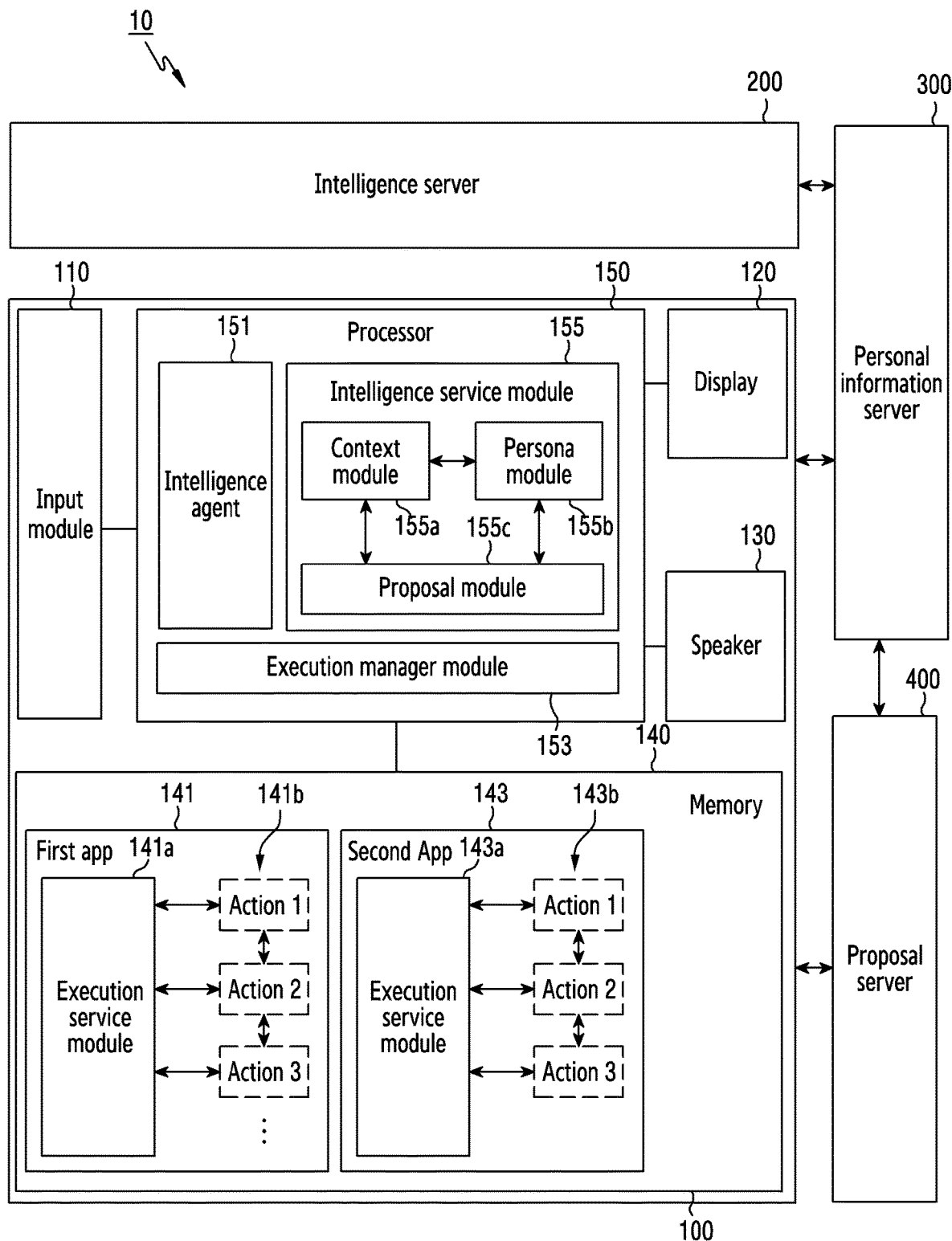
FIG. 2 is a block diagram illustrating a user terminal of an integrated intelligence system according to an embodiment of the disclosure.

FIG. 2 is a block diagram illustrating a user terminal of an integrated intelligence system according to an embodiment of the disclosure.

Referring to FIG. 2, the user terminal 100 may include an input module 110, a display 120, a speaker 130, a memory 140, or a processor 150. The user terminal 100 may further include a housing, and the elements of the user terminal 100 may be seated inside the housing or positioned on the housing. The user terminal 100 may further include a communication circuit positioned inside the housing. The user terminal 100 may transmit/receive data (or information) with an external server (for example, intelligence server 200) through the communication circuit.

According to an embodiment, the input module 110 may receive a user input from a user. For example, the input module 110 may receive a user input from a connected external device (for example, keyboard or headset). As another example, the input module 110 may include a touch screen (for example, touch screen display) coupled to the display 120. As another example, the input module 110 may include a hardware key (or physical key) positioned on the user terminal 100 (or on the housing of the user terminal 100).

According to an embodiment, the input module 110 may include a microphone capable of receiving the user's speech as a voice signal. For example, the input module 110 may include a speech input system, and may receive the user's speech as a voice signal through the speech input system. The microphone may be exposed through a part (for example, first portion) of the housing, for example.

According to an embodiment, the display 120 may display an execution screen for an image, a video, and/or an application. For example, the display 120 may display a graphic user interface (GUI) of an app. According to an embodiment, the display 120 may be exposed through a part (for example, second portion) of the housing.

According to an embodiment, the speaker 130 may output a voice signal. For example, the speaker 130 may output a voice signal produced inside the user terminal 100 to the outside. According to an embodiment, the speaker 130 may be exposed through a part (for example, third portion) of the housing.

According to an embodiment, the memory 140 may store multiple apps (or application programs) 141 and 143. The multiple apps 141 and 143 may be programs for performing a function corresponding to a user input, for example. According to an embodiment, the memory 140 may store an intelligence agent 145, an execution manager module 147, or an intelligence service module 149. The intelligence agent 145, the execution manager module 147, and the intelligence service module 149 may be, for example, frameworks (or application frameworks) for processing a received user input (for example, user speech).

According to an embodiment, the memory 140 may include a database capable of storing information necessary to recognize a user input. For example, the memory 140 may include a log database capable of storing log information. As another example, the memory 140 may include a persona database capable of storing user information.

According to an embodiment, the memory 140 may store multiple apps 141 and 143, and the multiple apps 141 and 143 may be loaded and operated. For example, the multiple apps 141 and 143 stored in the memory 140 may be loaded by the execution manager module 147 and then operated. The multiple apps 141 and 143 may include execution service modules 141*a* and 143*a* for performing functions. In an embodiment, the multiple apps 141 and 143 may execute multiple actions (for example, sequence of states) 141*b* and 143*b* through the execution service modules 141*a* and 143*a* in order to perform a function. In other words, the execution service modules 141*a* and 143*a* may be activated by the execution manager module 147, and may execute multiple actions 141*b* and 143*b*.

According to an embodiment, when the actions 141*b* and 143*b* of the apps 141 and 143 are executed, an execution state screen resulting from execution of the actions 141*b* and 143*b* may be displayed on the display 120. The execution state screen may be, for example, a screen corresponding to a state in which the actions 141*b* and 143*b* are completed. The execution state screen may be, as another example, a screen when corresponding to partial landing of the actions 141*b* and 143*b* (for example, when parameters necessary for the actions 141*b* and 143*b* are not input).

According to an embodiment, the execution service modules 141*a* and 143*a* may execute the actions 141*b* and 143*b* according to a path rule. For example, the execution service modules 141*a* and 143*a* may be activated by the execution manager module 147, may receive an execution request from the execution manager module 147 according to the path rule, and may perform the actions 141*b* and 143*b* according to the execution request, thereby executing functions of the apps 141 and 143. When the actions 141*b* and 143*b* are completely performed, the execution service modules 141*a* and 143*a* may deliver completion information to the execution manager module 147.

According to an embodiment, when multiple actions 141*b* and 143*b* are executed in the apps 141 and 143, the multiple actions 141*b* and 143*b* may be executed successively. When one action (for example, action 1 of the first app 141 or action 1 of the second app 143) is completely executed, the execution service modules 141*a* and 143*a* may open the next action (for example, action 2 of the first app 141 or action 2 of the second app 143), and may transmit completion information to the execution manager module 147. Opening a specific action, as used herein, may be understood as transitioning the specific action to an executable state, or preparing for execution of the specific action. In other words, unless a specific action is opened, the corresponding action cannot be executed. When the completion information is received, the execution manager module 147 may deliver an execution request regarding the next action (for example, action 2 of the first app 141 or action 2 of the second app 143) to the execution service module. According to an embodiment, when multiple apps 141 and 143 are executes, the multiple apps 141 and 143 may be executed successively. For example, when the last action of the first app 141 (for example, action 3 of the first app 141) is completely executed, and when completion information is accordingly received, the execution manager module 147 may transmit a request for executing the first action of the second app 143 (for example, action 1 of the second app 143) to the execution service 143*a*.

According to an embodiment, when multiple actions 141*b* and 143*b* are executed in the apps 141 and 143, the result screens following execution of the multiple actions 141*b* and 143*b*, respectively, may be displayed on the display 120. According to an embodiment, only some of the result screens following execution of the multiple actions 141*b* and 143*b*, respectively, may be displayed on the display 120.

According to an embodiment, the memory 140 may store an intelligence app (for example, speech recognition app) interworking with the intelligence agent 145. The app interworking with the intelligence agent 145 may receive and process the user's speech as a voice signal. According to an embodiment, the app interworking with the intelligence agent 145 may be operated by means of a specific input made through the input module 110 (for example, an input through the hardware key, an input through the touch screen, or a specific voice input).

According to an embodiment, the intelligence agent 145, the execution manager module 147, or the intelligence service module 149 stored in the memory 140 may be executed by the processor 150. The function of the intelligence agent 145, the execution manager module 147, or the intelligence service module 149 may be implemented by the processor 150. Actions of the processor 150 will be described with regard to functions of the intelligence agent 145, the execution manager module 147, and the intelligence service module 149. According to an embodiment, the intelligence agent 145, the execution manager module 147, or the intelligence service module 149 stored in the memory 140 may be implemented not only as software, but also as hardware.

According to an embodiment, the processor 150 may control overall actions of the user terminal 100. For example, the processor 150 may control the input module 110 so as to receive a user input. The processor 150 may control the display 120 so as to display an image. The processor 150 may control the speaker 130 so as to output a voice signal. The processor 150 may control the memory 140 so as to execute a program and to retrieve or store necessary information.

According to an embodiment, the processor 150 may execute the intelligence agent 145, the execution manager module 147, or the intelligence service module 149 stored in the memory 140. Accordingly, the processor 150 may implement the function of the intelligence agent 145, the execution manager module 147, or the intelligence service module 149.

According to an embodiment, the processor 150 may execute the intelligence agent 145 so as to produce a command for operating an app based on a voice signal received as a user input. According to an embodiment, the processor 150 may execute the execution manager module 147 so as to execute the apps 141 and 143 stored in the memory 140 according to the produced command. According to an embodiment, the processor 150 may execute the intelligence service module 149 so as to manage the user's information and to process the user input by using the user's information.

The processor 150 may execute the intelligence agent 145 so as to transmit the user input received through the input module 110 to the intelligence server 200 and to process the user input through the intelligence server 200.

According to an embodiment, the processor 150 may execute the intelligence server 145 so as to preprocess the user input before transmitting the user input to the intelligence server 200. According to an embodiment, the intelligence agent 145 may include, in order to preprocess the user input, an adaptive echo canceller (AEC) module, a noise suppression (NS) module, an end-point detection (EPD) module, or an automatic gain control (AGC) module. The AEC module may remove an echo included in the user input. The NS module may suppress background noise included in the user input. The EPD module may detect the end point of a user voice included in the user input, and may find a part on which the user's voice exists by using the detected end point. The AGC module may recognize the user input and may adjust the volume of the user input to be appropriate for processing the recognized user input. According to an embodiment, the processor 150 may execute all of the above preprocessing elements for performance, but the processor 150 may execute some of the preprocessing elements, in another embodiment, in order to operate with low power.

According to an embodiment, the intelligence agent 145 may execute a wake-up recognition module stored in the memory 140 in order to recognize the user's call. Accordingly, the processor 150 may recognize the user's wake-up command through the wake-up recognition module and, upon receiving the wake-up command, may execute the intelligence agent 145 for receiving a user input. The wake-up recognition module may be implemented as a low-power processor (for example, a processor included in an audio codec). According to an embodiment, the processor 150 may execute the intelligence agent 145 when a user input is received through the hardware key. When the intelligence agent 145 is executed, an intelligence app (for example, voice recognition app) interworking with the intelligence agent 145 may be executed.

According to an embodiment, the intelligence agent 145 may include a voice recognition module for executing a user input. The processor 150 may recognize a user input for executing an action in an app through the voice recognition module. For example, the processor 150 may recognize a limited user (voice) input (for example, speech such as "Click" for executing an imaging action while a camera app is executed) for executing an action such as the wake-up command in the apps 141 and 143 through the voice recognition module. The processor 150 may assist the intelligence server 200 such that a user command that can be processed inside the user terminal 100 can be recognized and quickly processed through the voice recognition module. According to an embodiment, the voice recognition module of the intelligence agent 145 for executing a user input may be implemented in an app processor.

According to an embodiment, the voice recognition module of the intelligence agent 145 (including the voice recognition module of the wake-up module) may recognize a user input by using an algorithm for recognizing a voice. The algorithm used to recognize a voice may be at least one of a hidden Markov model (HMM) algorithm, an artificial neural network (ANN) algorithm, or a dynamic time warping (DTW) algorithm, for example.

According to an embodiment, the processor 150 may execute the intelligence agent 145 so as to convert the user's voice input into text data. For example, the processor 150 may transmit the user's voice to the intelligence server 200 through the intelligence agent 145, and may receive text data corresponding to the user's voice from the intelligence server 200. Accordingly, the processor 150 may display the converted text data on the display 120.

According to an embodiment, the processor 150 may execute the intelligence agent 145 so as to receive a path rule from the intelligence server 200. According to an embodiment, the processor 150 may deliver the path rule to the execution manager module 147 through the intelligence agent 145.

According to an embodiment, the processor 150 may execute the intelligence agent 145 so as to deliver a log corresponding to the result of execution according to the path rule received from the intelligence server 200, to the intelligence service module 149, and the delivered execution result log may be accumulated in the user's preference information in the persona manager 149*b* and managed accordingly.

According to an embodiment, the processor 150 may execute the execution manager module 147 so as to receive the path rule from the intelligence agent 145, to execute the apps 141 and 143, and to cause the apps 141 and 143 to execute the actions 141*b* and 143*b* included in the path rule. For example, the processor 150 may transmit command information (for example, path rule information) for executing the actions 141*b* and 143*b* to the apps 141 and 143 through the execution manager module 147, and may receive information regarding completion of the actions 141*b* and 143*b* from the apps 141 and 143.

According to an embodiment, the processor 150 may execute the execution manager module 147 so as to deliver command information (for example, path rule information) for executing the actions 141*b* and 143*b* of the apps 141 and 143 between the intelligence agent 145 and the apps 141 and 143. The processor 150 may bind the apps 141 and 143 to be executed according to the path rule through the execution manager module 147, and may deliver command information (for example, path rule information) of the actions 141*b* and 143*b* included in the path rule to the apps 141 and 143. For example, the processor 150 may successively deliver the actions 141*b* and 143*b* included in the path rule to the apps 141 and 143 through the execution manager module 147 such that the actions 141*b* and 143*b* of the apps 141 and 143 are successively executed according to the path rule.

According to an embodiment, the processor 150 may execute the execution manager module 147 so as to manage the execution state of the actions 141*b* and 143*b* of the apps 141 and 143. For example, the processor 150 may receive information regarding the execution state of the actions 141*b* and 143*b* from the apps 141 and 143 through the execution manager module 147. When the execution state of the actions 141*b* and 143*b* is, for example, partial landing (for example, when parameters necessary for the actions 141*b* and 143*b* are not input), the processor 150 may deliver information regarding the partial landing to the intelligence agent 145 through the execution manager module 147. By using the information delivered through the intelligence agent 145, the processor 150 may request the user to input necessary information (for example, parameter information). When the execution state of the actions 141*b* and 143*b* is, as another example, an operating state, the processor 150 may receive a speech from the user through the intelligence agent 145. The processor 150 may deliver information regarding the apps 141 and 143 currently executed and the execution state of the apps 141 and 143 to the intelligence agent 145 through the execution manager module 147. The processor 150 may transmit the user speech to the intelligence server 200 through the intelligence agent 145. The processor 150 may receive parameter information of the user's speech from the intelligence server 200 through the intelligence agent 145. The processor 150 may deliver the received parameter information to the execution manager module 147 through the intelligence agent 145. The execution manager module 147 may change parameters of the actions 141*b* and 143*c* to new parameters by using the received parameter information.

According to an embodiment, the processor 150 may execute the execution manager module 147 so as to deliver parameter information included in the path rule to the apps 141 and 143. When multiple apps 141 and 143 are executed successively according to the path rule, the execution manager module 147 may deliver parameter information included in the path rule from one app to another app.

According to an embodiment, the processor 150 may execute the execution manager module 147 so as to receive multiple path rules. The processor 150 may select multiple path rules based on the user's speech through the execution manager module 147. For example, when a specific app 141 to execute a specific action 141*a* was specified by the user's speech through the execution manager module 147, and when no different app 143 to execute the remaining action 143*b* was specified, the processor 150 may receive multiple different path rules such that the same app 141 (for example, gallery app) to execute the specific action 141*a* is executed, and different apps 143 (for example, message app and telegram app) capable of executing the remaining action 143b are executed, respectively. The processor 150 may execute identical actions 141b and 143b (for example, continuous identical actions 141b and 143b) of the multiple path rules through the execution manager module 147, for example. After executing up to the identical actions, the processor 150 may display, on the display 120, a state screen that enables selection of different apps 141 and 143 included in the multiple path rules through the execution manager module 147.

According to an embodiment, the intelligence service module 149 may include a context module 149a, a persona module 149b, or a proposal module 149c.

The processor 150 may execute the context module 149a so as to collect the current state of the apps 141 and 143 from the apps 141 and 143. For example, the processor 150 may execute the context module 149a so as to receive context information indicating the current state of the apps 141 and 143, and may collect the current state of the apps 141 and 143 through the received context information.

The processor 150 may execute the persona module 149b so as to manage the personal information of the user using the user terminal 100. For example, the processor 150 may execute the persona module 149b so as to collect use information of the user terminal 100 and execution results, and may manage the user's personal information by using the collected use information of the user terminal 100 and execution results.

The processor 150 may execute the proposal module 149c so as to predict the user's intent and to recommend a command to the user based on the user's intent. For example, the processor 150 may execute the proposal module 149c so as to recommend a command to the user according to the user's current state (for example, time, place, situation, app).

Figure 3:
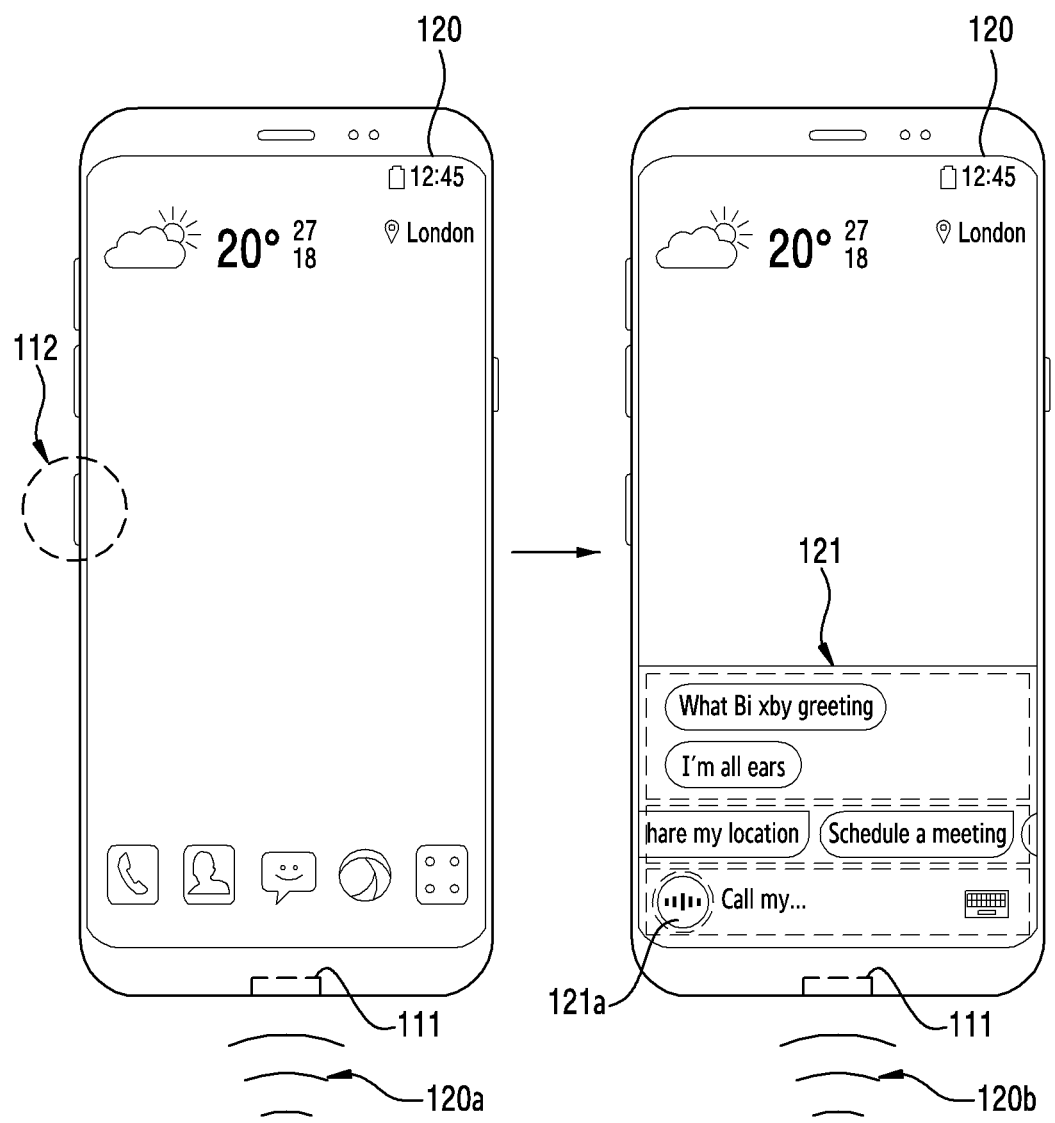
FIG. 3 is a diagram illustrating execution of an intelligence app of a user terminal according to an embodiment of the disclosure.

FIG. 3 is a diagram illustrating execution of an intelligence app by a user terminal according to an embodiment of the disclosure.

Referring to FIG. 3, a user terminal 100 is illustrated as receiving a user input and executing an intelligence app (for example, voice recognition app) interworking with an intelligence agent 145.

According to an embodiment, the user terminal 100 may execute an intelligence app for recognizing a voice through a hardware key 112. For example, upon receiving a user input through the hardware key 112, the user terminal 100 may display a user interface (UI) 121 of the intelligence app on a display 120. The user may touch a voice recognition button 121a on the UI 121 of the intelligence app, in order to input (111b) a voice while the UI 121 of the intelligence app is displayed on the display 120. The user may input (120b) a voice by continuously pressing the hardware key 112, in order to input (120b) a voice, as another example.

According to an embodiment, the user terminal 100 may execute an intelligence app for recognizing a voice through a microphone 111. For example, the user terminal 100 may display a UI 121 of the intelligence app on the display 120 when a designated voice (for example, Wake up!) is input (111a) through the microphone 111.

Figure 4:
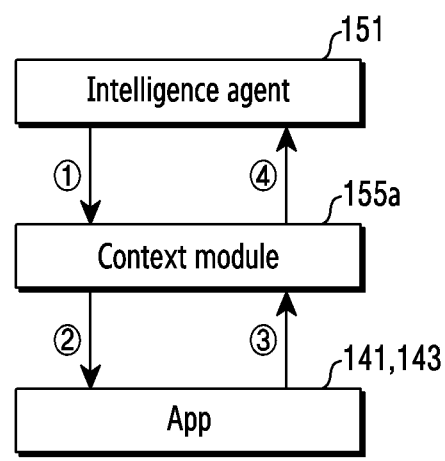
FIG. 4 is a diagram illustrating a context module of an intelligence service module according to an embodiment of the disclosure collecting the current state.

FIG. 4 is a diagram illustrating a context module of an intelligence service module according to an embodiment of the disclosure collecting the current state.

Referring to FIG. 4, upon receiving (①) a context request from an intelligence agent 145, the processor 150 may request (②) context information indicating the current state of apps 141 and 143 through a context module 149a. According to an embodiment, the processor 150 may receive (③) the context information from the apps 141 and 143 through the context module 149a and may transmit (④) the same to the intelligence agent 145.

According to an embodiment, the processor 150 may receive multiple pieces of context information from the apps 141 and 143 through the context module 149a. The context information may be, for example, information regarding the most recently executed apps 141 and 143. The context information may be, as another example, information regarding the current state inside the apps 141 and 143 (for example, when viewing a picture at a gallery, information regarding the corresponding picture).

According to an embodiment, the processor 150 may receive context information indicating the current state of the user terminal 100 not only from the apps 141 and 143, but also from a device platform, through the context module 149a. The context information may include general context information, user context information, or device context information.

The general context information may include general information of the user terminal 100. The general context information may be identified through an internal algorithm after receiving data through a sensor hub or the like of the device platform. For example, the general context information may include information regarding the current spacetime. The information regarding the current spacetime may include information regarding the current time or the current position of the user terminal 100, for example. The current time may be identified through the time on the user terminal 100, and the information regarding the current position may be identified through a global positioning system (GPS). As another example, the general context information may include information regarding a physical movement. The information regarding a physical movement may include information regarding walking, running, driving state, or the like, for example. The physical movement information may be identified through a motion sensor. In connection with the information regarding the driving state, not only can traveling be identified through the motion sensor, but boarding and parking can also be identified by sensing Bluetooth connection inside the vehicle. As another example, the general context information may include user activity information. The user activity information may include, for example, information regarding going to/out of office, shopping, traveling, or the like. The user activity information may be identified by using information regarding a place registered in a database by the user or app.

The user context information may include information regarding the user. For example, the user context information may include information regarding the user's emotional state. The information regarding the emotional state may include, for example, information regarding the user's happiness, sadness, anger, or the like. As another example, the user context information may include information regarding the user's current state. The information regarding the current state may include, for example, information regarding an interest, intent (for example, shopping), or the like.

The device context information may include information regarding the state of the user terminal 100. For example, the device context information may include information regarding a path rule executed by the execution manager module 147. As another example, the device information may include information regarding the battery. The information regarding the battery may be identified through the charging and discharging states of the battery, for example. As another example, the device information may include information regarding a connected device and a network. The information regarding connected device may be identified through a communication interface to which the device is connected, for example.

Figure 5:
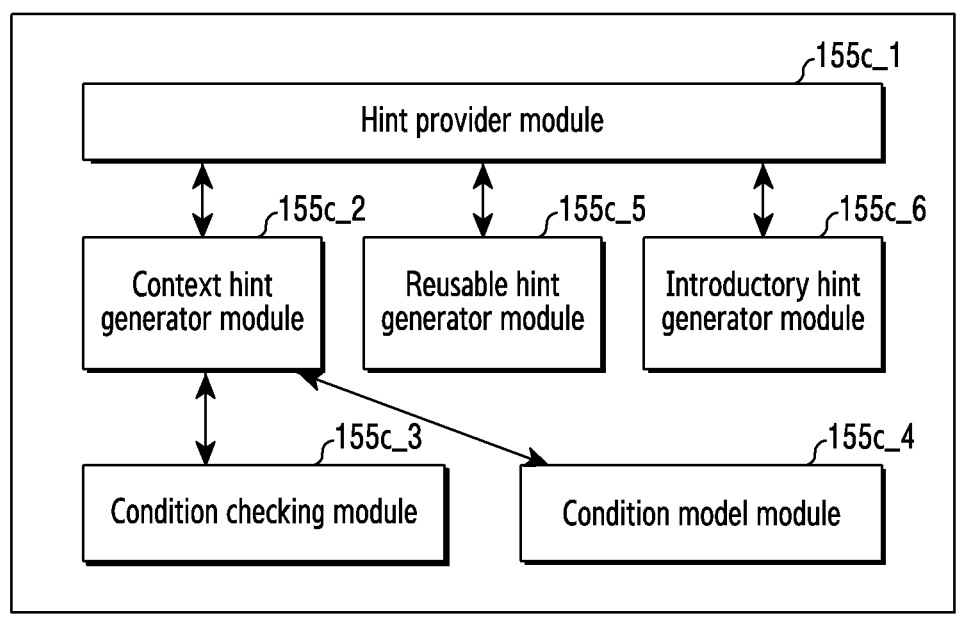
FIG. 5 is a block diagram illustrating a proposal module of an intelligence service module according to an embodiment of the disclosure.

FIG. 5 is a block diagram illustrating a proposal module of an intelligence service module according to an embodiment of the disclosure.

Referring to FIG. 5, the proposal module 149c may include a hint provider module 149c_1, a context hint generator module 149c_2, a condition checking module 149c_3, a condition model module 149c_4, a reusable hint generator module 149c_5, or an introductory hint generator module 149c_6.

According to an embodiment, the processor 150 may execute the hint provider module 149c_1 so as to provide a hint to the user. For example, the processor 150 may receive a hint produced by the context hint generator module 149c_2, the reusable hint generator module 149c_5, or the introductory hint generator module 149c_6 through the hint provider module 149c_1, and may provide the hint to the user.

According to an embodiment, the processor 150 may execute the condition checking module 149c_3 or the condition model module 149c_4 so as to produce a hint that can be recommended according to the current state. The processor 150 may execute the condition checking module 149c_3 so as to receive information corresponding to the current state, and may execute the condition model module 149C-4 so as to configure a condition model by using the received information. For example, the processor 150 may execute the condition model module 149c_4 so as to identify the point of time at which a hint is provided to the user, the position, the situation, the currently used app, and the like, thereby providing hints that are highly likely to be used under the corresponding condition to the user, a hint having the highest priority being provided first.

According to an embodiment, the processor 150 may execute the reusable hint generator module 149c_5 so as to produce hints that can be recommended according to the frequency of use. For example, the processor 150 may execute the reusable hint generator module 149c_5 so as to produce hints based on the user's use pattern.

According to an embodiment, the introductory hint generator module 149c_6 may produce hints for introducing, to the user, new functions or functions frequently used by other users. For example, the hints for introducing new functions may include introductions regarding the intelligence agent 145 (for example, operating method).

According to another embodiment, the context hint generator module 149c_2, the condition checking module 149c_3, the condition model module 149c_4, the reusable hint generator module 149c_5, or the introductory hint module 149c_6 of the proposal module 149c may be included in the personal information server 300. For example, the processor 150 may receive a hint from the context hint generator module 149c_2, the reusable hint generator module 149c_5, or the introductory hint generator module 149c_6 of the user personal information server 300 through the hint provider module 149c_1 of the proposal module 149c, and may provide the received hint to the user.

According to an embodiment, the user terminal 100 may provide a hint according to the following series of processes. For example, upon receiving a hint provision request from the intelligence agent 145, the processor 150 may deliver a hint production request to the context hint generator module 149c_2 through the hint provider module 149c_1. Upon receiving the hint production request, the processor 150 may receive information corresponding to the current state from the context module 149a and the persona module 149b through the condition checking module 149c_3. The processor 150 may deliver the information received through the condition checking module 149c_3 to the condition model module 149c_4, and may assign priorities to hints, among hints provided to the user by using the information through the condition model module 149c_4, in an order such that a hint mostly likely to be used under the condition comes first. The processor 150 may identify (⑥) the condition through the context hint generator module 149c_2, and may produce a hint corresponding to the current state. The processor 150 may deliver the produced hint to the hint provider module 149c_1 through the context hint generator module 149c_2. The processor 150 may align the hint according to a designated rule through the hint provider module 149c_1, and may deliver the hint to the intelligence agent 145.

According to an embodiment, the processor 150 may produce multiple context hints through the hint provider module 149c_1, and may assign priorities to the multiple context hints according to a designated rule. According to an embodiment, the processor 150 may first provide one of the multiple context hints, which has the highest priority, to the user through the hint provider module 149c_1.

According to an embodiment, the user terminal 100 may propose a hint according to the frequency of use. For example, upon receiving a hint provision request from the intelligence agent 145, the processor 150 may deliver a hint production request to the reusable hint generator module 149c_5 through the hint provider module 149c_1. Upon receiving the hint production request, the processor 150 may receive user information from the persona module 149b through the reusable hint generator module 149c_5. For example, the processor 150 may receive a path rule included in preference information of the user of the persona module 149b, a parameter included in the path rule, the frequency of execution of an app, and information regarding the space-time at which the app is used, through the reusable hint generator module 149c_5. The processor 150 may produce a hint corresponding to the user information received through the reusable hint generator module 149c_5. The processor 150 may deliver the produced hint to the hint provider module 149c_1 through the reusable hint generator module 149c_5. The processor 150 may align the hint through the hint provider module 149c_1 and may deliver the hint to the intelligence agent 145.

According to an embodiment, the user terminal 100 may propose a hint regarding a new function. For example, upon receiving a hint provision request from the intelligence agent 145, the processor 150 may deliver a hint production request to the introductory hint generator module 149c_6 through the hint provider module 149c_1. The processor 150 may deliver an introductory hint provision request from the proposal server 400 through the introductory hint generator module 149c_6 and may receive information regarding a function to be introduced from the proposal server 400. The proposal server 400 may store information regarding functions to be introduced, for example, and a hint list regarding the functions to be introduced may be updated by the service operator. The processor 150 may deliver the produced hint to the hint provider module 149c_1 through the introductory hint generator module 149c_6. The processor 150 may align the hint through the hint provider module 149c_1 and may transmit (⑥) the hint to the intelligence agent 145.

Accordingly, the processor 150 may provide a hint produced by the context hint generator module 149c_2, the reusable hint generator module 149c_5, or the introductory hint generator module 146c_6 to the user through the proposal module 149c. For example, the processor 150 may display the produced hint in an app that operates the intelligence agent 145 through the proposal module 149c, and may receive an input of selecting the hint from the user through the app.

Figure 6:
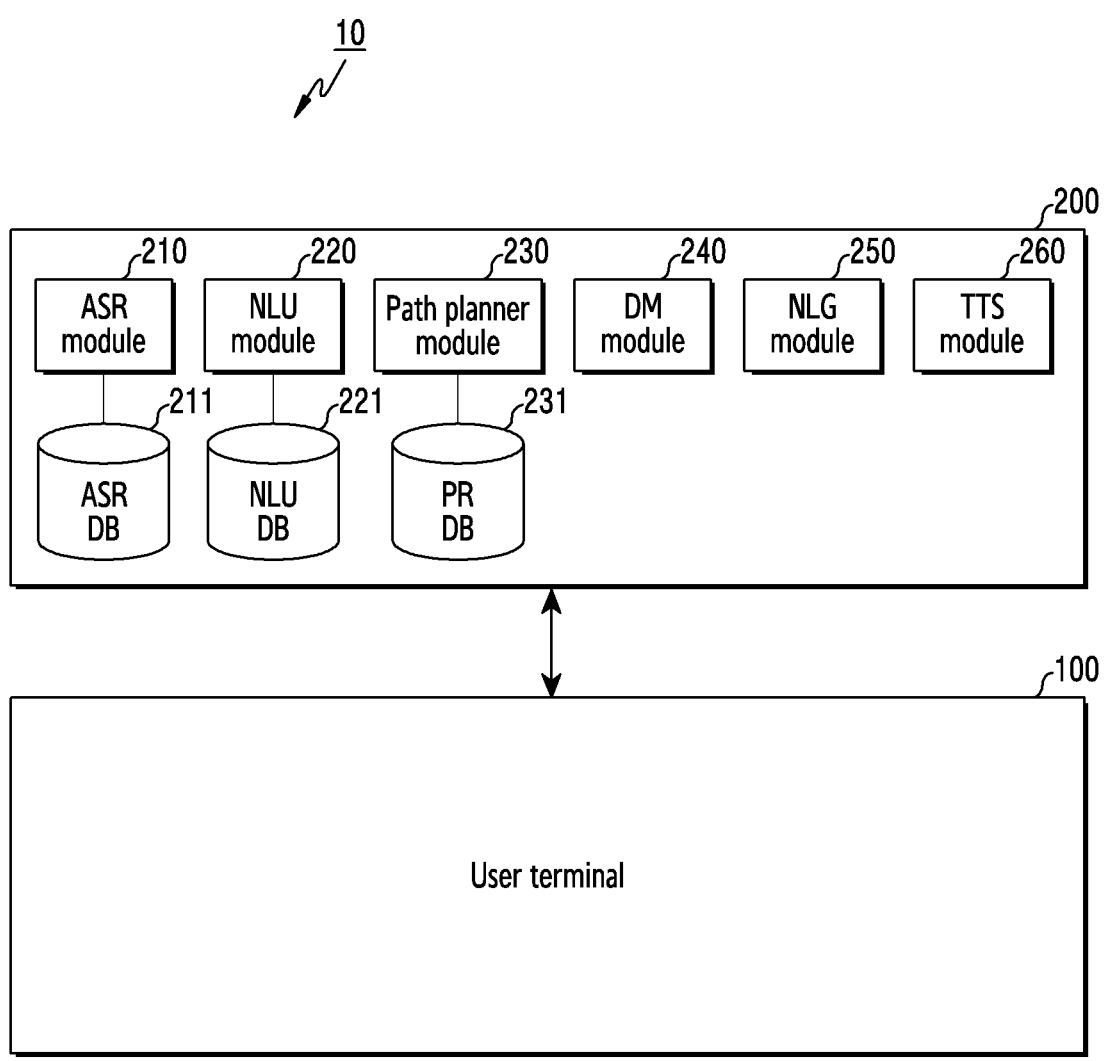
FIG. 6 is a block diagram illustrating an intelligence server of an integrated intelligence system according to an embodiment of the disclosure.

FIG. 6 is a block diagram illustrating an intelligence server of an integrated intelligence system according to an embodiment of the disclosure.

Referring to FIG. 6, the intelligence server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260. According to an embodiment, the intelligence server 200 may include a communication circuit, a memory, and a processor. The processor may execute an instruction stored in the memory so as to drive the ASR module 210, the NLU module 220, the path planner module 230, the DM module 240, the NLG module 250, and the TTS module 260. The intelligence server 200 may transmit/receive data (or information) with an external electronic device (for example, user terminal 100) through the communication circuit.

The NLU module 220 or the path planner module 230 of the intelligence server 200 may produce a path rule.

According to an embodiment, the automatic speech recognition (ASR) module 210 may convert a user input received from the user terminal 100 into text data.

According to an embodiment, the ASR module 210 may convert a user input received from the user terminal 100 into text data. For example, the ASR module 210 may include a speech recognition module. The speech recognition module may include an acoustic model and a language model. For example, the acoustic model may include information regarding vocalization, and the language model may include unit phoneme information and information regarding a combination of unit phoneme information. The speech recognition module may convert user speech into text data by using the information regarding vocalization and the information regarding unit phoneme information. Information regarding the acoustic model and the language model may be stored in an automatic speech recognition database (ASR DB) 211, for example.

According to an embodiment, the NLU module 220 may perform syntactic analysis or semantic analysis so as to identify the user intent. In connection with the syntactic analysis, a user input may be divided into syntactic units (for example, words, phrases, morphemes, and the like), and it may be identified what syntactic elements the divided units have. The sematic analysis may be performed by using semantic matching, rule matching, formula matching, or the like. Accordingly, the NLU module 220 may identify the domain to which the user input belongs or the intent, or may obtain a parameter (or slot) necessary to express the intent.

According to an embodiment, the NLU module 220 may use a matching rule divided into a domain, an intent, and a parameter (or slot) necessary to identify the intent, thereby determining the user's intent and the parameter. For example, the single domain (for example, alarm) may include multiple intents (for example, configuring alarm, releasing alarm, and the like), and a single intent may include multiple parameters (for example, time, number of repetitions, alarm sound, and the like). Multiple rules may include, for example, one or more necessary element parameters. The matching rule may be stored in a natural language understanding database (NLU DB) 221.

According to an embodiment, the NLU module 220 may identify the meaning of a word extracted from a user input by using linguistic features (for example, syntactic elements) such as morphemes, phrases, and the like, and may match the identified meaning of the word with a domain and an intent, thereby determining the user's intent. For example, the NLU module 220 may calculate the extent of inclusion of the word extracted from the user input in respective domains and intents, thereby determining the user intent. According to an embodiment, the NLU module 220 may determine the parameter of the user input by using the word that served as a basis for identifying the intent. According to an embodiment, the NLU module 220 may determine the user's intent by using the NLU DB 221 that stores linguistic features for identifying the intent of the user input. According to another embodiment, the NLU module 220 may determine the user's intent by using a personal language model (PLM). For example, the NLU module 220 may determine the user's intent by using personal information (for example, contact list, music list). The PLM may be stored in the NLU DB 221, for example. According to an embodiment, not only the NLU module 220, but also the ASR module 210 may recognize the user's voice with reference to the PLM stored in the NLU DB 221.

According to an embodiment, the NLU module 220 may produce a path rule based on the intent of the user input and the parameter. For example, the NLU module 220 may select an app to be executed based on the intent of the user input, and may determine an action to be executed in the selected app. The NLU module 220 may determine a parameter corresponding to the determined action, thereby producing a path rule. According to an embodiment, the path rule produced by the NLU module 220 may include information regarding an app to be executed, an action (for example, at least one or more states) to be executed in the app, and a parameter necessary to execute the action.

According to an embodiment, the NLU module 220 may produce one path rule or multiple path rules based on the intent of the user input and the parameter. For example, the NLU module 220 may receive a path rule set corresponding to the user terminal 100 from the path planner module 230, and may map the intent of the user input and the parameter to the received path rule set, thereby determining a path rule.

According to another embodiment, the NLU module 220 may determine, based on the intent of the user input and the parameter, an app to be executed, an action to be executed in the app, and a parameter necessary to execute the app, thereby producing one path rule or multiple path rules. For example, the NLU module 220 may arrange the app to be executed and the action to be executed in the app in an ontology or graph model form according to the intent of the user input, by using information of the user terminal 100, thereby producing a path rule. The produced path rule may be stored in a path rule database (PR DB) 231 through the path planner module 230, for example. The produced path rule may be added to the path rule set in the database 231.

According to an embodiment, the NLU module 220 may select at least one path rule from the produced multiple path rules. For example, the NLU module 220 may select an optimal path rule from the multiple path rules. As another example, the NLU module 220 may select multiple path rules when only some actions have been specified based on a user speech. The NLU module 220 may determine one path rule from the multiple path rules according to the user's additional input.

According to an embodiment, the NLU module 220 may transmit a path rule to the user terminal 100 at a request regarding a user input. For example, the NLU module 220 may transmit one path rule corresponding to a user input to the user terminal 100. As another example, the NLU module 220 may transmit multiple path rules corresponding to a user input to the user terminal 100. The multiple path rules may be produced by the NLU module 220 when only some actions have been specified based on the user speech, for example.

According to an embodiment, the path planner module 230 may select at least one path rule from multiple path rules.

According to an embodiment, the path planner module 230 may deliver a path rule set including multiple path rules to the NLU module 220. The multiple path rules in the path rule set may be stored in a table form in the path rule database 231 connected to the path planner module 230. For example, the path planner module 230 may deliver a path rule set corresponding to information (for example, OS information, app information) of the user terminal 100 received from the intelligence agent 145 to the NLU module 220. The table stored in the path rule database 231 may be stored with regard to each domain or domain version, for example.

According to an embodiment, the path planner module 230 may select one path rule or multiple path rules from the path rule set and may deliver the same to the NLU module 220. For example, the path planner module 230 may match the user's intent and the parameter with the path rule set corresponding to the user terminal 100, thereby selecting one path rule or multiple path rules, and may deliver the same to the NLU module 220.

According to an embodiment, the path planner module 230 may produce one path rule or multiple path rules by using the user's intent and the parameter. For example, the path planner module 230 may determine an app to be executed and an action to be executed in the app, based on the user's intent and the parameter, thereby producing one path rule or multiple path rules. According to an embodiment, the path planner module 230 may store the produced path rule in the PR DB 231.

According to an embodiment, the path planner module 230 may store a path rule produced by the NLU module 220 in the PR DB 231. The produced path rule may be added to the path rule set stored in the PR DB 231.

According to an embodiment, the table stored in the PR DB 231 may include multiple path rules or a set of multiple path rules. The multiple path rules or the set of multiple path rules may reflect the kind, version, type, or characteristics of the device performing each path rule.

According to an embodiment, the DM module 240 may confirm whether or not the user's intent identified by the NLU module 220 is clear. For example, the DM module 240 may confirm whether or not the user's intent is clear, based on whether or not information of a parameter is sufficient. The DM module 240 may confirm whether or not a parameter identified by the NLU module 220 is sufficient to perform a task. According to an embodiment, when the user's intent is not clear, the DM module 240 may perform a feedback for requesting the user to provide necessary information. For example, the DM module 240 may perform a feedback for requesting information regarding a parameter for identifying the user's intent.

According to an embodiment, the DM module 240 may include a content provider module. The content provider module may produce the result of performing a task corresponding to a user input, when an action can be performed based on an intent and a parameter identified by the NLU module 220. According to an embodiment, the DM module 240 may transmit the result produced by the content provider module to the user terminal 100 in response to a user input.

According to an embodiment, the NLG module 250 may convert designated information into a text form. The information converted to a text form may be of a natural language speech type. The designated information may be, for example, information regarding an additional input, information guiding completion of an action corresponding to a user input, or information guiding the user's additional input (for example, feedback information regarding a user input). The information converted to a text form may be transmitted to the user terminal 100 and then displayed on the display 120, or may be transmitted to the TTS module 260 and then changed to a voice form.

According to an embodiment, the TTS module 260 may change text-type information into voice-type information. The TTS module 260 may receive text-type information from the NLG module 250, may change the change text-type information to voice-type information, and may transmit the same to the user terminal 100. The user terminal 100 may output the voice-type information to the speaker 130.

According to an embodiment, the NLU module 220, the path planner module 230, and the DM module 240 may be implemented as a single module. For example, the NLU module 220, the path planner module 230, and the DM module 240 may implemented as a single module so as to determine the user's intent and the parameter, and may produce a response (for example, path rules) corresponding to the determined user's intent and parameter. Accordingly, the produced response may be transmitted to the user terminal 100.

Figure 7:
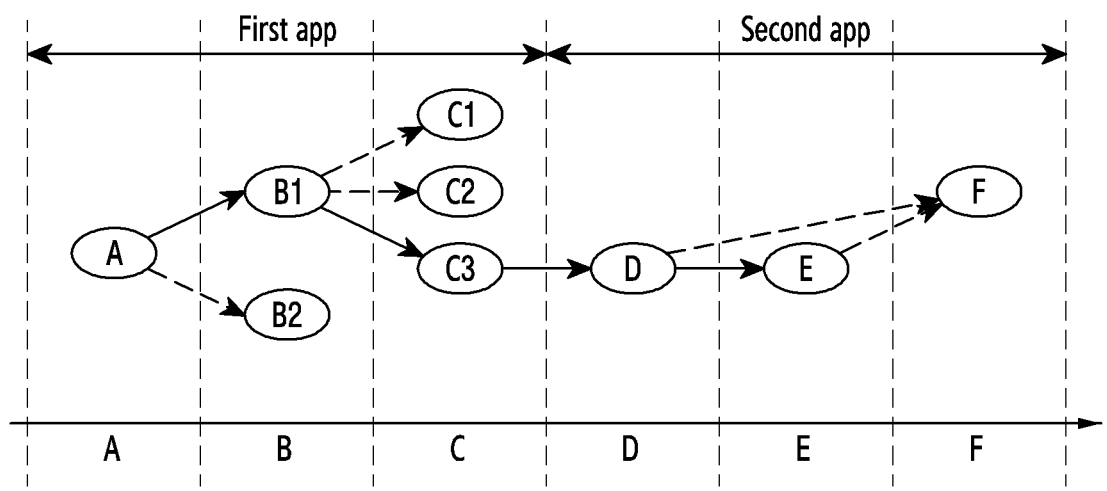
FIG. 7 is a diagram illustrating a method for producing a path rule by a path natural language understanding (NLU) module according to an embodiment of the disclosure.

FIG. 7 is a diagram illustrating a method for producing a path rule by a path planner module according to an embodiment of the disclosure.

Referring to FIG. 7, the NLU module 220 according to an embodiment may divide the function of an app into one of actions (for example, state A to state F) and store the same in the PR DB 231. For example, the NLU module 220 may store a path rule set including multiple path rules A-B1-C1, A-B1-C2, A-B1-C3-D-F, and A-B1-C3-D-E-F divided into one action (for example, state) in the PR DB 231.

According to an embodiment, the PR DB 231 of the path planner module 230 may store a path rule set for performing the function of an app. The path rule set may include multiple path rules including multiple actions (for example, sequence of states). The multiple path rules may have multiple actions which are executed according to parameters input thereto, respectively, and which are arranged successively. According to an embodiment, the multiple path rules may be configured in ontology or graph model forms and stored in the PR DB 231.

According to an embodiment, the NLU module 220 may select an optimal path rule A-B1-C3-D-F from the multiple path rules A-B1-C1, A-B1-C2, A-B1-C3-D-F, and A-B1-C3-D-E-F corresponding to the intent of a user input and the parameter.

According to an embodiment, when there is no path rule completely matching with the user input, the NLU module 220 may deliver multiple path rules to the user terminal 100. For example, the NLU module 220 may select a path rule (for example, A-B1) partially corresponding to a user input. The NLU module 220 may select one or more path rules A-B1-C1, A-B1-C2, A-B1-C3-D-F, and A-B1-C3-D-E-F, including a path rule (for example, A-B1) partially corresponding to a user input, and may deliver the same to the user terminal 100.

According to an embodiment, the NLU module 220 may select one from multiple path rules based on an additional input through the user terminal 100, and may deliver the selected path rule to the user terminal 100. For example, the NLU module 220 may select one path rule (for example, A-B1-C3-D-F) from multiple path rules (for example, A-B1-C1, A-B1-C2, A-B1-C3-D-F, and A-B1-C3-D-E-F) according to a user input (for example, input of selecting C3) that has been additionally input through the user terminal 100, and may transmit the same to the user terminal 100.

According to another embodiment, the NLU module 220 may determine a user intent and a parameter corresponding to a user input (for example, input of selecting C3) that has been additionally input to the user terminal 100 through the NLU module 220, and may transmit the determined user intent or parameter to the user terminal 100. The user terminal 100 may select one path rule (for example, A-B1-C3-D-F) from multiple path rules (for example, A-B1-C1, A-B1-C2, A-B1-C3-D-F, and A-B1-C3-D-E-F), based on the transmitted intent or the parameter.

Accordingly, the user terminal 100 may complete actions of the apps 141 and 143 by means of the selected path rule.

According to an embodiment, when a user input having insufficient information is received by the intelligence server 200, the NLU module 220 may produce a path rule partially corresponding to the received user input. For example, the NLU module 220 may transmit the partially corresponding path rule to the intelligence agent 145. The processor 150 may execute the intelligence agent 145 so as to receive the path rule and to deliver the partially corresponding path rule to the execution manager module 147. The processor 150 may execute the first app 141 according to the path rule through the execution manager module 147. The processor 150 may transmit information regarding an insufficient parameter to the intelligence agent 145 while executing the first app 141 through the execution manager module 147. The processor 150 may request an additional input from the user by using the information regarding an insufficient parameter through the intelligence agent 145. Upon receiving an additional input from the user through the intelligence agent 145, the processor 150 may transmit the user input to the intelligence server 200 and process the same. The NLU module 220 may produce an added path rule based on information regarding the parameter and the intent of the user input that has been additionally input, and may transmit the same to the intelligence agent 145. The processor 150 may transmit the path rule to the execution manager module 147 through the intelligence agent 145 and may execute the second app 143.

According to an embodiment, when a user input having partially missing information is received by the intelligence server 200, the NLU module 220 may transmit a user information request to the personal information server 300. The personal information server 300 may transmit information of a user who inputted a user input stored in the persona database to the NLU module 220. The NLU module 220 may select a path rule corresponding to a user input, which has a partially missing action, by using the user information. Accordingly, even when a user input having partially missing information is received by the intelligence server 200, the NLU module 220 may receive an additional input by requesting the missing information, or may determine a path rule corresponding to the user input by using user information.

Table 1, given below, may enumerate exemplary forms of path rules related to tasks requested by a user according to an embodiment.

TABLE 1

| Path rule ID | State | Parameter |
| --- | --- | --- |
| Gallery_101 | pictureView(25) | NULL |
|  | searchView(26) | NULL |
|  | searchViewResult(27) | Location, time |
|  | SearchEmptySelectedView(28) | NULL |
|  | SearchSelectedView(29) | ContentType, select all |
|  | CrossShare(30) | anaphora |

Referring to Table 1, a path rule produced or selected by an intelligence server (intelligence server 200 in FIG. 1) according to a user speech (for example, "Share pictures") may include at least one state 25, 26, 27, 28, 29, or 30. For example, the at least one state (for example, one of operating states of the terminal) may correspond to at least one of picture application execution (PicturesView) 25, picture search function execution (SearchView) 26, search result display screen output (SearchViewResult) 27, outputting a search result display screen having no selected picture (SearchEmptySelectedView) 28, outputting a search result display screen having at least one selected picture (SearchSelectedView) 29, or shared application selection screen output (CrossShare) 30.

In an embodiment, parameter information of the path rule may correspond to at least one state. For example, the same may be included in the state 29 in which a search result display screen having at least one selected picture is output.

As a result of performing a path rule including a sequence of the above states 25, 26, 27, 28, and 29, the task requested by the user (for example, "Share pictures!") may be performed.

Figure 8:
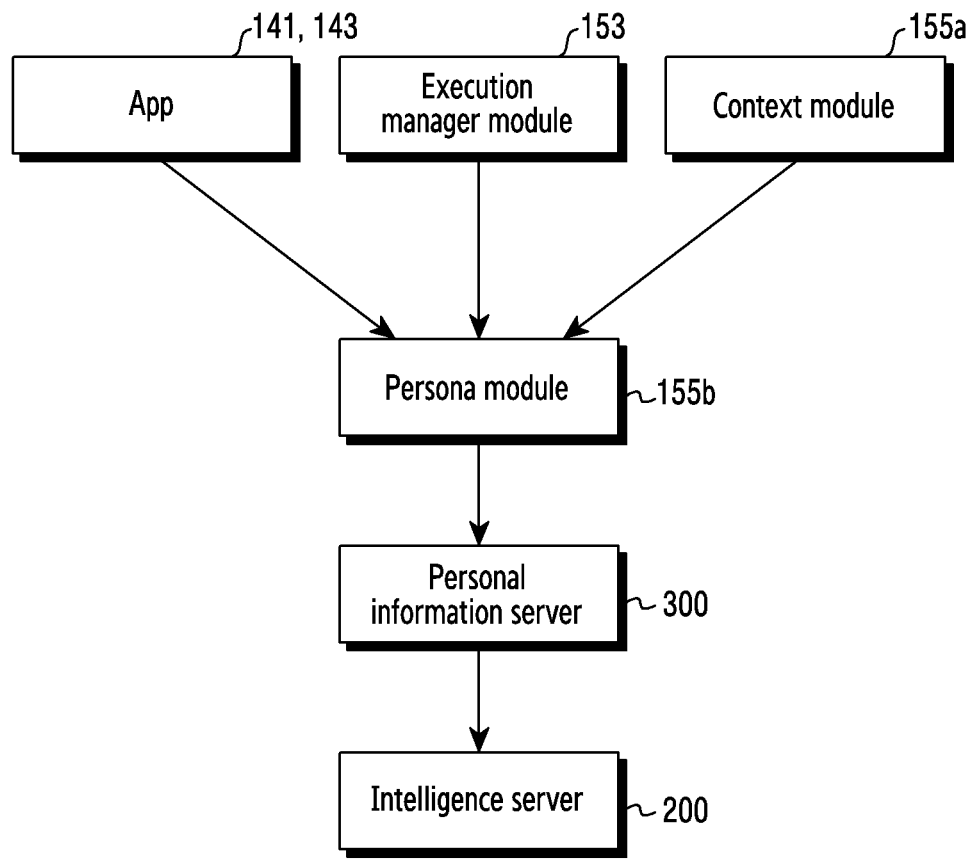
FIG. 8 is a diagram illustrating a persona module of an intelligence service module according to an embodiment of the disclosure managing user information.

FIG. 8 is a diagram illustrating a persona module of an intelligence service module according to an embodiment of the disclosure managing user information.

Referring to FIG. 8, the processor 150 may receive information of the user terminal 100 from the apps 141 and 143, the execution manager module 147, or the context module 149*a* through the persona module 149*b*. The processor 150 may store, in an action log database, information regarding the result of executing actions 141*b* and 143*b* of the apps through the apps 141 and 143 and the execution manager module 147. The processor 150 may store information regarding the current state of the user terminal 100 in a context database through the context module 149*a*. The processor 150 may receive the stored information from the action log database or the context database through the persona module 149*b*. Data stored in the action log database and the context database may be analyzed by an analysis engine, for example, and delivered to the persona module 149*b*.

According to an embodiment, the processor 150 may transmit information received from the apps 141 and 143, the execution manager module 147, or the context module 149*a* to the proposal module 149*c* through the persona module 149*b*. For example, the processor 150 may deliver data stored in the action log database or the context database to the proposal module 149*c* through the persona module 149*b*.

According to an embodiment, the processor 150 may transmit information received from the apps 141 and 143, the execution manager module 147, or the context module 149*a* to the personal information server 300 through the persona module 149b. For example, the processor 150 may periodically transmit data accumulated and stored in the action log database or the context database to the personal information server 300 through the persona module 149b.

According to an embodiment, the processor 150 may deliver data stored the action log database or the context database to the proposal module 149c through the persona module 149b. User information produced through the persona module 149b may be stored in a persona database. The persona module 149b may periodically transmit user information stored in the persona database to the personal information server 300. According to an embodiment, information transmitted to the personal information server 300 through the persona module 149b may be stored in the persona database. The personal information server 300 may infer user information necessary for the intelligence server 200 to produce a path rule, by using information stored in the persona database.

According to an embodiment, user information inferred by using information transmitted through the persona module 149b may include profile information or preference information. The profile information or preference information may be inferred through the user's account and accumulated information.

The profile information may include the user's personal status information. For example, the profile information may include the user's demographic statistics information. The demographic statistics information may include, for example, the user's gender, age, and the like. As another example, the profile information may include life event information. The life event information may be inferred by comparing log information with a life event model, for example, and may be enhanced by analyzing a behavior pattern. As another example, the profile information may include interest information. The interest information may include, for example, shopping items of interest, fields of interest (for example, sports, politics, and the like), and the like. As another example, the profile information may include activity region information. The activity region information may include, for example, information regarding home, working place, and the like. The information regarding activity regions may include not only information regarding the location of places, but also information regarding regions having priorities recorded with reference to the accumulated time of stay and the number of visits. As another example, the profile information may include activity time information. The activity time information may include, for example, information regarding the getting-up time, the time to go to/out of office, the sleeping time, and the like. The information regarding the time to go to/out of office may be inferred by using the activity region information (for example, information regarding home and working places). The information regarding the sleeping time may be inferred based on the time during which the user terminal 100 is not used.

The preference information may include the user's preference information. For example, the preference information may include information regarding app preferences. The app preferences may be inferred, for example, based on app usage records (for example, time/place-specific usage records). The app preferences may be used to determine an app to be executed according to the user's current state (for example, time, place). As another example, the preference information may include information regarding contact list preferences. The contact list preferences may be inferred by analyzing information regarding how frequently a contact is made with a person on the contact list (for example, frequency of contacts at each time/place). The contact list preferences may be used to determine a person to contact according to the user's current state (for example, the name of repeatedly contacted person). As another example, the preference information may include setting information. The setting information may be inferred by analyzing information regarding how frequently a specific setting value is configured (for example, how frequently a setting value is configured at each time/place). The setting information may be used to configure a specific setting value according to the user's current state (for example, time, place, situation). As another example, the preference information may include place preferences. The place preferences may be inferred, for example, based on records of visits to specific places (for example, time-specific visit records). The place preferences may be used to determine the currently visited place, according to the user's current state (for example, time). As another example, the preference information may include command preferences. The command preferences may be inferred, for example, based on command usage frequencies (for example, time/place-specific use frequencies). The command preferences may be used to determine an instruction pattern to be used according to the user's current state (for example, time, place). Particularly, the command preferences may include information regarding menus most frequently selected by the user in the current state of the app currently executed by analyzing log information.

Figure 9:
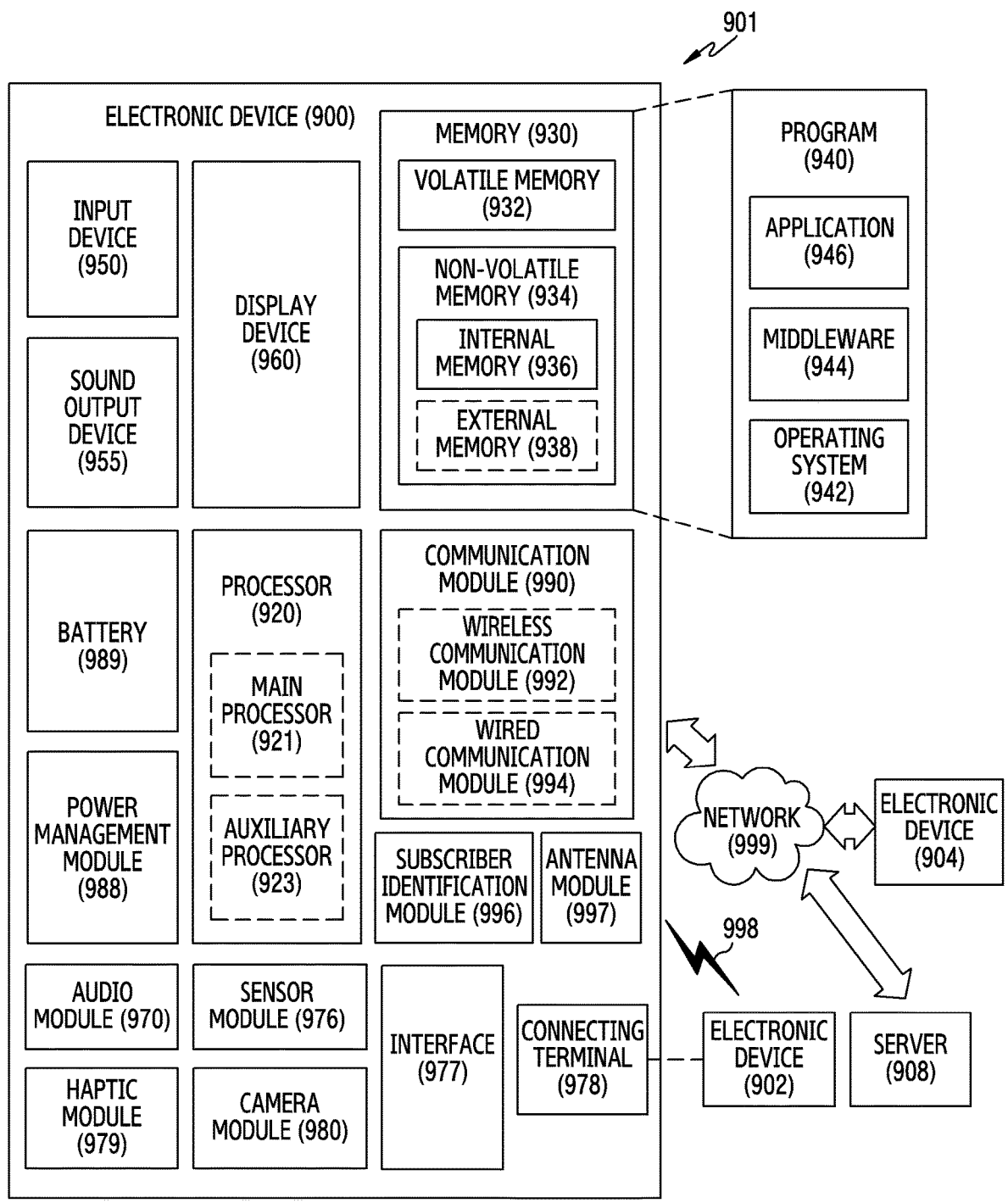
FIG. 9 is a block diagram of an electronic device inside a network environment according to various embodiments.

FIG. 9 is a block diagram illustrating an electronic device 901 in a network environment 900 according to various embodiments.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

In an embodiment, the electronic device 901 may be the user terminal 100 illustrated in FIG. 1.

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector), The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 10:
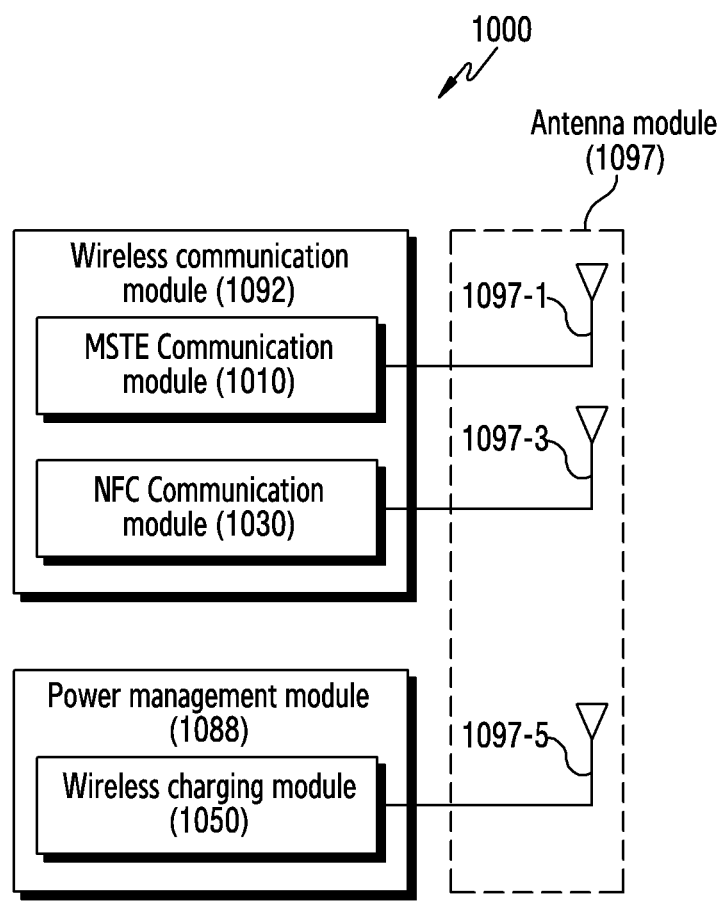
FIG. 10 is a block diagram of a wireless communication module, a power management module, and an antenna module of an electronic device according to various embodiments.

FIG. 10 is a block diagram 1000 of a wireless communication module 1092, a power management module 1088, and an antenna module 1097 of an electronic device 1001 according to various embodiments. Referring to FIG. 10, the wireless communication module 1092 may include an MST communication module 1010 or an NFC communication module 1030, and the power management module 1088 may include a wireless charging module 1050. In this case, the antenna module 1097 may separately include multiple antennas including an MST antenna 1097-1 connected to the MST communication module 1010, an NFC antenna 1097-3 connected to the NFC communication module 1030, and a wireless charging antenna 1097-5 connected to the wireless charging module 1050. For convenience of description, descriptions of the same elements as those in FIG. 10 will be omitted or simplified.

In an embodiment, the electronic device 1001 may be the electronic device 901 illustrated in FIG. 9.

The MST communication module 1010 may receive a signal (for example, signal including control information or payment information) from the processor 1020, may produce a magnetic signal corresponding to the received signal through the MST antenna 1097-1, and may deliver the produced magnetic signal to an external electronic device 1002 (for example, POS device). According to an embodiment, the MST communication module 1010 may include a switching module (not illustrated) including one or more switches connected to the MST antenna 1097-1, for example, and may control the switching module so as to change the direction of the voltage or current supplied to the MST antenna 1097-1. This may be sent through the MST antenna 1097-1, thereby changing the direction of a magnetic signal (for example, magnetic field) delivered to the external electronic device 1002 through wireless short-distance communication 1098, for example. The magnetic signal delivered with a changed direction may cause a similar form and effect to those of a magnetic field occurring when a magnetic card is swiped by the card reader of the electronic device 1002. According to an embodiment, the control signal and payment-related information received by the electronic device 1002 in the magnetic signal form may be transmitted to a payment server (for example, server 1008) through the network 1099, for example.

The NFC communication module 1030 may acquire a signal (for example, signal including control information or payment information) from the processor 1020 and may transmit the acquired signal to an external electronic device 1002 through the NFC antenna 1097-3. According to an embodiment, the NFC communication module 1030 may receive a signal (for example, signal including control information or payment information) sent from the external electronic device 1002 through the NFC antenna 1097-3.

The wireless charging module 1050 may wirelessly transmit power to the external electronic device 1002 (for example, mobile phone or wearable device) through the wireless charging antenna 1097-5, or may wirelessly receive power from the external electronic device 1002 (for example, wireless charging device). The wireless charging module 1050 may support various wireless charging schemes including, for example, a resonant magnetic coupling or inductive coupling.

According to an embodiment, some antennas among the MST antenna 1097-1, the NFC antenna 1097-3, or the wireless charging antenna 1097-5 may share at least a part of a radiator with each other. For example, the radiator of the MST antenna 1097-1 may be used as the radiator of the NFC antenna 1097-3 or the wireless charging antenna 1097-5, and vice versa. When the MST antenna 1097-1, the NFC antenna 1097-3, or the wireless charging antenna 1097-5 shares at least a partial region of a radiator, the antenna module 1097 may include a switching circuit (not illustrated) for selectively connecting or separating (for example, opening) at least a part of the antenna 1097-1, 1097-3, or 1097-3 under the control of the wireless communication module 1092 (for example, MST communication module 1010 or NFC communication module 1030) or the power management module (for example, wireless charging module 1050). For example, when the electronic device 1001 uses a wireless charging function, the NFC communication module 1030 or the wireless charging module 1050 may control the switching circuit so as to temporarily separate at least a partial region of the radiator shared by the NFC antenna 1097-3 and the wireless charging antenna 1097-5 from the NFC antenna 1097-3 and to connect the same only to the wireless charging antenna 1097-5.

According to an embodiment, at least some functions of the MST communication module 1010, the NFC communication module 1030, or the wireless charging module 1050 may be controlled by an external processor (for example, processor 1020). According to an embodiment, designated functions (for example, payment function) of the MST communication module 1010 or the NFC communication module 1030 may be performed in a trusted execution environment (TEE). The TEE according to various embodiments may be an execution environment wherein at least a partial designated region of the memory 1030 is allocated, for example, to perform a function requiring a relatively high level of security ((for example, financial transaction or personal information-related function), and access to the designated region is allowed limitedly based on distinction according to the accessor or the executed application, for example.

Figure 11:
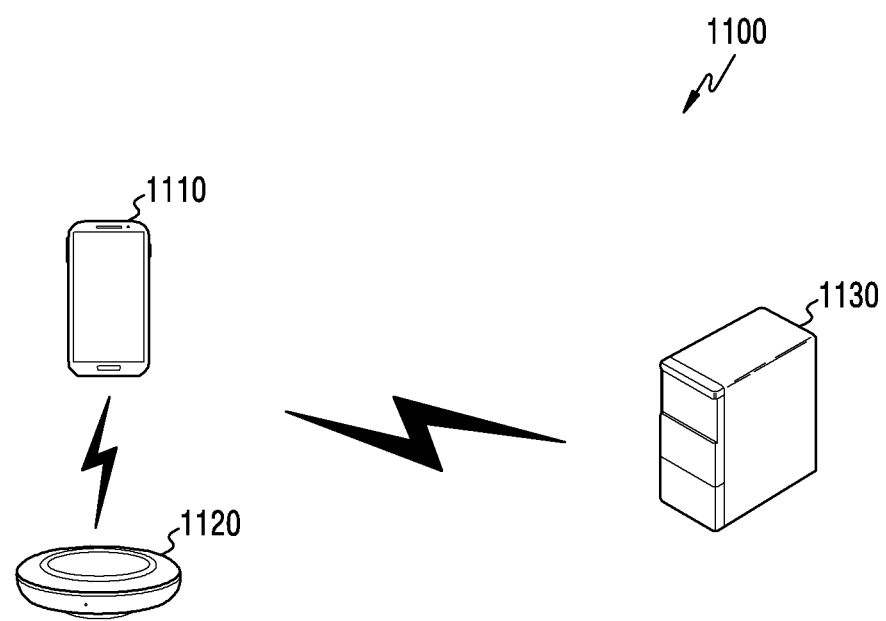
FIG. 11 illustrates a system according to various embodiments of the disclosure.

FIG. 11 illustrates a system 1100 according to various embodiments of the disclosure.

Referring to FIG. 11, the system 1100 may include a first electronic device 1110, a second electronic device 1120, and a server 1130.

The first electronic device 1110 may be a device processing input/output data regarding the first electronic device 1110 by additionally using the input/output function of the second electronic device 1120, in order to provide a voice-based service to a user.

In an embodiment, the voice-based service may be the user's voice recognition service or a service or a function related to the voice recognition service. For example, the voice-based service may be a service related to the intelligence app illustrated in FIG. 1 or FIG. 3, for example. As another example, the voice-based service may be an active noise canceling (ANC) service of the user's voice recognition service.

In an embodiment, input/output data regarding the first electronic device 1110 may be determined according to a control command input from the outside of the first electronic device 1110 (for example, user, second electronic device 1120, server 1130, or the like) or inside of the first electronic device 1110 (for example, process of the first electronic device 1110). For example, when the user has input a voice command such as "Play music A" to the first electronic device 1110, input data regarding the first electronic device 1110 may be determined as the user's voice command (or voice speech), and output data may be determined as music A.

In an embodiment, the input/output function of the device (for example, first electronic device 1110 or second electronic device 1120) may include a function of sensing data regarding the external environment of the device, and a function of outputting data produced by the device to the external environment. For example, the input function of the second electronic device 1120 may include a function of the second electronic device 1120 recognizing a user voice speech (for example, "Hi Bixby, when is the Golden State Warriors game today?") by using the microphone provided in the second electronic device 1120. As another example, the output function of the second electronic device 1120 may include a function of the second electronic device 1120 outputting sound-format information (for example, "Today Golden State Warriors game will be held at 7:00 pm") by using the speaker provided in the second electronic device 1120.

In an embodiment, prior to receiving a control command regarding the first electronic device 1110 from an external device (for example, second electronic device 1120 or server 1130) of the first electronic device 1110, the first electronic device 1110 may be connected to the external device (for example, second electronic device 1120 or server 1130) through a wireless network. In another embodiment, the first electronic device 1110 may receive a control command regarding the first electronic device 1110 and then attempt to establish connection with the external device through the wireless network.

In an embodiment, the first electronic device 1110 may be connected to the second electronic device 1120 through a short-distance communication network (for example, first network 998). For example, the first electronic device 1110 may be connected to the second electronic device 1120 by using at least one of Bluetooth, Bluetooth low energy (BLU), or Wi-Fi Direct communication. As another example, the first electronic device 1110 may be connected to the second electronic device 1120 by using the second communication circuit (for example, second communication circuit 23b in FIG. 14) of the wireless charging module (for example, wireless charging module 1220 in FIG. 12) included in the first electronic device 1110.

In an embodiment, the first electronic device 1110 and/or the second electronic device 1120 may be connected to the server 1130 through a long-distance wireless communication network (for example, second network 999 in FIG. 9).

In an embodiment, the first electronic device 1110 may be the electronic device 901 in FIG. 9.

In an embodiment, the second electronic device 1120 may be a device providing an input/output function of the second electronic device 1120 in order to process input/output data of the first electronic device 1110. In another embodiment, the second electronic device 1120 may additionally use the input/output function of the first electronic device 1110 in order to process the input/output data of the second electronic device 1120.

In an embodiment, the second electronic device 1120 may perform a function designated for the second electronic device 1120, and the function designated for the second electronic device 1120 may be unrelated to the input/output function of the second electronic device 1120. For example, the function designated for the second electronic device 1120 may be a function for supplying power to the first electronic device 1110. For example, the second electronic device 1120 may supply power to the first electronic device 1110 wirelessly by using at least one of inductive coupling, resonant magnetic coupling, or radio frequency radiation. As another example, the second electronic device 1120 may be connected to the first electronic device 1110 in a wired manner so as to supply power to the first electronic device 1110.

In an embodiment, the second electronic device 1120 may be connected to the first electronic device 1110 by using a communication channel separate from the communication channel used to supply power to the first electronic device 1110. For example, the second electronic device 1120 may be connected to the first electronic device 1110 through a wireless network while supplying power to the first electronic device 1110. As another example, the second electronic device 1120 may be connected to the first electronic device 1110 through a wireless network even when supplying no power to the first electronic device 1110 (for example, when the first electronic device 1110 is fully charged).

In an embodiment, the server 1130 may be a device controlling at least one of the first electronic device 1110 or the second electronic device 1120 such that the first electronic device 1110 can process input/output data regarding the first electronic device 1110 by additionally using the input/output function of the second electronic device 1120. In an embodiment, the server 1130 may be at least one of an intelligence server 200, a personal information server 300, and a proposal server 400, or a set of the above-mentioned servers.

In an embodiment, the server 1130 may be connected to the first electronic device 1110 and/or the second electronic device 1120 through at least one of a wired network or a wireless network. For example, the server 1130 may be a router device of a local network, which is connected to the first electronic device 1110 and/or the second electronic device 1120 through the local network. As another example, the server 1130 may be a cloud server.

In an embodiment, the server 1130 may sense connection between the first electronic device 1110 and the second electronic device 1120 and then determine the position of at least one of the first electronic device 1110 or the second electronic device 1120. The position of the second electronic device 1120 may be fixed, and the server 1130 may have information regarding the fixed position of the second electronic device 1120 prestored therein. When the server 1130 senses connection between the first electronic device 1110 and the second electronic device 1120 while having information regarding the fixed position of the second electronic device 1120 prestored therein, the server 1130 may determine the position of the first electronic device 1110 based on the position information of the second electronic device 1120. For example, upon sensing connection between the first electronic device 1110 and the second electronic device 1120, the server 1130 may determine that the position of the first electronic device 1110 is identical to the position of the second electronic device 1120. As another example, after sensing connection between the first electronic device 1110 and the second electronic device 1120, the server 1130 may determine the relative position of the first electronic device 1110 with reference to the position of the second electronic device 1120 (for example, the distance from the position of the second electronic device 1120, the direction with regard to the second electronic device 1120, or the like).

In an embodiment, the server 1130 may determine the position of the first electronic device 1110 in view of the charging scheme of the second electronic device 1120. For example, when the second electronic device 1120 supplies power to the first electronic device 1110 according to the inductive coupling scheme, the server 1130 may determine that the position of the first electronic device 1110 is identical to the position of the second electronic device 1120. As another example, when the second electronic device 1120 supplies power to the first electronic device 1110 according to the resonant magnetic coupling scheme, the server 1130 may determine the position of the first electronic device 1110 (for example, distance from the second electronic device 1120) based on the power transmission efficiency.

In an embodiment, after sensing connection between the first electronic device 1110 and the second electronic device 1120, the server 1130 may control at least one of the first electronic device 1110 or the second electronic device 1120. For example, upon receiving identification information of the second electronic device 1120 from the first electronic device 1110, or upon receiving identification information of the first electronic device 1110 from the second electronic device 1120, the server 1130 may confirm that the first electronic device 1110 and the second electronic device 1120 are connected, and may control at least one of the first electronic device 1110 or the second electronic device 1120.

In an embodiment, in order to control at least one of the first electronic device 1110 or the second electronic device 1120, the server 1130 may transmit a control command to at least one of the first electronic device 1110 or the second electronic device 1120 through a network connected to the first electronic device 1110 and the second electronic device 1120. The control command transmitted by the server 1130 may include a control command regarding activation or deactivation of at least one function (for example, voice recognition function) regarding the first electronic device 1110 or the second electronic device 1120, or execution of at least one function or action (for example, output of data produced and transmitted by the server 1130) regarding the first electronic device 1110 or the second electronic device 1120.

In an embodiment, the server 1130 may receive data including a request for provision of specific information from at least one of the first electronic device 1110 or the second electronic device 1120. In an embodiment, at least one of the first electronic device 1110 or the second electronic device 1120 may receive various types of user inputs requesting specific information (for example, voice input, touch input, gesture input, and the like). For example, at least one of the first electronic device 1110 or the second electronic device 1120 may receive a user voice speech such as "Hi Bixby, when is the Golden State Warriors game today?". In addition, at least one of the first electronic device 1110 or the second electronic device 1120 may convert the received user voice speech into an electric signal (for example, voice signal), and may transmit the converted electric signal to the server 1130. The server 1130 may confirm that the received electric signal includes a request for provision of information (Golden State game information).

In an embodiment, the server 1130 may acquire the requested information in response to receiving the information provision request. For example, the server 1130 may acquire the requested "Golden State game information" by searching through the memory stored in the server 1130 or requesting another server connected to the server 1130 to provide the same.

In an embodiment, the server 1130 may determine the output format of the acquired information. For example, the server 1130 may determine the output format of the acquired information, based on input/output attribute information of the first electronic device 1110 and the second electronic device 1120, or hardware/software information thereof. The server 1130 may encode the acquired information in the determined output format, thereby producing feedback data to be transmitted to the first electronic device 1110 or the second electronic device 1120.

In an embodiment, the server 1130 may determine output information of the feedback data. The output information of the feedback data may include information regarding the device to output the feedback data, information regarding the condition to output the feedback data, and information regarding the output environment (for example, volume) of the feedback data.

In an embodiment, the server 1130 may transmit at least a part of the feedback data to at least one of the first electronic device 1110 or the second electronic device 1120. For example, the server 1130 may transmit the entire feedback data to the first electronic device 1110. As another example, the server 1130 may transmit a first portion of the feedback data to the first electronic device 1110, and may transmit a second portion of the feedback data to the second electronic device 1120. The second portion may correspond to the remaining portion of the feedback data other than the first portion. The server 1130 may transmit a portion of the requested feedback data, instead of the entire feedback data, to the device that requested the feedback data, and may transmit a part of the feedback data to a device that did not request the feedback data.

In an embodiment, the server 1130 may transmit at least a part of the output information to at least one of the first electronic device 1110 and the second electronic device 1120. For example, when the server 1130 transmits the entire feedback data to the first electronic device 1110, the server 1130 may additionally transmit output information to the first electronic device 1110 so as to indicate that a part (first portion) of the transmitted feedback data will be output by the first electronic device 1110, and the remaining part (second portion) of the feedback data will be output by the second electronic device 1120. Based on the output information, the first electronic device 1110 may transmit or forward a part (second portion) of the received entire feedback data to the second electronic device 1120. As another example, when the server 1130 transmits the first portion of the feedback data to the first electronic device 1110 and transmits the second portion to the second electronic device 1120, the server 1130 may additionally transmit, to the first electronic device 1110, information indicating that the currently transmitted data is a part of the requested feedback data and information indicating that the remaining part will be transmitted to the second electronic device 1120. In addition, the server 1130 may additionally transmit, to the second electronic device 1120, information indicating that the currently transmitted data is part of the requested feedback data and information indicating that the remaining part will be transmitted to the first electronic device 1110.

In an embodiment, the server 1130 may determine at least a part of the feedback data and the output information based on device information of the first electronic device 1110 and/or the second 1120, which is prestored in the server 1130. In an embodiment, the device information of the first electronic device 1110 and/or the second electronic device 1120 may include hardware/software information (for example, whether the device has a microphone, a speaker, a display, and the like, the type thereof, or the performance thereof (for example, the playback frequency band of the speaker)), or input/output attribute information (for example, voice recognition, voice output, image output, and the like). For example, when the first electronic device 1110 includes a display (for example, display 120 in FIG. 2), and when the second electronic device 1120 includes no display, the server 1130 may determine that the output format of the feedback data is "image", or "image" and "sound". As another example, when neither the first electronic device 1110 nor the second electronic device 1120 includes a display, the server 1130 may determine that the output format of the feedback data is "sound".

In an embodiment, the server 1130 may determine at least a part of the feedback data and the output information based on state information of the first electronic device 1110 and/or the external device 1120. For example, when the first electronic device 1110 including a display 120 is currently playing a specific image through the display 120, the server 1130 may determine that the output format of the feedback data is "sound". As another example, when the first electronic device 1110 including a display 120 and a speaker (for example, speaker 130 in FIG. 2) is currently outputting a specific sound through the speaker 130, the server 1130 may determine that the output format of the feedback data is "image".

Figure 12:
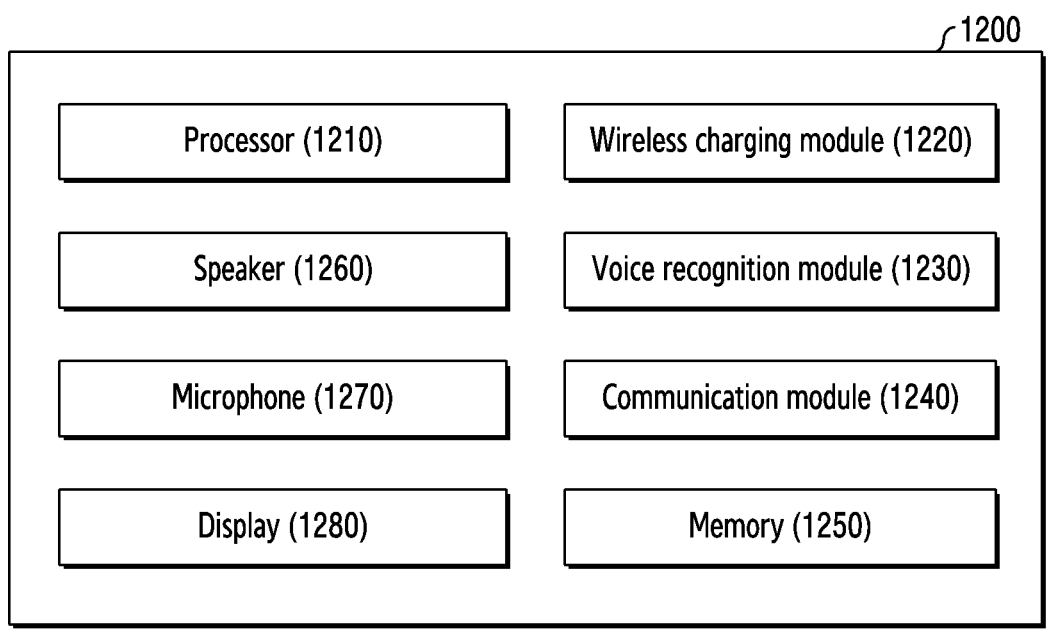
FIG. 12 illustrates a functional configuration of a first electronic device according to various embodiments of the disclosure.

FIG. 12 illustrates a functional configuration of a first electronic device 1200 according to various embodiments of the disclosure.

Figure 14:
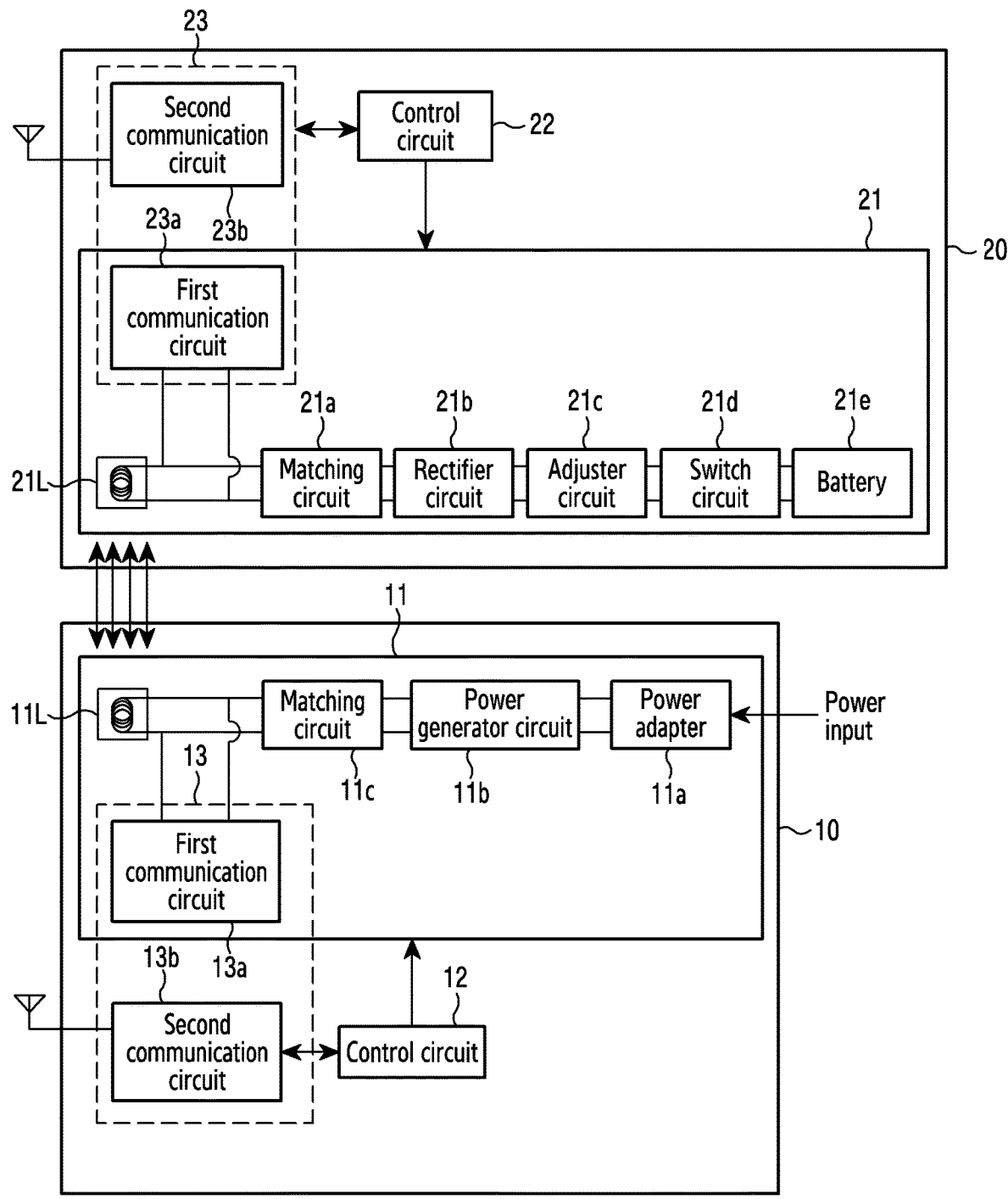
FIG. 14 illustrates the circuitry of a wireless charging module of a first electronic device and a wireless charging module of a second electronic device according to various embodiments of the disclosure.

FIG. 14 illustrates the circuitry of a wireless charging module of an electronic device and a wireless charging module of an external device according to various embodiments of the disclosure.

Referring to FIG. 12, the first electronic device 1200 may include a processor 1210, a wireless charging module 1220, a voice recognition module 1230, a communication module 1240, a memory 1250, a speaker 1260, a microphone 1270, and a display 1280. In an embodiment, the first electronic device 1200 may be the first electronic device 1110 in FIG. 11.

In an embodiment, the processor 1210 may control the overall action of the first electronic device 1200. For example, upon receiving a control command for activating the voice recognition function from a server 1130, the processor 1210 may activate the microphone 1270 and the voice recognition module 1230. As another example, the processor 1210 may control the communication module 1240 so as to transmit data (for example, voice signal) regarding a voice speech recognized through the microphone 1270 to the server 1130.

Referring to FIG. 12 and FIG. 14, the wireless charging module 1220 or 21 may be a module for wirelessly receiving power from an external device 10 (or transmission coil 11L of the external device). The external device may be the second electronic device 1120 in FIG. 11.

In an embodiment, the wireless charging module 1220 or 21 may be the wireless charging module 1050 in FIG. 10.

In an embodiment, the wireless charging module 1220 or 21 may include a receiver coil 21L, a matching circuit 21a, a rectifier circuit 21b configured to rectify received AC power into DC power, an adjuster circuit 21c configured to adjust charging power, a switch circuit 21d, and a battery 21e.

In an embodiment, the control circuit 22 may perform overall control of the electronic device 20 or the wireless charging module 1220 or 21, may produce various kinds of messages necessary for wireless power transmission/reception, and may deliver the same to the communication circuit 23. In an embodiment, the control circuit 22 may be at least a part of the processor 1210.

In an embodiment, the communication circuit 23 may include at least one of a first communication circuit 23a and a second communication circuit 23b. The first communication circuit 23a may communicate with an external device 10 through the receiver coil 21L. The second communication circuit 23b may communicate with the external device 10 by using one of various short-distance communication schemes such as Bluetooth, BLE, Wi-Fi, and NFC. In an embodiment, at least a part of the communication circuit 23 may be included in the communication module 1240, the wireless communication module 1092, or the wireless charging module 1050. For example, the second communication circuit 23b may be a part of the communication module 1240. As another example, the second communication circuit 23b may be a part of the wireless communication module 1092. As another example, the first communication circuit 23a may be a part of the wireless charging module 1050.

In an embodiment, the voice recognition module 1230 may be a module for recognizing the user's voice input to the first electronic device 1200. The voice recognition module 1230 may be functionally or electrically connected to at least a part of an input/output module (for example, microphone 1270, receiver, earphone, or the like). The voice recognition module 1230 may convert an analog voice signal (for example, the user's voice speech) delivered from the microphone 1270 into a digital signal.

In an embodiment, the voice recognition module 1230 may include a trigger sound recognition module (not illustrated). The trigger sound recognition module may convert various kinds of sound sources input from at least a part of the input/output module (for example, microphone 1270), such as the user's voice, noise near the electronic device, and a sound currently output by the electronic device, into an electric signal. The trigger sound recognition module may determine whether or not the converted electric signal includes a signal exhibiting a matching ratio equal to or larger than a predetermined value with regard to a prestored signal pattern (signal pattern corresponding to a trigger sound (or wake-up command) (for example, Hi Bixby)). When it is determined that the converted electric signal includes a signal exhibiting a matching ratio equal to or larger than a predetermined value with regard to a prestored signal pattern, the trigger sound recognition module may confirm that a trigger sound has been recognized.

In an embodiment, when a trigger sound has been recognized, the trigger sound recognition module may execute a function corresponding to the recognized trigger sound. For example, the trigger sound recognition module may call a voice recognition application (for example, Bixby™ or Siri™) according to the recognized trigger sound. As another example, a specific function may be instantly executed without calling a voice recognition application.

In an embodiment, the voice recognition module 1230 may include a noise canceling module (not illustrated) for increasing the trigger sound recognition ratio. For example, when the microphone 1270 of the first electronic device 1200 includes a first microphone and a second microphone, the noise canceling module may cancel noise from a first signal input to the first microphone by using a second signal input to the second microphone and the distance between the first and second microphones. As another example, when the first electronic device 1200 includes a first microphone, and when the second electronic device 1120 includes a second microphone, the noise canceling module may cancel noise from a first signal input to the first microphone by using the distance between the first microphone included in the electronic device and the second microphone included in the external device and a second signal input to the second microphone (for example, by applying a signal obtained by reversing the second signal to the first signal).

In an embodiment, the voice recognition module 1230 may include a voice command recognition module (not illustrated) for recognizing the user's voice command that follows the trigger sound. However, the trigger sound recognition module may also recognize the user's voice command that follows the trigger sound, without the voice command recognition module. Alternatively, the voice command recognition module may recognize the trigger sound without the trigger sound recognition module. The voice command recognition module may recognize the user's voice speech that follows the trigger sound, and may determine that the recognized user's voice speech (excluding the trigger sound) is the user's voice command. The voice command recognition module may recognize the user's voice speech as the user's voice command while an output equal to or larger than a predetermined value continues. The voice command recognition module may convert the recognized user's voice speech into electric data and may transmit the converted electric data to the processor 1210 or the communication module 1240 such that the converted electric data is transmitted to the server 1130.

In an embodiment, the communication module 1240 may transmit data stored in or produced by the first electronic device 1200 to an external device (for example, second electronic device 1120 or server 1130), and may receive data stored in or produced by the external device. For example, the communication module 1240 may transmit data related to a user voice command input to the electronic device to the server 1130.

In an embodiment, the memory 1250 may store an instruction regarding an action or function to be performed by the first electronic device 1200, or data produced by the first electronic device 1200 or received from an external device (for example, second electronic device 1120 or server 1130). In an embodiment, the memory 1250 may be the memory 930 in FIG. 9. For example, the memory 1250 may store at least a part of feedback data received from the server 1130.

In an embodiment, the memory 1250 may at least temporarily store data.

In an embodiment, the speaker 1260 may output sound-format data under the control of the processor 1210. In an embodiment, the speaker 1260 may be the speaker 130 in FIG. 2.

In an embodiment, the display 1280 may output image-format data under the control of the processor 1210. In an embodiment, the display 1280 may be the display 120 in FIG. 2.

In an embodiment, the microphone 1270 may receive various kinds of sound sources input to the microphone 1270. In an embodiment, the microphone 1270 may receive an analog voice signal such as the user's voice speech, and may deliver the received voice signal to the voice recognition module 1230. In an embodiment, the microphone 1270 may be the microphone 111 in FIG. 3.

Figure 13:
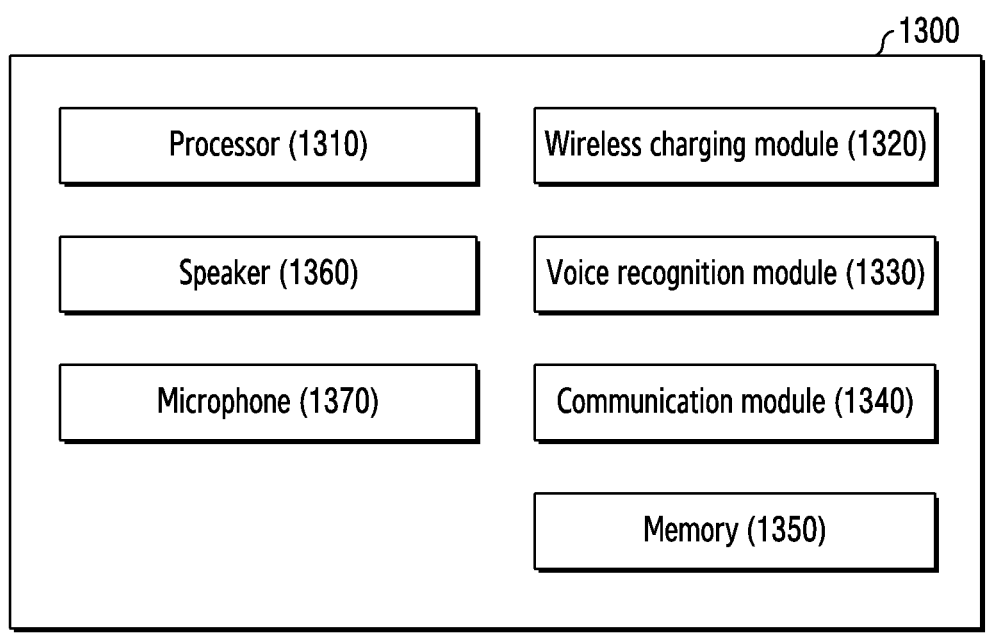
FIG. 13 illustrates a functional configuration of a second electronic device according to various embodiments of the disclosure.

FIG. 13 illustrates a functional configuration of a second electronic device 1300 according to various embodiments of the disclosure.

Referring to FIG. 13, the second electronic device 1300 may include a processor 1310, a wireless charging module 1320, a voice recognition module 1330, a communication module 1340, a memory 1350, a speaker 1360, and a microphone 1370. In an embodiment, the second electronic device 1300 may be the second electronic device 1120 in FIG. 11.

In an embodiment, the voice recognition module 1330, the communication module 1340, the memory 1350, the speaker 1360, and the microphone 1370 perform similar functions to those of the voice recognition module 1230, the communication module 1240, the memory 1250, the speaker 1260, and the microphone 1270 of the first electronic device 1200 illustrated in FIG. 12, and detailed descriptions thereof will be omitted herein.

In an embodiment, the processor 1310 may control the overall action of the second electronic device 1300. For example, upon receiving a control command for deactivating the voice recognition function from the server 1130, the processor 1310 may deactivate the microphone 1370 and the voice recognition module 1330. As another example, upon receiving at least a part of feedback data from the first electronic device 1200 or the server 1130, the processor 1310 may control an output module (for example, speaker 1360) so as to output the received data according to the output format (for example, sound format) of the received data.

Referring to FIG. 13 and FIG. 14, the wireless charging module 1320 or 11 may be a module for wirelessly supplying power to an external device 20 (or receiver coil L21 of the external device). The wireless charging module 1320 or 11 may include a power adapter 11*a* configured to receive power supply (or power) from the outside and to appropriately convert the voltage of the received power supply, a power generator circuit 11*b* configured to produce power, and a matching circuit 11*c* configured to maximize the efficiency between the transmitter coil 11L and the receiver coil 21L.

In an embodiment, the control circuit 12 may perform overall control of the wireless charging module 1250, may produce various kinds of messages necessary for wireless power transmission, and may deliver the same to the communication circuit 13. In an embodiment, the control circuit 12 may obtain power (or amount of power) to be sent to the first electronic device 1200 based on information received from the communication circuit 13. In an embodiment, the control circuit 12 may control the power generator circuit 13 such that power obtained by the transmitter coil 11L is transmitted to the first electronic device 1200. In an embodiment, the control circuit 12 may be at least a part of the processor 1310.

In an embodiment, the communication circuit 13 may include at least one of a first communication circuit 13*a* and a second communication circuit 13*b*. The first communication circuit 13*a* may communicate with the first communication circuit 23*a* of the external device 20 by using, for example, the same frequency as the frequency used by the transmitter coil 11L for power delivery. As another example, the first communication circuit 13*a* may communicate with the second communication circuit 23*b* of the external device 20 by using a frequency different from the frequency used by the transmitter coil 11L for power delivery. For example, the second communication circuit 13*b* may acquire information regarding the charging state (for example, Vrec information, Iout information, various kinds of packets, messages, and the like) from the second communication circuit 23*b* by using one of various short-distance communication schemes such as Bluetooth, BLE, Wi-Fi, and NFC.

FIG. 15 illustrates two type of exterior of a second electronic device 1300 according to various embodiments of the disclosure.

Figure 15A:
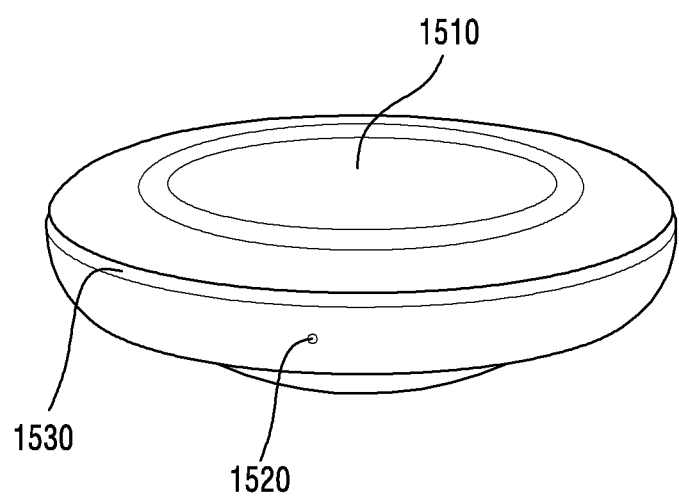
FIG. 15A and FIG. 15B illustrate two forms of the exterior of a second electronic device according to various embodiments of the disclosure.

FIG. 15A illustrates the exterior of a cradle-type second electronic device 1300 wirelessly supplying power to a first electronic device 1200 contacting a part of the surface of the second electronic device 1300 (for example, upper surface of the external device). In an embodiment, FIG. 15A may illustrate the exterior of a second electronic device 1300 wirelessly supplying power to a first electronic device 1200 according to an inductive coupling scheme.

Referring to FIG. 15A, the external device may include a charging pad 1510, a microphone 1520, and a display unit 1530.

In an embodiment, the charging pad 1510 may be disposed on the exterior of the second electronic device 1300. The charging pad 1510 may be disposed on the exterior of the second electronic device 1300 in order to make contact with the first electronic device 1200. The charging pad 1510 may be disposed on the upper surface of the second electronic device 1300 such that the first electronic device 1200, which requests wireless charging, is placed above the charging pad. The charging pad 1510 may have a transmitter coil (for example, 11L in FIG. 14) disposed therein. When the first electronic device 1200 is placed above the charging pad 1510, power obtained by the transmitter coil 11L may be transmitted to the first electronic device 1200 through the receiver coil of the first electronic device 1200.

In an embodiment, the microphone 1520 may be disposed on the exterior of the external device. The microphone 1520 may be the microphone 1370. For example, the microphone 1520 may be disposed on a side surface of the second electronic device 1300. The microphone 1520 may be disposed inside the second electronic device 1300, not on the exterior of the second electronic device 1300.

In an embodiment, the display unit 1530 may be disposed on the exterior of the second electronic device 1300. The display unit 1530 may be disposed on a side surface of the second electronic device 1300. The display unit 1530 may be disposed on a side surface of the second electronic device 1300 in an annular type. For example, the display unit 1530 may annularly surround the second electronic device 1300 in a band shape.

In an embodiment, the display unit 1530 may display the current state of the second electronic device 1300 related to wireless charging. The display unit 1530 may include an LED. For example, the display unit 1530 may display information regarding whether or not the second electronic device 1300 is connected to an external power supply (for example, AC power supply). As another example, the display unit 1530 may display information regarding whether or not the second electronic device 1300 is currently supplying power to the first electronic device 1200, or information regarding a case in which power can no longer be supplied to the first electronic device 1200 (for example, charging completed).

In an embodiment, the display unit 1530 may display the current state of the second electronic device 1300 related to wireless charging by using various types of visual feedbacks. For example, the display unit 1530 may display the current state of the second electronic device 1300 related to wireless charging by varying the color or brightness, or periodically emitting light.

In an embodiment, the display unit 1530 may display information related to user voice recognition. When the voice recognition function is activated, when a trigger sound and/or voice command is recognized, or when feedback data corresponding to the voice command is output, different types of visual feedbacks may be displayed.

Figure 15B:
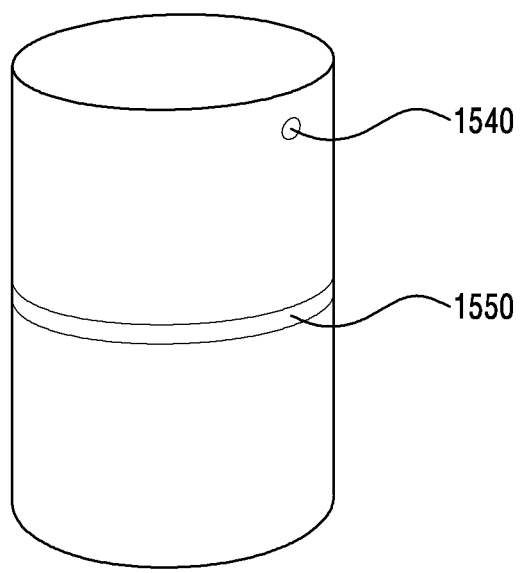

FIG. 15B illustrates a tower or desk-type second electronic device 1300 wirelessly supplying power to a first electronic device 1200 included in a possible power transmission range (for example, 2 m) of an external device. In an embodiment, FIG. 15B may illustrate the exterior of a second electronic device 1300 wirelessly supplying power to a first electronic device 1200 according to a resonant magnetic coupling scheme.

In an embodiment, the second electronic device 1300 illustrated in FIG. 15B may wirelessly supply power to a first electronic device 1200 positioned within a predetermined possible transmission range. The efficiency of wireless charging may vary depending on the distance between the first electronic device 1200 and the second electronic device 1300.

In an embodiment, the second electronic device 1300 illustrated in FIG. 15B does not have to contact the first electronic device 1200 through a charging pad or the like, and thus may have no charging pad 1510 provided on the exterior thereof. The second electronic device 1300 illustrated in FIG. 15B may have a microphone 1540 and/or a display unit 1550 provided on the exterior thereof, as in the case of the second electronic device 1300 illustrated in FIG. 15A. The microphone 1540 or the display unit 1550 in FIG. 15B performs a function similar to that of the microphone 1520 or the display unit 1530 in FIG. 15A, and detailed descriptions thereof will be omitted herein.

The shape, type, position, and the like of the microphones 1520 and 1540 and the display units 1530 and 1550 illustrated in FIG. 15A and FIG. 15B are simply for helping understanding, and do not limit the scope of the disclosure.

Figure 16:
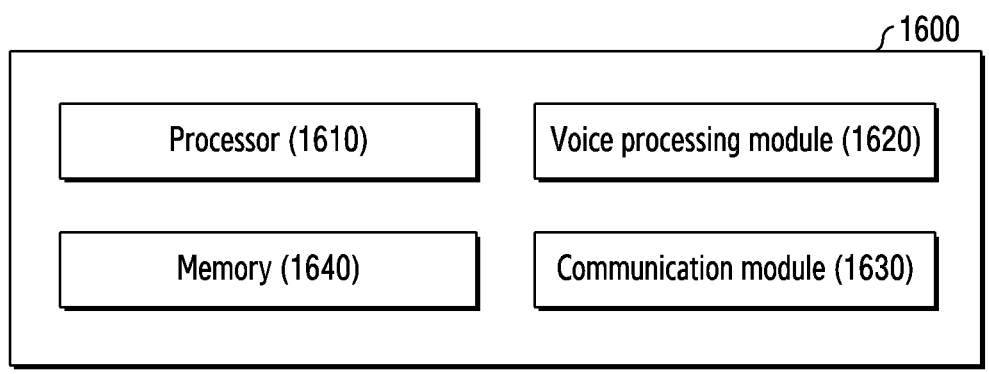
FIG. 16 illustrates a functional configuration of a server according to various embodiments of the disclosure.

FIG. 16 illustrates a functional configuration of a server 1600 according to various embodiments of the disclosure.

Referring to FIG. 16, the server 1600 may include a processor 1610, a voice processing module 1620, a communication module 1630, and a memory 1640. In an embodiment, the server 1600 may be the server 1130 in FIG. 11.

In an embodiment, the processor 1610 may control the overall action of the server 1600. For example, when identification information of a second electronic device 1300 is received from a first electronic device 1200, the processor 1610 may confirm that a short-distance communication channel is established between the first electronic device 1200 and the second electronic device 1300, or that power is transmitted/received therebetween, may transmit a control command for activating the voice recognition function of the first electronic device 1200 to the first electronic device 1200, and may transmit a control command for deactivating the voice recognition function of the second electronic device 1300 to the second electronic device 1300.

In an embodiment, the voice processing module 1620 may analyze data regarding a voice speech received from the first electronic device 1200 or the second electronic device 1300, and may identify the meaning of the user voice command included in the voice speech. For example, the voice processing module 1620 may analyze data regarding a user voice speech (for example, "Hi Bixby, when is the Golden State Warriors game today?"), thereby identifying that the meaning of the user voice command included in the voice speech is a request for specific information (information regarding the match of professional basketball team "Golden State").

In an embodiment, the voice processing module 1620 may be at least one of the automatic speech recognition module 210, the natural language understanding module 220, the path planner module 230, the dialogue manager module 240, the natural language generator module 250, and the text-to-speech module 260 illustrated in FIG. 6.

In an embodiment, the communication module 1630 may transmit data stored in or produced by the server 1600 to an external device (for example, first electronic device 1200 or second electronic device 1300), and may receive data produced by or stored in the external device.

In an embodiment, the memory 1640 may store information regarding multiple electronic devices (for example, first electronic device 1200 and second electronic device 1300) connected to the server 1130 or registered in the server 1130.

In an embodiment, the memory 1640 may associate identification information (for example, device ID) of each of multiple electronic devices with device information (for example, manufacturer information, hardware/software information, input/output attribute, supported specification and standard information, account information, position information, and the like) of each of the multiple electronic devices and then store the same. For example, the memory 1640 may associate identification information of the second electronic device 1300 with device information (for example, manufacturer (Samsung), characteristics (power supply device), standard (WPC), output current (1000 mA), charging voltage (5V), account information (user A), position information (home or living room of user A), input/output attribute (voice input, voice output) and the like) of an external device and then store the same.

In an embodiment, the memory 1640 may at least temporarily update the device information under the control of the processor 1610. For example, when the first electronic device 1200 is connected to the second electronic device 1300 and receives power transmitted from the second electronic device 1300, the memory 1640 may temporarily determine the position information of the first electronic device 1200 based on the position information of the second electronic device 1300. As another example, when the first electronic device 1200 is connected to the second electronic device 1300 and receives power transmitted from the second electronic device 1300, and when the first electronic device 1200 includes a display, the memory 1640 may temporarily update the input/output attribute of the second electronic device 1300 (for example, voice input, voice output→voice input, voice output, image output). The memory 1640 may add, to the updated image output attribute of the second electronic device 1300, information (for example, flag) indicating that the corresponding attribute can be added only when the second electronic device 1300 is connected to the first electronic device 1200.

Figure 17:
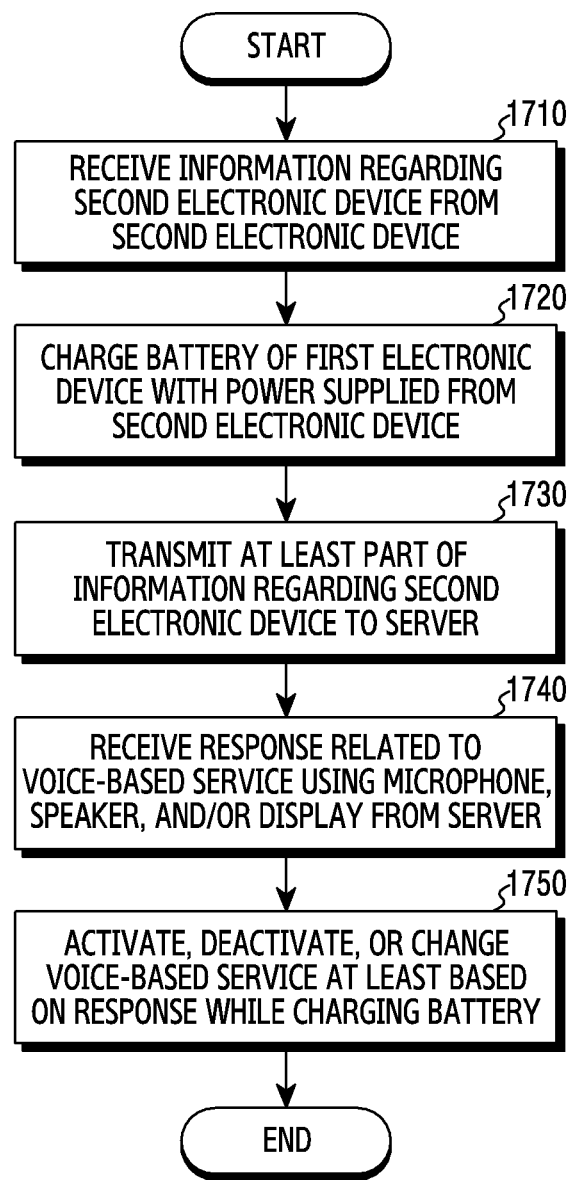
FIG. 17 is a flowchart illustrating an operating order of a first electronic device according to various embodiments of the disclosure.

FIG. 17 is a flowchart illustrating an operating order of a first electronic device according to various embodiments of the disclosure.

The subject of operation in FIG. 17 (first electronic device) may refer to the first electronic device 1200 or the processor 1210 of the first electronic device 1200.

In operation 1710, the first electronic device 1200 may receive information regarding the second electronic device 1300 from the second electronic device 1300. The information regarding the second electronic device 1300 may include unique identification information of the second electronic device 1300. The information regarding the second electronic device 1300 may include hardware/software information of the second electronic device 1300 and input/output attribute information thereof.

For example, when the second electronic device 1300 is a device wirelessly supplying power to the first electronic device 1200 according to an inductive coupling scheme, the first electronic device 1200 may be placed above the charging pad of the second electronic device 1300 and then receive information regarding the second electronic device 1300 from the second electronic device 1300 through short-distance communication.

As another example, when the second electronic device 1300 is a device wirelessly supplying power to the first electronic device 1200 according to a resonant magnetic coupling scheme, the first electronic device 1200 may be positioned in a possible transmission range of the second electronic device 1300 and then receive device information from the second electronic device 1300 through short-distance communication.

In an embodiment, the first electronic device 1200 may receive information regarding the second electronic device 1300 through a charging circuit. In an embodiment, the charging circuit may refer to at least a part of at least one of a power receiver circuit (for example, receiver circuit 21 in FIG. 14), a control circuit 22, and a communication circuit 23.

In another embodiment, the first electronic device 1200 may receive information regarding the second electronic device 1300 through the communication module 1240.

In operation 1720, the first electronic device 1200 may charge the battery (for example, battery 21e in FIG. 14) of the first electronic device 1200 with power supplied from the second electronic device 1300. The first electronic device 1200 may wirelessly receive power from the transmitter coil 11L of the second electronic device 1300 through the wireless charging module 1220 or 21. The first electronic device 1200 may control the wireless charging module 1220 or 21 so as to charge the battery 21e of the first electronic device 1200 with the received power.

In operation 1730, the first electronic device 1200 may transmit at least a part of the information regarding the second electronic device 1300 to a server. The server may be the server 1600. While charging the battery of the first electronic device 1200 with the power supplied from the second electronic device 1300, the first electronic device 1200 may transmit at least a part of the information regarding the second electronic device 1300 to the server 1600. For example, the first electronic device 1200 may transmit identification information of the second electronic device 1300 or input/output attribute information of the second electronic device 1300 to the server 1600.

In operation 1740, the first electronic device 1200 may receive a response related to a voice-based service from the server 1600.

In an embodiment, the voice-based service may be a service using the microphone 1270, the speaker 1260, or the display 1280. For example, the voice-based service may be the user's voice recognition service. The user's voice recognition service may refer to a service of recognizing the user's voice speech and performing a function corresponding to the recognized user's voice speech. For example, when the user's voice speech is "Play Billie Jean by Michael Jackson", the user's voice recognition service may be a function of recognizing the user voice speech, playing the requested music, and outputting the same through the speaker.

In another embodiment, the voice-based service may be a service or a function related to the user's voice recognition service. For example, the voice-based service may be an active noise canceling (ANC) service of the user's voice recognition service.

In an embodiment, the first electronic device 1200 may receive a response related to the voice-based service from the server 1600, in response to operation 1730.

In an embodiment, the first electronic device 1200 may receive a control command related to the voice-based service from the server 1600. For example, the first electronic device 1200 may receive a control command instructing activation of the microphone 1270 and the speaker 1260 of the first electronic device 1200 from the server 1600.

In an embodiment, the first electronic device 1200 may receive a control command related to the voice-based service of the second electronic device 1300 from the server 1600.

In operation 1750, the first electronic device 1200 may activate, deactivate, or change the voice-based service at least based on the response received in operation 1740.

In an embodiment, the first electronic device 1200 may change the sound configuration for performing the voice-based service.

In another embodiment, the first electronic device 1200 may activate or deactivate hardware for performing the voice-based service. For example, when the first electronic device 1200 has received a control command instructing activation of the microphone 1270 and the speaker 1260 of the electronic device in operation 1740, the electronic device may activate the microphone 1270 and the speaker 1260 of the electronic device.

In an embodiment, upon receiving a control command related to the second electronic device 1300 from the server 1600, the first electronic device 1200 may transmit or forward the received control command to the second electronic device 1300.

Figure 18:
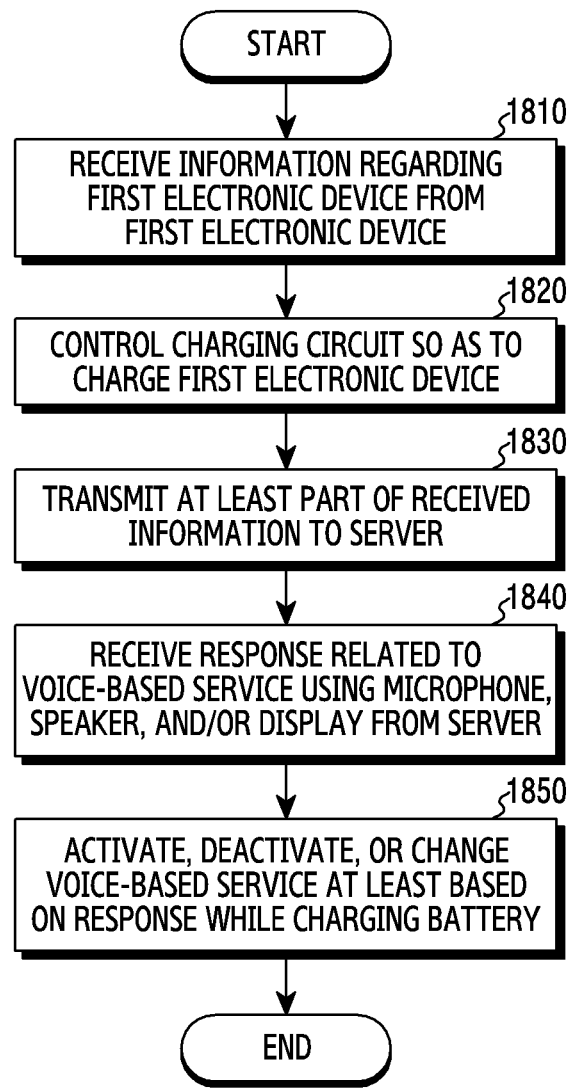
FIG. 18 is a flowchart illustrating an operating order of a second electronic device according to various embodiments of the disclosure.

FIG. 18 is a flowchart illustrating an operating order of a second electronic device according to various embodiments of the disclosure.

The subject of operation in FIG. 18 (second electronic device) may refer to the second electronic device 1300 or the processor 1310 of the second electronic device 1300 in FIG. 13.

In operation 1810, the second electronic device 1300 may receive information regarding the first electronic device 1200 from the first electronic device 1200. In an embodiment, the information regarding the first electronic device 1200 may include unique identification information of the first electronic device 1200. In an embodiment, the information regarding the first electronic device 1200 may include hardware/software information of the first electronic device 1200 and input/output attribute information thereof.

For example, when the second electronic device 1300 is a device wirelessly supplying power to the first electronic device 1200 according to an inductive coupling scheme, the second electronic device 1300 may receive information regarding the first electronic device 1200 placed above the charging pad of the second electronic device 1300, through short-distance communication, from the first electronic device 1200.

In operation 1820, the second electronic device 1300 may control the charging circuit (for example, power generator circuit 11 in FIG. 14) so as to charge the first electronic device 1200. The second electronic device 1300 may control the power generator circuit 11 such that power obtained by the transmitter coil L11 of the second electronic device is transmitted to the first electronic device 1200.

In operation 1830, the electronic device 1300 may transmit at least a part of received information to a server 1600. While providing power to the first electronic device 1200, the second electronic device 1300 may transmit at least a part of the information regarding the first electronic device 1200 to the server 1600. For example, the second electronic device 1300 may transmit identification information of the first electronic device 1200 or input/output attribute information of the first electronic device 1200 to the server 1600.

In operation 1840, the second electronic device 1300 may receive a response related to a voice-based service from the server 1600.

In an embodiment, the voice-based service may be a service using the microphone 1370, the speaker 1360, or the display unit 1530 or 1550. For example, the voice-based service may be the user's voice recognition service. The user's voice recognition service may refer to a service of recognizing the user's voice speech and performing a function corresponding to the recognized user's voice speech.

In an embodiment, the second electronic device 1300 may receive a response related to the voice-based service from first electronic device 1200.

In operation 1850, the second electronic device 1300 may activate, deactivate, or change the voice-based service at least based on the response while charging the battery 21*e* (FIG. 14) of the first electronic device 1200 (or while providing power to the first electronic device 1200). For example, upon receiving a control command instructing deactivation of the microphone 1370 and the speaker 1360 of the second electronic device 1300 in operation 1840, the second electronic device 1300 may deactivate the microphone 1370 and the speaker 1360 of the second electronic device 1300.

Figure 19:
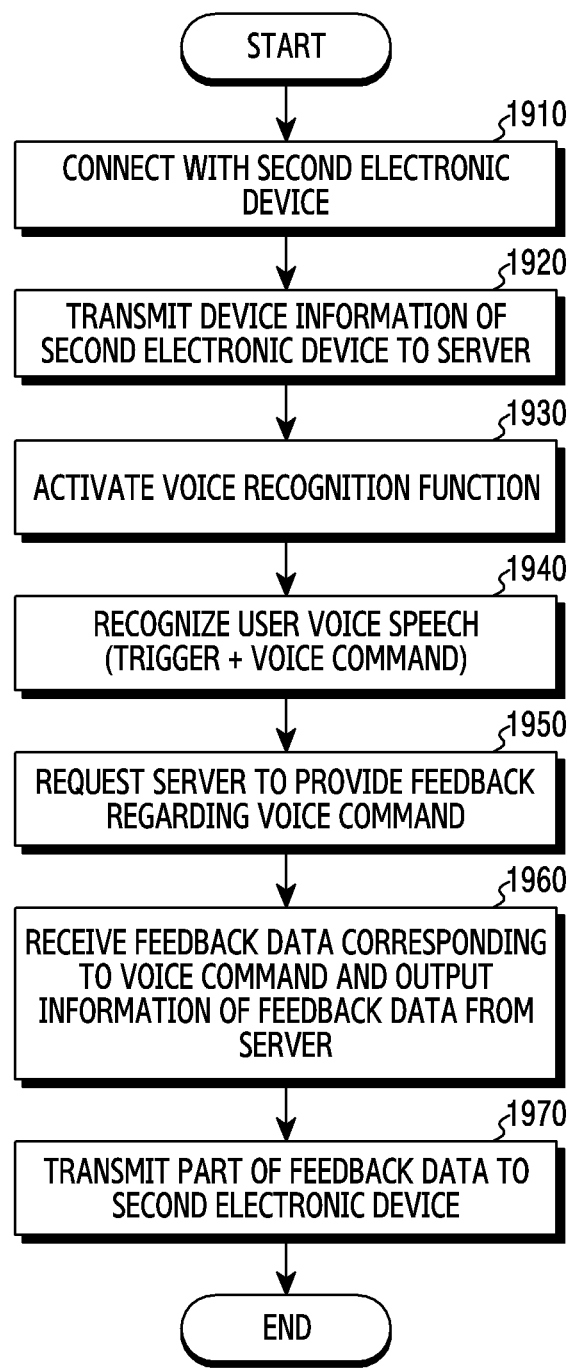
FIG. 19 is a flowchart illustrating an operating order of a first electronic device according to various embodiments of the disclosure.

FIG. 19 is a flowchart illustrating an operating order of a first electronic device according to various embodiments of the disclosure.

The subject of operation in FIG. 19 (first electronic device) may refer to the first electronic device 1200 or the processor 1210 of the first electronic device 1200.

In operation 1910, the first electronic device 1200 may be connected to a second electronic device 1300. The first electronic device 1200 may be connected to the second electronic device 1300 in a wired or wireless manner. The first electronic device 1200 may deliver a power supply request signal to the second electronic device 1300 by using a second communication circuit (second communication circuit 23*b* in FIG. 14), thereby attempting to establish connection with the second electronic device 1300. The first electronic device 1200 may receive a response to the power supply request from the second electronic device 1300 by using the second communication circuit 23b, thereby establishing connection with the second electronic device 1300. The first electronic device 1200 connected to the second electronic device 1300 may establish a short-distance communication channel with the second electronic device 1300.

In an embodiment, when the second electronic device 1300 is an inductive coupling-type power supply device, the first electronic device 1200 may attempt to establish connection with the second electronic device 1300 in response to contacting the surface or housing of the second electronic device 1300. In another embodiment, when the second electronic device 1300 is a resonant magnetic coupling-type power supply device, the first electronic device 1200 may attempt to establish connection with the second electronic device 1300 in response to recognizing that the first electronic device 1200 is currently included in the possible transmission range of the second electronic device 1300.

In an embodiment, the first electronic device 1200 may receive identification information of the second electronic device 1300 from the second electronic device 1300 together with a response to the power supply request from the second electronic device 1300, or after receiving the response. The first electronic device 1200 may receive identification information of the second electronic device 1300 from the second electronic device 1300 together with an affirmative response to the power supply request from the second electronic device 1300, or after receiving the affirmative response. The identification information of the second electronic device 1300 may be information unique to the second electronic device 1300. For example, the first electronic device 1200 may receive identification information of the second electronic device 1300, such as the device identification (ID) of the second electronic device 1300. The first electronic device 1200 may receive not only identification information of the second electronic device 1300, but also information indicating hardware/software characteristics of the second electronic device 1300. For example, the first electronic device 1200 may receive information regarding the second electronic device 1300, such as the manufacturer, the product name, the product code, the operating system installed in the product, and the like. The first electronic device 1200 may receive not only identification information of the second electronic device 1300 and information indicating characteristics of the second electronic device 1300, but also information regarding the user of the second electronic device 1300. For example, the first electronic device 1200 may receive information regarding the user designated in the second electronic device 1300 (for example, information regarding the account of the user designated in the second electronic device 1300).

In an embodiment, the first electronic device 1200 may transmit identification information of the first electronic device 1200 to the server 1600 after receiving a response to the power supply request from the second electronic device 1300, or before receiving the response. The first electronic device 1200 may transmit, to the server 1600, identification information of the first electronic device 1200, information indicating characteristics of the first electronic device 1200, or information regarding the user of the first electronic device 1200.

In an embodiment, the first electronic device 1200 or the second electronic device 1300 may deliver information according to a communication scheme determined according to the wireless charging scheme of the second electronic device 1300. For example, when the second electronic device 1300 is an inductive coupling-type power supply device, the first electronic device 1200 or the second electronic device 1300 may deliver information according to a contact-type communication scheme (for example, NFC). As another example, when the second electronic device 1300 is a resonant magnetic coupling-type power supply device, information may be delivered by using an out-of-band communication scheme or an in-band communication scheme.

In operation 1920, the first electronic device 1200 may transmit identification information of the second electronic device 1300 to the server 1600. By transmitting identification information of the second electronic device 1300 to the server 1600, the first electronic device 1200 may inform the server 1600 that there is ongoing transmission/reception of power between the first electronic device 1200 and the second electronic device 1300, or that a short-distance communication channel is established therebetween.

In an embodiment, the first electronic device 1200 may transmit identification information of the first electronic device 1200 and/or state information of the first electronic device 1200 to the server 1600, together with the identification information of the second electronic device 1300. For example, the first electronic device 1200 may transmit identification information of the first electronic device 1200, such as the device ID of the first electronic device 1200, the pin code thereof, or the MAC address thereof, to the server 1600. As another example, the first electronic device 1200 may transmit, to the server 1600, information regarding the battery state of the first electronic device 1200, the operating mode (for example, sleep mode, idle mode, or active mode) of the first electronic device 1200, or the output state (for example, whether or not a sound is currently output through the speaker 1260 of the first electronic device 1200, or whether or not an image is currently output through the display 1280 of the first electronic device 1200), or the like.

In an embodiment, the first electronic device 1200 may additionally transmit information regarding power transmission/reception to the server 1600. For example, the first electronic device 1200 may transmit information regarding the power reception state (for example, whether or not power is currently received, information regarding the reception ratio if power is currently received, or the like) to the server 1600.

In operation 1930, the first electronic device 1200 may activate a voice recognition function. The voice recognition function may include a function of converting sounds from various sound sources input to the microphone 1270 of the first electronic device 1200 from outside the first electronic device 1200 (for example, user voice, external noise, sound output from the first electronic device 1200, and the like). The first electronic device 1200 may activate the voice recognition function by activating the microphone 1270 and the voice recognition module 1230 of the first electronic device 1200. Following activation of the voice recognition function, the first electronic device 1200 may enter a mode in which the same stands by to receive a user voice speech.

In an embodiment, the first electronic device 1200 may activate the voice recognition function based on a configuration prestored in the memory 1160 of the first electronic device 1200. For example, the memory 1160 of the first electronic device 1200 may have an instruction stored therein, which activates the voice recognition function if connection between the first electronic device 1200 and the second electronic device 1300 is detected.

In another embodiment, the first electronic device 1200 may activate the voice recognition function based on a control command received from the server 1600. The first electronic device 1200 may transmit identification information of the second electronic device 1300 to the server 1600 and then receive a control command instructing activation of the voice recognition function of the first electronic device 1200 from the server 1600. The first electronic device 1200 may activate the voice recognition function of the first electronic device 1200 based on the control command received from the server 1600.

In operation 1940, the first electronic device 1200 may recognize a user voice speech. The first electronic device 1200 may recognize a user voice speech by using the activated voice recognition function of the first electronic device 1200. The user voice speech may include a trigger sound and a voice command. The first electronic device 1200 may use the activated microphone 1270 to convert a sound input to the microphone 1270 into an electric signal. The first electronic device 1200 may determine whether or not the converted electric signal includes a first signal exhibiting a matching ratio equal to or larger than a predetermined value with regard to a prestored signal pattern. When it is determined that the converted electric signal does not include the first signal, the first electronic device 1200 may maintain the mode in which the same stands by to receive a user voice speech. If the converted electric signal includes the first signal, the first electronic device 1200 may recognize (or determine) a second signal following the first signal. The first electronic device 1200 may determine that the signal following the first signal is a second signal, until output equal to or lower than a predetermined value continues for a period of time equal to or longer than a predetermined value. The first signal may refer to a trigger sound, and the second signal may refer to a voice command. For example, the first electronic device 1200 may recognize a user voice speech such as "Hi Bixby, when is the Golden State Warriors game today?", "Hi Bixby" may correspond to the trigger sound, and "when is the Golden State Warriors game today?" may correspond to the voice command.

In operation 1950, the first electronic device 1200 may request the server 1600 to provide feedback data regarding the voice command. The first electronic device 1200 may transmit an electric signal (second signal) corresponding to the voice command, among electric signals obtained by converting the user voice speech recognized in operation 1940, to the server 1600. Together with the electric signal (first signal) corresponding to the voice command, the first electronic device 1200 may transmit a signal requesting provision of specific information to the server 1600, if the voice command is a speech inquiring specific information.

In operation 1960, the first electronic device 1200 may receive feedback data regarding the voice command and output information of the feedback data from the server 1600. In an embodiment, if the voice command is a speech inquiring about (or requesting) specific information, the first electronic device 1200 may receive the specific information (hereinafter, referred to as feedback data) encoded in a specific output format (for example, sound or image) from the server 1600. For example, if the voice command requests provision of Golden State Warriors game information, the first electronic device 1200 may receive Golden State Warriors game information encoded in the sound format from the server 1600. In an embodiment, the first electronic device 1200 may request specific information without designating the output format, and may receive feedback data in a first format (for example, sound) or both feedback data in a first format (for example, sound) and feedback data in a second format (for example, voice) from the server 1600. For example, the first electronic device 1200 may request Golden State Warriors game information without designating the format, and may receive feedback data in the image format from the server 1600. As another example, the first electronic device 1200 may receive feedback data in the image format and feedback data in the sound format.

In an embodiment, the output information of the feedback data may include information regarding the device to output the feedback data. For example, the first electronic device 1200 may receive output information indicating that the first portion of the feedback data is to be output by the first electronic device 1200, and the second portion of the feedback data is to be output by the second electronic device 1300.

In another embodiment, the output information of the feedback data may include information regarding the condition to output the feedback data. For example, assuming that the first electronic device 1200 is currently charged by the second electronic device 1300, the first electronic device 1200 may receive output information indicating that the first portion of the feedback data is to be output by the first electronic device 1200, and the second portion of the feedback data is to be output by the second electronic device 1300. As another example, assuming that the first electronic device 1200 is currently charged by the second electronic device 1300, the first electronic device 1200 may receive output information indicating that the entire portion of the feedback data is to be output by the first electronic device 1200. As another example, assuming that the first electronic device 1200 is not currently charged by the second electronic device 1300, the first electronic device 1200 may receive output information indicating that the entire portion of the feedback data is to be output by the second electronic device 1300.

In operation 1970, the first electronic device 1200 may transmit a part of the feedback data received from the server 1600 to the second electronic device 1300. The first electronic device 1200 may transmit a part of the feedback data partially based on the output information received in operation 1360. For example, when the first electronic device 1200 has received, in operation 1960, output information indicating that the first portion of the feedback data is to be output by the first electronic device 1200, and the second portion of the feedback data is to be output by the second electronic device 1300, the first electronic device 1200 may transmit the second portion of the feedback data to the second electronic device 1300.

In an embodiment, the first electronic device 1200 may transmit at least a part of the received output information to the second electronic device 1300. For example, if the first electronic device 1200 is not currently charged by the second electronic device 1300, and if received output information indicates that the entire portion of the feedback data is to be output by the second electronic device 1300, the first electronic device 1200 may transmit the entire feedback data and the received output information to the second electronic device 1300.

Figure 20:
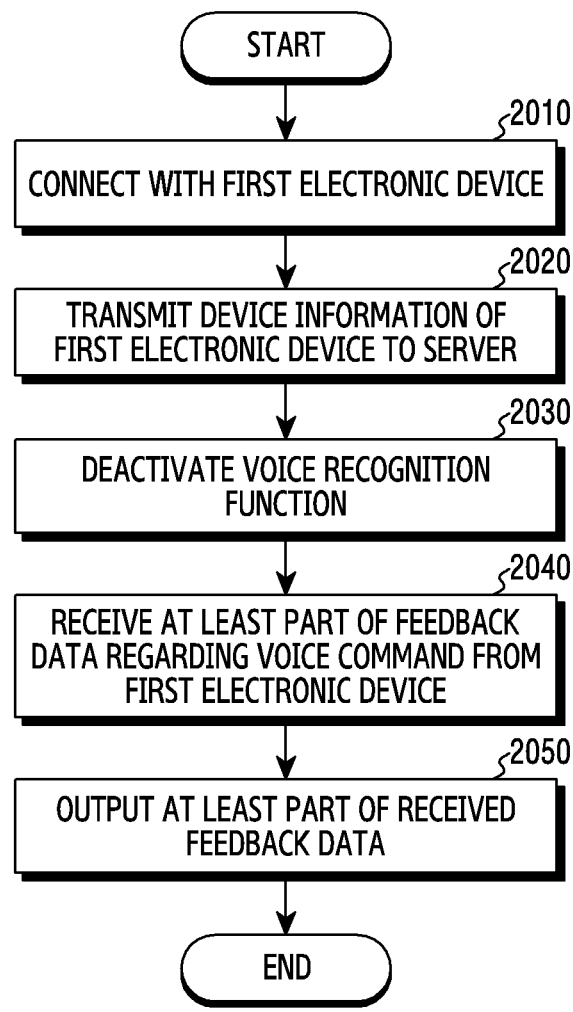
FIG. 20 is a flowchart illustrating an operating order of a second electronic device according to various embodiments of the disclosure.

FIG. 20 is a flowchart illustrating an operating order of a second electronic device according to various embodiments of the disclosure.

The subject of operation in FIG. 20 (second electronic device) may refer to the second electronic device 1300 or the processor 1310 of the second electronic device 1300.

In operation 2010, the second electronic device 1300 may be connected to the first electronic device 1200. The second electronic device 1300 may receive a signal requesting power supply from the first electronic device 1200. The second electronic device 1300 may transmit a response to the power supply request based on at least one of the amount of power remaining in the battery of the second electronic device 1300, the standard supported by the second electronic device 1300, or the device type supported by the second electronic device 1300. By transmitting an affirmative response to the power supply request, the second electronic device 1300 may establish or form connection with the first electronic device 1200.

In an embodiment, the second electronic device 1300 may transmit identification information of the first electronic device 1200 to the server 1600 after transmitting the affirmative response to the first electronic device 1200 or before transmitting the affirmative response. The second electronic device 1300 may transmit identification information of the second electronic device 1300 to the server 1600 concurrently with transmitting an affirmative response to the first electronic device 1200, or after transmitting the affirmative response.

In operation 2020, the second electronic device 1300 may transmit identification information of the first electronic device 1200 to the server 1600. By transmitting the identification information of the first electronic device 1200 to the server 1600, the second electronic device 1300 may inform the server 1600 that power transmission/reception currently occurs between the second electronic device 1300 and the first electronic device 1200, or that a short-distance communication channel is established therebetween.

In an embodiment, the second electronic device 1300 may transmit identification information of the second electronic device 1300 and/or state information of the second electronic device 1300 to the server 1600, together with identification information of the first electronic device 1200. For example, the second electronic device 1300 may transmit, to the server 1600, information regarding the operating mode (for example, normal charging mode, rapid charging mode, or the like) of the second electronic device 1300, output state information of the second electronic device 1300 (for example, whether or not a sound is currently output through the speaker 1360 of the second electronic device 1300), or the like.

In an embodiment, the second electronic device 1300 may additionally transmit information regarding power transmission/reception to the server 1600. For example, the second electronic device 1300 may transmit, to the server 1600, information regarding the power transmission state (for example, whether or not power is currently transmitted, the rate of transmission, if power is currently transmitted, or the like).

In operation 2030, the second electronic device 1300 may deactivate the voice recognition function. The second electronic device 1300 may deactivate the microphone 1370 and/or the voice recognition module 1330 of the second electronic device 1300, thereby deactivating the voice recognition function of the second electronic device 1300.

In an embodiment, the second electronic device 1300 may deactivate the voice recognition function based on a configuration prestored in the memory 1350 of the second electronic device 1300. For example, the memory 1350 of the second electronic device 1300 may have an instruction stored therein, which deactivates the voice recognition function if connection between the second electronic device 1300 and the first electronic device 1200 is detected.

In another embodiment, the second electronic device 1300 may deactivate the voice recognition function based on a control command received from the server 1600. The second electronic device 1300 may transmit identification information of the first electronic device 1200 to the server 1600 and then receive a control command instructing deactivation of the voice recognition function of the second electronic device 1300 from the server 1600. The second electronic device 1300 may deactivate the voice recognition function of the second electronic device 1300 based on the control command received from the server 1600.

In operation 2040, the second electronic device 1300 may receive at least a part of feedback data regarding the voice command from the first electronic device 1200. The voice command may be included in the voice speech recognized by the first electronic device 200, the voice recognition function of which has been activated.

In an embodiment, without requesting the server 1600 to provide feedback data regarding the voice command (or while the voice recognition function is deactivated), the second electronic device 1300 may receive at least a part of the feedback data regarding the voice command.

In an embodiment, at least a part of the feedback data may indicate the format (for example, second format (sound)) of a part of the feedback data including multiple output formats (for example, first format (image) and second format (sound)). For example, if the feedback data includes image data and sound data, the second electronic device 1300 may receive sound data from the first electronic device 1200.

In an embodiment, the second electronic device 1300 may receive at least a part of the feedback data from the server 1600, not from the first electronic device 1200.

In operation 2050, the second electronic device 1300 may output at least a part of the feedback data received in operation 2040.

In an embodiment, the second electronic device 1300 may output at least a part of the received feedback data according to the format thereof. For example, if the format of at least a part of the received feedback data is a sound format, the processor 1310 of the second electronic device 1300 may control the speaker 1360 so as to output part of the received feedback data.

Figure 21:
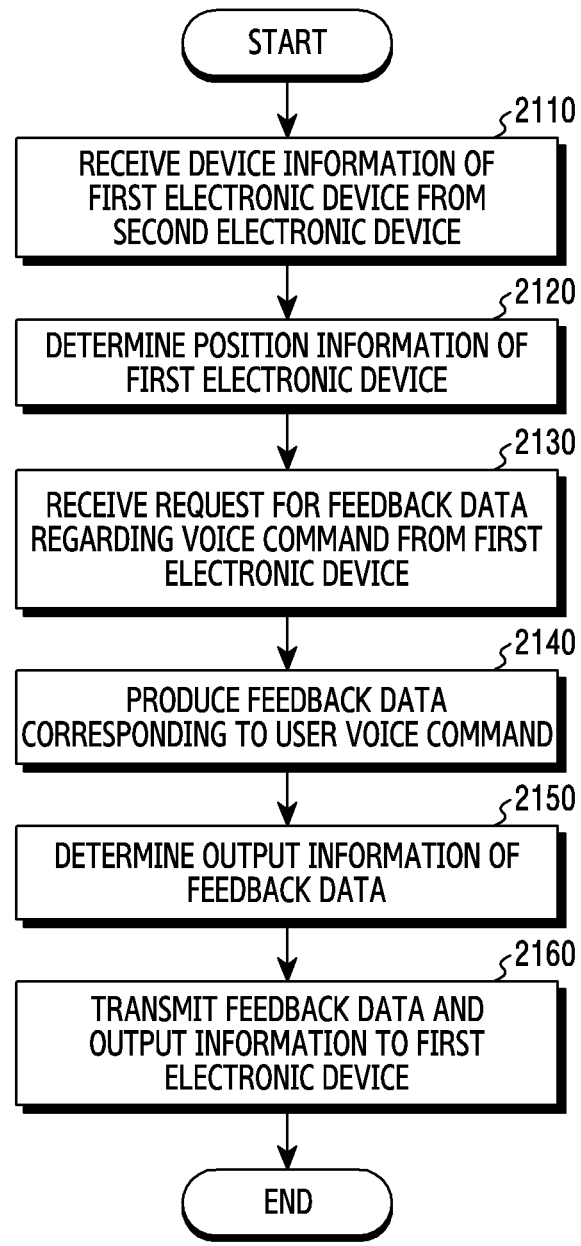
FIG. 21 is a flowchart illustrating an operating order of a server according to various embodiments of the disclosure.

FIG. 21 is a flowchart illustrating an operating order of a server according to various embodiments of the disclosure.

The subject of operation in FIG. 21 (server) may refer to the server 1600 or the processor 1610 of the processor 1610 of the server 1600.

In operation 2110, the server 1600 may receive identification information of the first electronic device 1200 from the second electronic device 1300.

Although not illustrated, the server 1600 may receive identification information of the second electronic device 1300 from the first electronic device 1200 within a preconfigured time interval range from the time at which identification information of the first electronic device 1200 is received from the second electronic device 1300.

In an embodiment, if the server 1600 has received identification information of the first electronic device 1200 from the second electronic device 1300 (or if identification information of the second electronic device 1300 is received from the first electronic device 1200, or if identification information of the first electronic device 1200 is received from the second electronic device 1300, and if identification information of the second electronic device 1300 is received from the first electronic device 1200), the server 1600 may confirm that a short-distance communication channel is established or formed between the first electronic device 1200 and the second electronic device 1300.

In an embodiment, the server 1600 may receive state information or information regarding power transmission/reception from the first electronic device 1200 or the second electronic device 1300. For example, the server 1600 may receive output state information of the first electronic device 1200 (for example, information indicating that a sound is being output through the speaker 1260 of the first electronic device 1200) from the first electronic device 1200. As another example, the server 1600 may receive output state information of the second electronic device 1300 (for example, information indicating that a sound is not being output through the speaker 1360 of the second electronic device 1300) from the second electronic device 1300. As another example, the server 1600 may receive information regarding the power reception state from the first electronic device 1200 and may receive information regarding the power transmission state from the second electronic device 1300. The server 1600 may determine the power transmission efficiency based on the received power transmission/reception information.

In an embodiment, the server 1600 may identify device information of the first electronic device 1200 and device information of the second electronic device 1300. For example, the server 1600 may identify device information of the first electronic device 1200 and device information of the second electronic device 1300 based on received identification information. The server 1600 may associate identification information (for example, device ID) of each of multiple devices with device information (for example, device manufacturer information, performance information, hardware/software information, supported specification and standard information, account information, position information, and the like) of each of the multiple devices and then store the same in the memory 1640 of the server 1600. The server 1600 may retrieve identification information of multiple devices stored in the memory 1640 of the server 1600, thereby identifying device information of the first electronic device 1200 and device information of the second electronic device 1300. For example, upon receiving identification information of the second electronic device 1300 from the first electronic device 1200, the server 1600 may identify the device information (for example, manufacturer (Samsung), characteristics (power supply device), standard (WPC), output current (1000 mA), charging voltage (5V), account information (user A), position information (home or living room of user A), and the like) of the second electronic device 1300, based on the received identification information of the second electronic device 1300. As another example, upon receiving identification information of the first electronic device 1200 from the first electronic device 1200, the server 1600 may identify device information (for example, manufacturer (Samsung), characteristics (portable communication terminal), account information (user A), and the like) of the first electronic device 1200, based on the received identification information of the first electronic device 1200.

In operation 2120, the server 1600 may determine position information of the first electronic device 1200. In an embodiment, the server 1600 may determine position information of the first electronic device 1200 based on the position information of the second electronic device 1300 identified in operation 2110. The server 1600 may determine position information of the first electronic device 1200, which has not been determined, or may newly update existing position information of the first electronic device 1200.

In an embodiment, the server 1600 may determine position information of the first electronic device 1200 based on the account information of the first electronic device 1200 and the second electronic device 1300 identified in operation 2110. For example, if the account of the first electronic device 1200 is identical to the account of the second electronic device 1300, the server 1600 may determine position information of the first electronic device 1200 based on the position information of the second electronic device 1300. As another example, if the account of the first electronic device 1200 is associated with the account of the second electronic device 1300, the server 1600 may determine position information of the first electronic device 1200 based on the position information of the second electronic device 1300.

In operation 2130, the server 1600 may receive a request for feedback data regarding the voice command from the first electronic device 1200. The server 1600 may receive a request for provision of data regarding a user voice command and specific information regarding the user voice command from the first electronic device 1200. For example, the server 1600 may receive a request for provision of an electric signal obtained by converting a user voice command such as "When is the Golden State Warriors game today?" and specific information (for example, Golden State game information) regarding the user voice command.

In an embodiment, the server 1600 may receive a request for feedback data regarding the voice command from the second electronic device 1300.

In operation 2140, the server 1600 may produce feedback data corresponding to the user voice command received in operation 2130.

In an embodiment, the server 1600 may analyze the received user voice command, thereby acquiring requested specific information. For example, the server 1600 may search through the memory stored in the server 1600 or make a request to another server connected to the server 600, thereby acquiring the requested specific information (for example, Golden State Warriors game information).

In an embodiment, the server 1600 may determine the output format of the acquired information. The server 1600 may determine the output format of the acquired information based on input/output attribute information of the first electronic device 1200 and the second electronic device 1300, or hardware/software information thereof. For example, if neither the first electronic device 1200 nor the second electronic device 1300 includes a display, the server 1600 may determine that the output format of the acquired information is "sound". As another example, if it is confirmed that the first electronic device 1200 includes a display 1280, and the second electronic device 1300 includes no display, the server 1600 may determine that the output format of the acquired information is "image" and "sound".

In an embodiment, the server 1600 may determine the output format of the acquired information based on state information of the first electronic device 1200 and the second electronic device 1300. For example, if the server 1600 has received in operation 2110 information indicating that no image is currently output through the display 1280 of the first electronic device 1200 including a display 1280 and a speaker 1260, the server 1600 may determine that the output format of the acquired information is "image". For example, if the server 1600 has received in operation 2110 information indicating that an image is currently output through the display of the first electronic device 1200 including a display and a speaker, and that no sound is currently output through the speaker of the second electronic device 1300 including a speaker, the server 1600 may determine that the output format of the acquired information is "sound".

In an embodiment, the server 1600 may produce feedback data based on the acquired information and the determined output format. The server 1600 may encode the acquired information in the determined output format, thereby producing feedback data. For example, the server 1600 may encode the acquired Golden State game information in the image format and/or sound format, thereby producing feedback data.

In operation 2150, the server 1600 may determine output information of the feedback data. In an embodiment, the server 1600 may include information regarding the device to output the feedback data or information regarding the condition to output the feedback or the output environment (for example, volume size, popup window size, and the like) of the feedback data.

In an embodiment, the server 1600 may determine the output information of the feedback data based on device information of the first electronic device 1200 and the second electronic device 1300. For example, when acquired Golden State game information has been encoded in the image format and the sound format, the server 1600 may determine, based on device information of the first electronic device 1200 (for example, information indicating that the first electronic device 1200 includes a display, and that the second electronic device 1300 includes a speaker), output information indicating that data encoded in the image format is to be output by the first electronic device 1200, and data encoded in the sound format is to be output by the second electronic device 1300. As another example, when acquired Golden State game information has been encoded in the sound format, the server 1600 may determine, based on device information of the first electronic device 1200 and the second electronic device 1300 (for example, information indicating that the playback frequency band of the speaker of the first electronic device 1200 is 20-2000 Hz, and the playback frequency band of the speaker of the second electronic device 1300 is 100-5000 Hz), output information indicating that the first portion (high-pitch sound band portion, for example, 3000-5000 Hz) of data encoded in the sound format is to be output by the second electronic device 1300, and the second portion (low-pitch sound band portion, for example, 20-3000 Hz) of the data encoded in the sound format is to be output by the first electronic device 1200. The server 1600 may use the overlapping output attribute that the first electronic device 1200 and the second electronic device 1300 have, thereby providing an expanded output function (for example, stereo output function using the speaker of the first electronic device 1200 and the speaker of the second electronic device 1300).

In an embodiment, the server 1600 may determine output information based on state information of the first electronic device 1200 or the second electronic device 1300. For example, if identified output state information indicates that a sound is being output through the speaker 1260 of the first electronic device 1200, the server may determine output information indicating that feedback data is to be output with a volume higher than a reference value by a predetermined ratio. As another example, if identified output state information indicates that an image is being output through the display 1480 of the first electronic device 1200, the server 1600 may determine output information indicating that feedback data is to be displayed by using a popup window having a size smaller than a reference value by a predetermined ratio.

In an embodiment, the server 1600 may determine output information based on a value related to a user voice speech. The server 1600 may identify that noise equal to or higher than a reference value is included in the user voice speech data received in operation 2130. When noise equal to or higher than a reference value is included, the server 1600 may determine output information indicating that feedback data is to be output with a volume higher than a reference value by a predetermined ratio.

In an embodiment, the server 1600 may produce feedback data corresponding to a user voice command by using a voice recognition or voiceprint recognition method, and may determine output information of the feedback data. For example, the server 1600 may identify account information related to the user voice command through voiceprint recognition, and may determine the electronic device related to the identified account information. For example, the server 1600 may identify that the voice command belongs to user A and is related to the account of user A, and may determine a new electronic device (for example, third electronic device 1300-1 in FIG. 24) other than the first electronic device 1200 and the second electronic device 1300 as an output device.

In operation 2160, the server 1600 may transmit feedback data and output information to the first electronic device 1200. The server 1600 may transmit the entire feedback data to the first electronic device 1200. In addition, the server 1600 may transmit output information, together with the entire feedback data, to the first electronic device 1200 such that a part of the feedback data can be transmitted from the first electronic device 1200 to the second electronic device 1300. For example, when the server 1600 has produced feedback data by encoding the same in image and sound formats, the server 1600 may output information indicating that the entire feedback data is to be transmitted to the first electronic device 1200, that data encoded in the image format is to be output by the first electronic device 1200, and that data encoded in the sound format is to be output by the second electronic device 1300.

Figure 22:
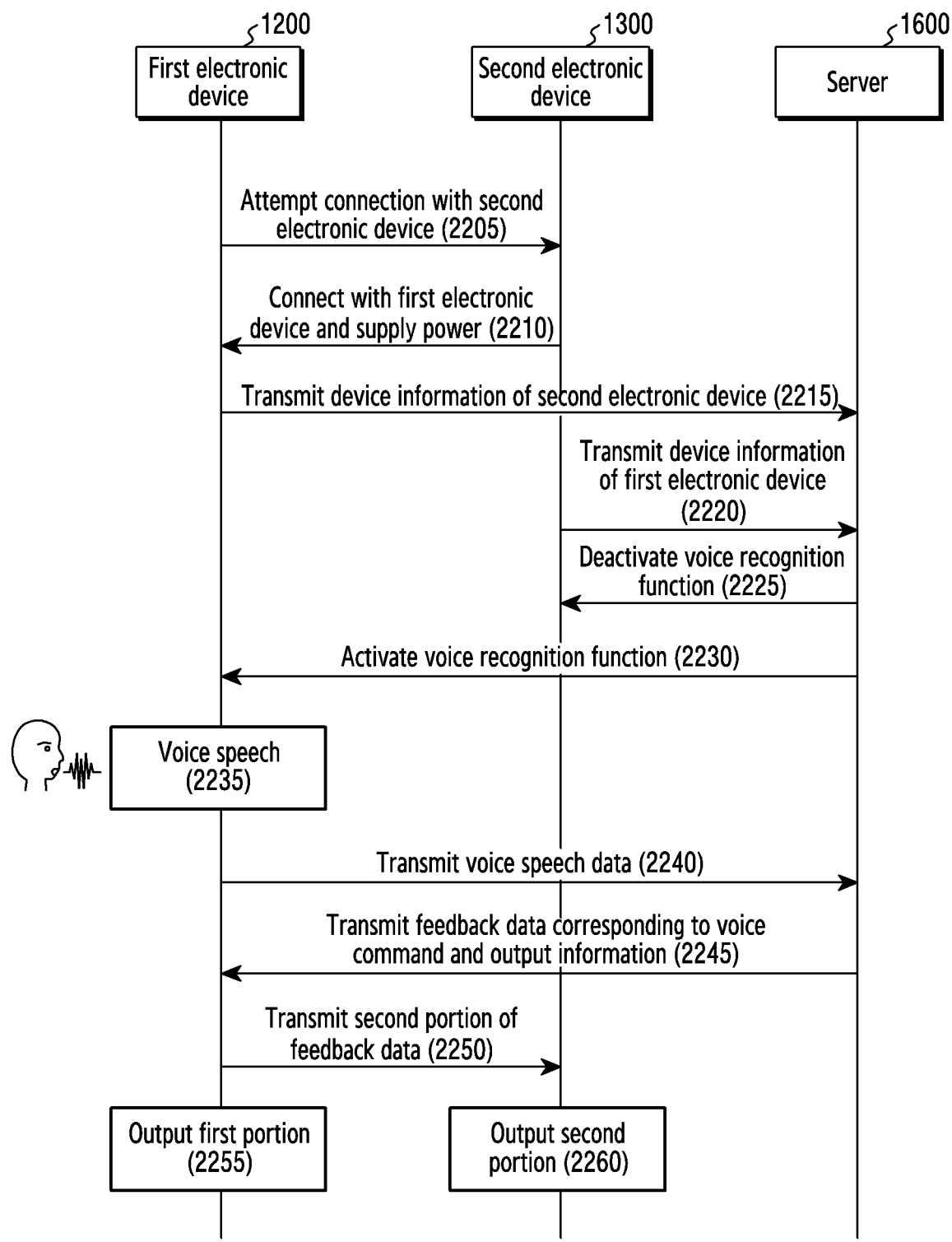
FIG. 22 is a mutual signal flowchart illustrating an operating order of a first electronic device, a second electronic device, and a server according to various embodiments of the disclosure.

FIG. 22 is a mutual signal flowchart illustrating an operating order of a first electronic device 1200, a second electronic device 1300, and a server 1600 according to various embodiments of the disclosure.

FIG. 22 may correspond to a single diagram illustrating, in a combined manner, respective operations of the first electronic device 1200, the second electronic device 1300, and the server 1600 illustrated in FIG. 19 to FIG. 21.

In operation 2205, the first electronic device 1200 may attempt to establish connection with the second electronic device 1300. For example, the first electronic device 1200 may deliver a signal requesting power supply to the second electronic device 1300 by using the second communication circuit 23_b_ of the wireless charging module 1420, thereby attempting to establish connection with the second electronic device 1300.

In operation 2210, the second electronic device 1300 may be connected to the first electronic device 1200, and may supply power to the first electronic device 1200.

In an embodiment, the second electronic device 1300 may communicate with the first communication circuit 23_a_ of the first electronic device 1200 through the first communication circuit 13 by using the same frequency as the frequency used by the transmitter coil 11L for power delivery (for example, in-band scheme).

In another embodiment, the second electronic device 1300 may communicate with the second communication circuit 23_b_ of the first electronic device 1200 through the second communication circuit 13_b_ by using a frequency different from the frequency used by the transmitter coil 11L for power delivery (out-band scheme).

For example, the second electronic device 1300 may transmit an affirmative response to the power supply request to the first electronic device 1200, through the first communication circuit 13_a_ or the second communication circuit 13_b_, thereby connecting with the first electronic device

1200. In addition, the second electronic device 1300 may control the power generator circuit 11*b* such that power obtained by the transmitter coil 11L is transmitted to the first electronic device 1200.

In operation 2215, the first electronic device 1200 may transmit identification information of the second electronic device 1300 to the server 1600. For example, the first electronic device 1200 may receive identification information of the second electronic device 1300 from the second electronic device 1300 concurrently with receiving a response to the power supply request from the second electronic device 1300, or after receiving the response. In addition, the first electronic device 1200 may transmit the identification information of the second electronic device 1300 received from the second electronic device 1300 to the server 1600. In an embodiment, the first electronic device 1200 may transmit identification information of the first electronic device 1200 to the server 1600.

In operation 2220, the second electronic device 1300 may transmit identification information of the first electronic device 1200 to the server 1600. For example, the second electronic device 1300 may receive identification information of the first electronic device 1200, together with a power supply request, from the first electronic device 1200. In addition, the second electronic device 1300 may transmit the identification information of the first electronic device 1200 received from the first electronic device 1200 to the server 1600. In an embodiment, the second electronic device 1300 may transmit identification information of the second electronic device 1300 to the server 1600.

In an embodiment, the order of performing operation 2215 and operation 2220 may be switched.

In an embodiment, operation 2215 and operation 2220 may not be necessarily performed together. In other words, only one of operation 2215 and operation 2220 may be performed. For example, if operation 2215 is performed, operation 2220 may not be performed; and if operation 2220 is performed, operation 2215 may not be performed.

In operation 2225 and/or operation 2230, the server 1600 may transmit a signal for activating, deactivating, or changing the voice-based service of the first electronic device 1200 and/or the second electronic device 1300, in response to one of operation 2215 or operation 2220. For example, the server 1600 may transmit a control command for activating the voice recognition function of the first electronic device 1200, and deactivating the voice recognition function of the second electronic device 1300. As another example, the server 1600 may transmit a control command for deactivating the microphone 1370 and the voice recognition module 1330 of the second electronic device 1300 to the second electronic device 1300. As another example, the server 1600 may transmit a signal for activating the microphone 1270 and the voice recognition module 1230 of the first electronic device 1200 to the first electronic device 1200. The order of operation of operation 2425 and operation 2430 may be switched.

In an embodiment, the server 1600 may transmit a signal for deactivating the voice recognition function of the second electronic device 1300 through the first electronic device 1200. In another embodiment, the server 1600 may transmit a signal for activating the voice recognition function of the first electronic device 1200 through the second electronic device 1300.

As another example, in operation 2225, the server 1600 may transmit a signal for designating a specific usage to the speaker 1360 of the second electronic device 1300. A signal for controlling the speaker 1360 of the second electronic device 1300 may be transmitted such that, when a sound related to a music streaming service is being output through the speaker 1360 of the second electronic device 1300, the speaker 1360 of the second electronic device 1300 solely plays the sound related to the music streaming sound.

As another example, in operation 2230, the server 1600 may transmit a signal for designating a specific usage to the speaker 1260 of the first electronic device 1200. The server 1600 may transmit a signal to the first electronic device 1200 such that, if the first electronic device 1200 later receives feedback data regarding a voice command from the server 1600, the received feedback data is to be output through the speaker 1260 of the first electronic device 1200.

In operation 2235, the first electronic device 1200 may recognize the user's voice speech. The first electronic device 1200 may recognize the user's voice speech while the voice recognition function is activated, or while the same stands by to receive a user voice speech. The user's voice speech may include a trigger sound and a voice command. For example, the user's voice speech may be "Hi, Bixby, when is the Golden State Warriors game today?". The first electronic device 1200 may convert the user voice speech input to the activated microphone 1270 into an electric signal and may determine whether or not the converted electric signal includes a first signal (electric signal corresponding to "Hi, Bixby") exhibiting a matching ratio equal to or higher than a predetermined value with a prestored signal pattern. If the first signal is included, the first electronic device 1200 may recognize the second signal (electric signal corresponding to "when is the Golden State Warriors game today?"), which follows the first signal, as an electric signal corresponding to the user voice command.

In operation 2240, the first electronic device 1200 may transmit the user's voice speech data to the server 1600. The voice speech data may be an electric signal (second signal) corresponding to the user voice command, or electric signals (first signal and second signal) corresponding to the trigger sound and the user voice command. The first electronic device 1200 may additionally transmit a signal requesting provision of information corresponding to the user voice command to the server 1600.

In operation 2245, the server 1600 may transmit feedback data corresponding to the voice command and output information to the first electronic device 1200.

In an embodiment, if the voice command is a request for provision of specific information (for example, Golden State game information), the feedback data may be data obtained by encoding specific information in a designated format. For example, the feedback data may be data obtained by encoding Golden State game data in a sound format.

In an embodiment, the output information may include information regarding the device to output the feedback data, or information regarding the condition to output the feedback data. For example, the output information may indicate that the first portion of the feedback data (for example, low-pitch band portion of data encoded in sound format) is to be output by the second electronic device 1300, and the first portion of the feedback data (for example, high-pitch band portion of data encoded in sound format) is to be output by the second electronic device 1300.

In operation 2250, the first electronic device 1200 may transmit the second portion of the received feedback data to the second electronic device 1300. Based on the output information, the first electronic device 1200 may transmit the second portion of the received feedback data to the second electronic device 1300. For example, if the received output information indicates that the second portion of the feedback data is to be output by the second electronic device 1300, the first electronic device 1200 may transmit the second portion of the feedback data to the second electronic device 1300.

In operation 2255, the first electronic device 1200 may output the first portion of the received feedback data. The first portion may correspond to the remaining portion of the received feedback data other than the second portion. The first portion may have the same format as that of the second portion, or may have a different format therefrom. For example, the first portion may be data encoded in the image format, and the second portion may be data encoded in the sound format. As another example, the first portion may be high-pitch sound band data encoded in the sound format, and the second portion may be low-pitch sound band data encoded in the sound format.

In an embodiment, the first electronic device 1200 may output a second portion so as to be identical to the output of a second portion by the second electronic device 1300. For example, the first electronic device 1200 may output a first portion at the same time as the time at which the second electronic device 1300 outputs a second portion. For example, if the first portion is low-pitch sound band data encoded in the sound format, and if the second portion is high-pitch sound band data encoded in the sound format, the first electronic device 1200 and the second electronic device 1300 may simultaneously output the first portion and the second portion, respectively, thereby playing stereo-type sound.

In operation 2260, the second electronic device 1300 may output the second portion of the feedback data received from the first electronic device 1200.

In an embodiment, operation 2255 and operation 2260 may be performed regardless of power transmission and reception. For example, operation 2225 may be performed at the same time that the first electronic device 1200 receives power from the second electronic device 1300. As another example, operation 2255 may be performed while the first electronic device 1200 receives no power from the second electronic device 1300.

It has been assumed in the above description with reference to FIG. 19 to FIG. 22 that the first electronic device 1200, the voice recognition function of which has been activated, recognizes a user voice speech, receives feedback data regarding a voice command from the server 1600, and transmits the second portion of the feedback data to the second electronic device 1300, the voice recognition function of which has been deactivated, but the opposite case is also possible. That is, it is also possible to assume that the second electronic device 1300, the voice recognition function of which has been activated, recognizes a user voice speech, receives feedback data regarding a voice command from the server 1600, and transmits the first portion of the feedback data to the first electronic device 1200, the voice recognition function of which has been deactivated.

Figure 23:
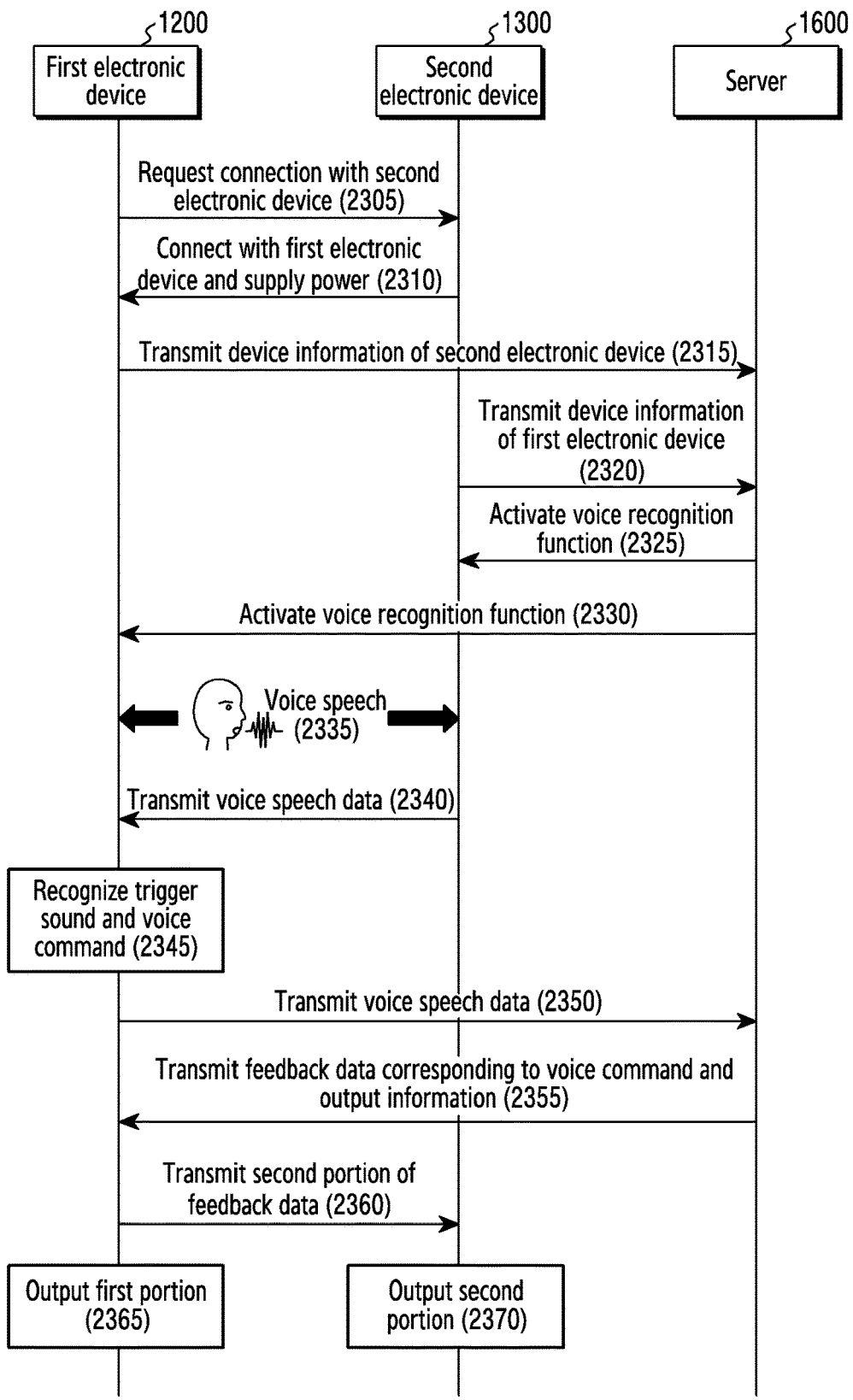
FIG. 23 is a mutual signal flowchart illustrating an operating order of a first electronic device, a second electronic device, and a server according to various embodiments of the disclosure.

FIG. 23 is a mutual signal flowchart illustrating an operating order of a first electronic device 1200, a second electronic device 1300, and a server 1600 according to various embodiments of the disclosure.

Operations 2305 to operation 2320 are similar to operation 2305 to operation 2320 in FIG. 22, and detailed descriptions thereof will be omitted herein.

In operation 2325 and operation 2330, the server 1600 may transmit a signal for controlling the voice recognition function of the first electronic device 1200 and the second electronic device 1300, in response to at least one of operation 2315 or operation 2320. In operation 2325, the server 1600 may transmit a signal for activating the voice recognition function of the second electronic device 1300 and, in operation 2330, may transmit a signal for activating the voice recognition function of the first electronic device 1200. The order of operation 2325 and operation 2330 may be switched.

In operation 2335, the first electronic device 1200 and the second electronic device 1300 may recognize the user's voice speech. Each of the first electronic device 1200 and the second electronic device 1300 may recognize the user's voice speech in a state in which the voice recognition function is activated, or in a state in which the same stands by to receive the user voice speech. The user's voice speech may include a trigger sound and a voice command. For example, the user's voice speech may be "Hi, Bixby, when is the Golden State Warriors game today?". The first electronic device 1200 and the second electronic device 1300 may convert a user voice speech input to activated microphones 1470 and 1570 into an electric signal.

In operation 2340, the second electronic device 1300 may transmit voice speech data to the first electronic device 1200. The voice speech data may be an electric signal corresponding to the user voice command, or an electric signal corresponding to the trigger sound and the user voice command.

In operation 2345, the first electronic device 1200 may recognize the trigger sound and the voice command included in the user voice speech. The first electronic device 1200 may recognize the trigger sound and the voice command based on the voice speech data received from the second electronic device 1300 in operation 2340. The first electronic device 1200 may cancel noise included in the user's voice speech recognized through the microphone 1270 of the first electronic device 1200 by using the voice speech data received from the second electronic device 1300. For example, the first electronic device 1200 may convert the user's voice speech recognized through the microphone 1270 of the first electronic device 1200 into an electric signal, and may apply a signal obtained by reversing the voice speech data received from the second electronic device 1300 thereto, thereby canceling noise included in the user's voice speech recognized through the microphone 1270 of the first electronic device 1200. By canceling the noise included the user's voice speech recognized through the microphone 1270 of the first electronic device 1200, the first electronic device 1200 may improve the ratio of recognition of the trigger sound and the sound command included in the user voice speech.

Although not illustrated, the second electronic device 1300 may transmit voice speech data to the server 1600 in operation 2340, and the first electronic device 1200 may transmit voice speech data to the server 1600. The server 1600 may cancel noise included in the voice speech data received from the first electronic device 1200 by using the voice speech data received from the second electronic device 1300. The server may transmit the noise-canceled voice speech data to the first electronic device 1200, and the first electronic device 1200 may recognize the trigger sound and the voice command by using the noise-canceled voice speech data. The server 1600 may recognize the trigger sound and the voice command from the noise-canceled voice speech data, and may transmit feedback data corresponding to the voice command and output information to the first electronic device 1200.

Operation 2350 to operation 2370 are similar to operation 2240 to operation 2260 in FIG. 22, and detailed descriptions thereof will be omitted herein.

Figure 24:
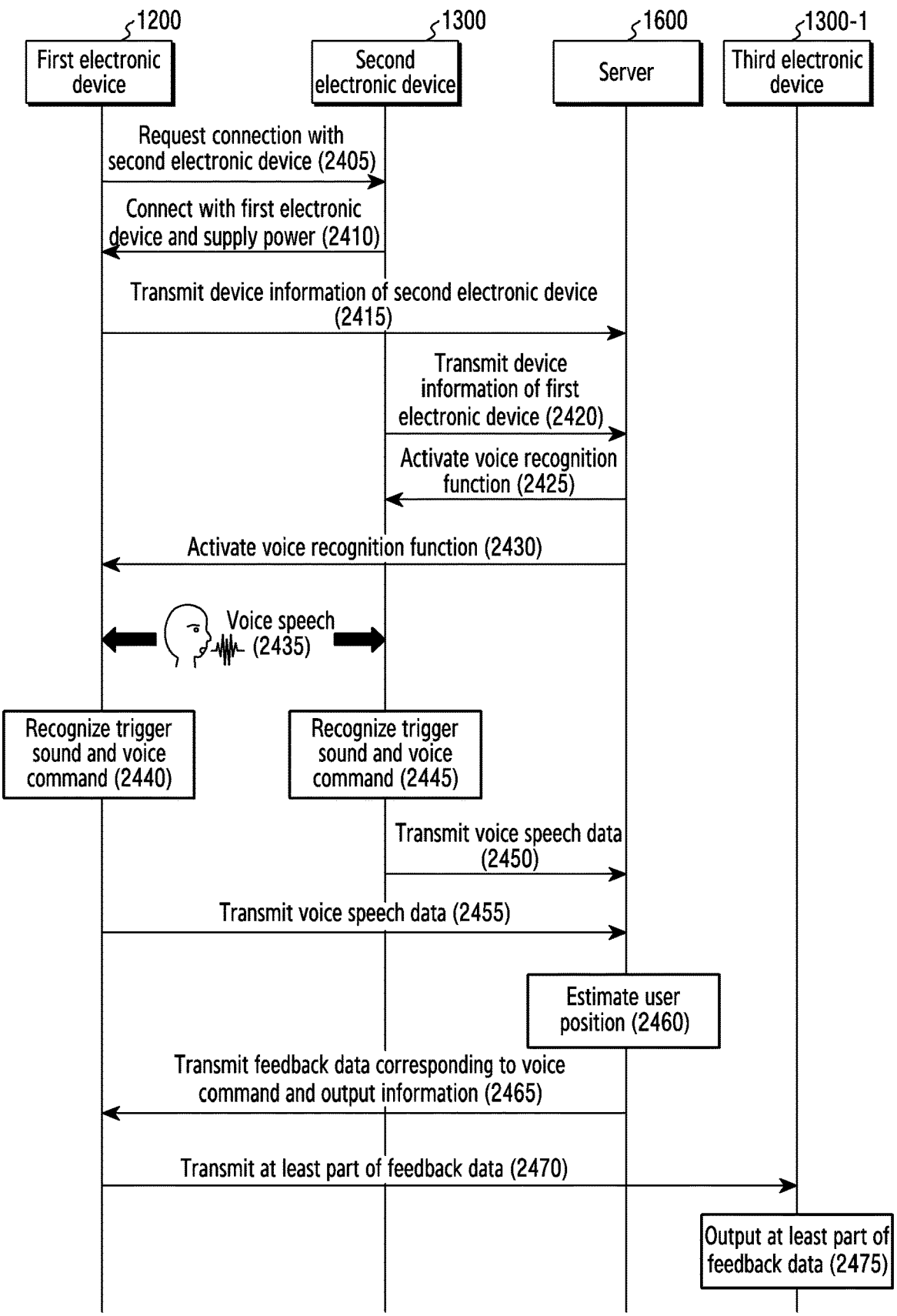
FIG. 24 is a mutual signal flowchart illustrating an operating order of a first electronic device, a second electronic device, and a server according to various embodiments of the disclosure.

FIG. 24 is a mutual signal flowchart illustrating an operating order of a first electronic device 1200, a second electronic device 1300, and a server 1600 according to various embodiments of the disclosure.

Operation 2405 to operation 2435 are similar to operation 2305 to operation 2335 in FIG. 23, and detailed descriptions thereof will be omitted herein.

In operation 2440, the first electronic device 1200 may recognize the trigger sound and the voice command included in the user voice speech. In operation 2445, the second electronic device 1300 may recognize the trigger sound and the voice command included in the user voice speech. For example, the first electronic device 1200 may use the activated microphone 1270 so as to convert a sound input to the microphone 1270 into an electric signal, and may identify, from the converted electric signal, a first signal exhibiting a matching ratio equal to or higher than a predetermined value with a prestored signal pattern, thereby recognizing the trigger sound. In addition, the first electronic device 1200 may determine a signal, which follows the first signal, as a second signal until output equal to or lower than a predetermine value continues for a period of time equal to or longer than a predetermined value, thereby recognizing the voice command.

In operation 2450, the second electronic device 1300 may transmit the voice speech data recognized in operation 2445 to the server 1600. In operation 2455, the first electronic device 1200 may transmit the voice speech data recognized in operation 2440 to the server 1600.

In operation 2460, the server 1600 may estimate the user's (or speaker's) position and/or movement information. Detailed operations of operation 2460 will be described below with reference to FIG. 25.

Figure 25:
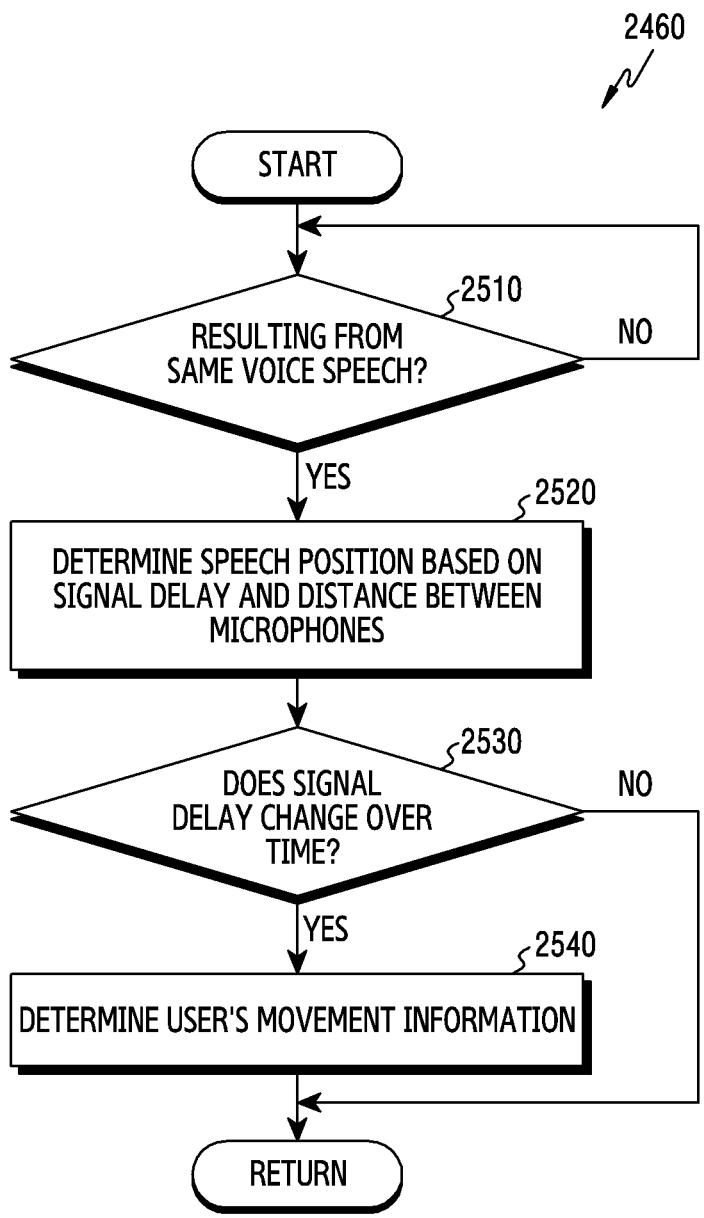
FIG. 25 is a detailed flowchart of operations of a server according to various embodiments of the disclosure estimating a user position.

FIG. 25 is a detailed flowchart of operations of a server according to various embodiments of the disclosure estimating a user position.

The subject of operation in FIG. 25 (server) may refer to the server 1600 or the processor 1620 of the server 1600.

Referring to FIG. 25, in operation 2510, the server 1600 may determine whether or not voice speech data received from the first electronic device 1200 (hereinafter, referred to as first voice speech data) and voice speech data received from the second electronic device 1300 (hereinafter, referred to as second voice speech data) are pieces of data resulting from the same voice speech.

In an embodiment, the server 1600 may compare the time at which the first voice speech data is received with the time at which the second voice speech data is received. For example, if the difference between the time at which the first voice speech data is received and the time at which the second voice speech data is received does not exceed a reference value, the server 1600 may determine that the same are pieces of data resulting from the same voice speech.

In another embodiment, the server 1600 may compare the first voice speech data and the second voice speech data in terms of signal characteristics (for example, characteristics of the waveform, shape and form of the signal, size of the amplitude, characteristics regarding the frequency, and the like). For example, if it is confirmed that the first voice speech data includes waveform A, and that the second voice speech data includes waveform B having a matching ratio equal to or higher than a reference value with waveform A, the server 1600 may determine that the first voice speech data and the second voice speech data are pieces of data resulting from the same voice speech.

When it is determined that the first voice speech data and the second voice speech data are pieces of data resulting from the same voice speech (Yes), the server 1600 may determine the user's speech position based on the signal delay and the distance between the microphones in operation 2520.

In an embodiment, the server 1600 may estimate the distance between the microphones by using device information of the first electronic device 1200 and device information of the second electronic device 1300 stored in the memory. For example, the server 1600 may determine the position of the microphone 1370 of the second electronic device 1300 by using identification information of the second electronic device 1300 and hardware information thereof, and may determine the position of the microphone 1270 of the first electronic device 1200 by using identification information of the first electronic device 1200 and hardware information thereof. The server 1600 may estimate the distance between the microphones by using the determined positions of the microphones.

In an embodiment, the server 1600 may estimate the distance between the microphones in view of the wireless charging scheme (inductive coupling scheme) of the second electronic device 1300. For example, if the second electronic device 1300 is an inductive coupling-type power supply device, the server 1600 may estimate the distance between the microphones in view of the fact that a power receiving device (for example, first electronic device 1200) may need to be placed above the charging pad of the second electronic device 1300. As another example, if the second electronic device 1300 is a resonant magnetic coupling-type power supply device, the server 1600 may estimate the distance between the microphones by using the power transmission efficiency.

In an embodiment, the server 1600 may identify the signal delay of the first voice speech data and the second voice speech data. The server 1600 may identify the delay of a signal (for example, waveform A and waveform B) commonly included in the first voice speech data and the second voice speech data.

In an embodiment, the server 1600 may determine the user's speech position based on the identified signal delay and the distance between the microphones. For example, the server 1600 may determine the user's speech position by using the time delay of arrival (TDOA) technique.

When it is determined that the first voice speech data and the second voice speech data are not pieces of data resulting from the same voice speech, the server 1600 may perform operation 2510 again. In other words, the server 1600 may perform operation 2510 repeatedly until first voice speech data and second voice speech data resulting from the same voice speech are received.

In operation 2530, the server 1600 may determine whether or not the signal delay changes over time. For example, the server 1600 may confirm whether or not a value indicating the delay of a signal (for example, waveform A and waveform B) commonly included in the first voice speech data and the second voice speech data is maintained or changed over the lapse of time.

If it is confirmed that the signal delay does not change over time (No), the server 1600 may confirm that the user is not moving.

If it is confirmed that the signal delay changes over time (Yes), the server 1600 may confirm that the user is moving. The server 1600 may determine the user's movement information in operation 2740. The server 1600 may determine the user's movement information (for example, direction of movement, speed, and the like) based on the value of change of the signal delay over time.

In operation 2465, the server 1600 may transmit feedback data corresponding to the voice command and output information to the first electronic device 1200.

In an embodiment, the server 1600 may determine output information by using the user's position and/or user's movement information estimated in operation 2460, and may transmit the determined output information to the first electronic device 1200. For example, the server 1600 may determine output information indicating that a third electronic device 1300-1 adjacent to the user's movement direction will output at least a part (second portion) of the feedback data, and may transmit the determined output information to the first electronic device 1200. As another example, the server 1600 may determine output information indicating that the first electronic device 1200 will output the entire feedback data from the present time to three seconds, and the third electronic device 1300-1 will output the entire feedback data after three seconds, and may transmit the determined output information to the first electronic device 1200.

In operation 2470, the first electronic device 1200 may transmit at least a part (second portion) of the feedback data to the third electronic device 1300-1. Although not illustrated, the server 1600 may directly transmit at least a part of the feedback data to the third electronic device 1300-1.

In operation 2475, the third electronic device 1300-1 may output at least a part of the feedback data. In an embodiment, the third electronic device 1300-1 may output at least a part of the received feedback data according to the output format of at least a part of the received feedback data.

In an embodiment, the third electronic device 1300-1 may be the electronic device 901 in FIG. 9.

Figure 26:
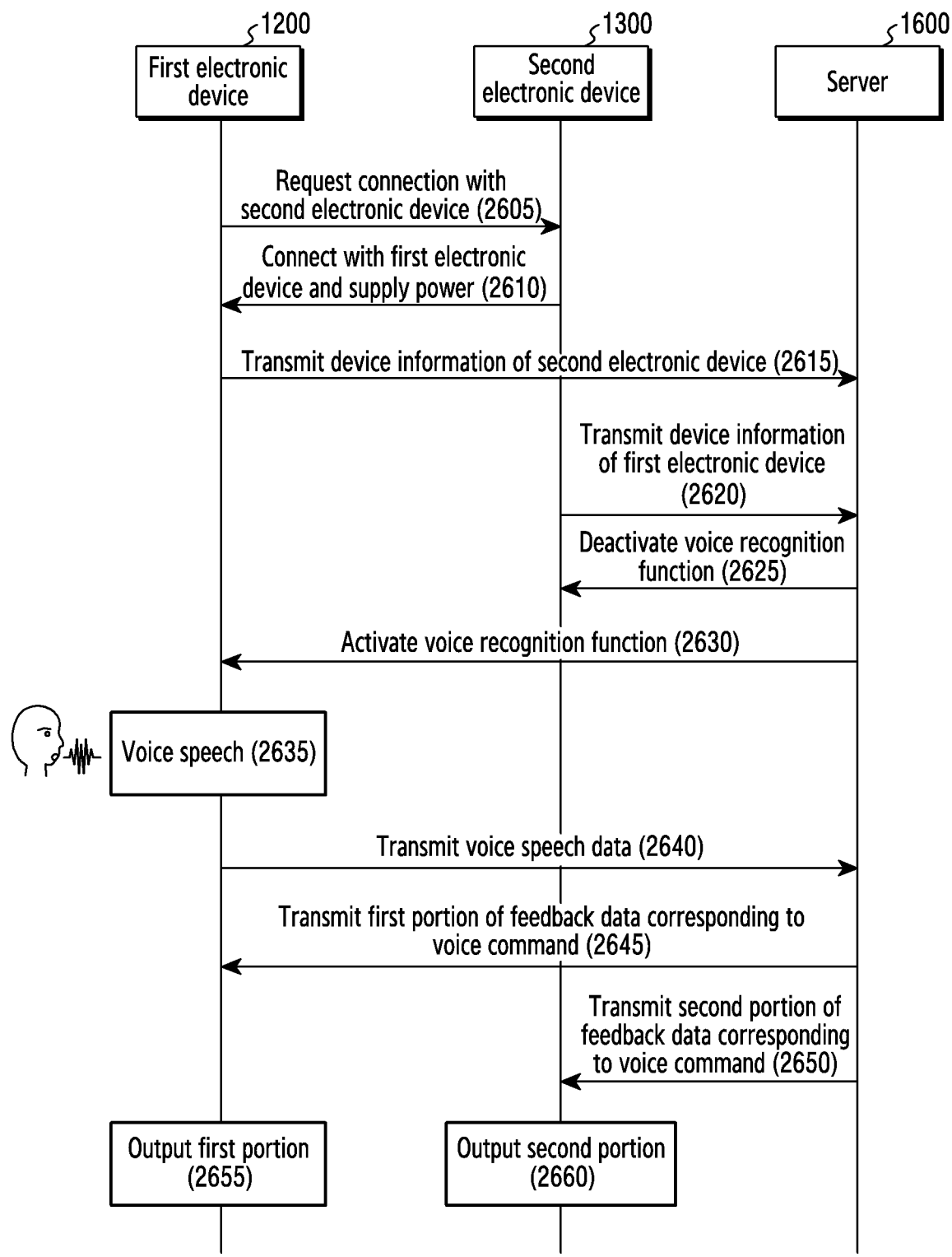
FIG. 26 is a mutual signal flowchart illustrating an operating order of a first electronic device, a second electronic device, and a server according to various embodiments of the disclosure.

FIG. 26 is a mutual signal flowchart illustrating an operating order of a first electronic device 1200, a second electronic device 1300, and a server according to various embodiments of the disclosure.

Operation 2605 to operation 2640 are similar to operation 2205 to 2240 in FIG. 22, and detailed descriptions thereof will be omitted herein.

In operation 2645, the server 1600 may transmit the first portion of feedback data regarding the voice command to the first electronic device 1200. The first portion of the feedback data may have a different output format from that of the remaining portion (second portion) of the feedback data. The first portion of the feedback data may have the same output format as that of the remaining portion (second portion) of the feedback data, but may correspond to a different piece of data.

In operation 2650, the server 1600 may transmit the second portion of feedback data regarding the voice command to the second electronic device 1300. For example, the server 1600 may transmit the second portion, which is encoded in the sound output format, to the second electronic device 1300. As another example, the server 1600 may transmit the low-pitch sound band portion among data encoded in the sound output format to the second electronic device 1300.

In an embodiment, the server 1600 may transmit a signal (for example, flag) indicating that the currently transmitted data corresponds to a part of the entire feedback data, or that the remaining portion thereof is output by another device. For example, the server 1600 may additionally transmit, to the first electronic device 1200, a signal indicating that the second portion of the feedback data is output by the second electronic device 1300, in operation 2645. As another example, the server 1600 may additionally transmit, to the second first electronic device 1300, a signal indicating that the first portion of the feedback data is output by the first electronic device 1200 in operation 2650.

Operation 2655 and operation 2660 are similar to operation 2255 and operation 2260 in FIG. 22, and detailed descriptions thereof will be omitted herein.

Embodiments disclosed in the specification and the drawings are presented only to easily describe the content of the disclosure and to help understanding thereof, and are not for limiting the scope of the disclosure. Accordingly, the scope of the disclosure is to be interpreted as including not only the embodiments disclosed herein, but also all modifications or modified forms that can be derived based on the technical idea of the disclosure.

The invention claimed is:

1. An electronic device comprising:
a housing;
a display exposed through a part of the housing;
a speaker;
a microphone;
a wireless charging circuit;
a wireless communication circuit;
a battery;
a processor operatively connected to the display, the speaker, the microphone, the wireless charging circuit, the wireless communication circuit, and the battery; and
a memory operatively connected to the processor, wherein the memory is configured to store instructions which, when executed, cause the processor to:
control the wireless charging circuit so as to charge the battery with power received from an external wireless charger;
transmit identification information of the external wireless charger received from the external wireless charger to an external server, while charging the battery;
determine whether to activate a voice recognition function based on a control command received from the external server, while charging the battery;
in response to activating the voice recognition function, recognize a voice speech of a user comprising a trigger voice and a voice command by using the microphone;
transmit voice speech data of the user to the external server;
receive response data regarding the voice command and output information of the response data from the external server; and
transmit at least a part of the response data, based on the output information, to the external wireless charger so as to be output by the external wireless charger.

2. The electronic device as claimed in claim 1, wherein the memory is configured to further store instructions which cause the processor to:
output a first portion of the received response data, based on the received output information, by using the speaker and/or the display; and
transmit a second portion of the received response data, based on the received output information, to the external wireless charger by using the wireless communication circuit.

3. The electronic device as claimed in claim 2, wherein the received response data comprises sound data and image data, the first portion is one of the sound data and the image data, and the second portion is the other of the sound data and the image data.

4. The electronic device as claimed in claim 2, wherein the received response data comprises sound data, the first portion is data regarding a first sound range of the sound data, and the second portion is data regarding a second sound range of the sound data.

5. The electronic device as claimed in claim 1, wherein the memory is configured to further store instructions which cause the processor to:
recognize the voice speech of the user by using sound data recognized by using the microphone and voice data received from the external wireless charger.

6. The electronic device as claimed in claim 1, wherein the memory is configured to further store instructions which cause the processor to:
output a first portion of the received response data, based on the received output information, by using the speaker and/or the display; and
transmit a second portion of the received response data, based on the received output information, to a different device other than the electronic device and the external wireless charger by using the wireless communication circuit, and
wherein the different device is a device related to a user position estimated by the external server.

7. A wireless charger comprising:
a housing;
a speaker;
a microphone;
a wireless charging circuit;
a wireless communication circuit;
a processor operatively connected to the speaker, the microphone, the wireless charging circuit, and the wireless communication circuit; and
a memory operatively connected to the processor, wherein the memory is configured to store instructions which, when executed, cause the processor to:
receive, from a mobile device comprising a display, identification information of the mobile device through the wireless charging circuit;
control the wireless charging circuit so as to charge the mobile device wirelessly;
transmit the identification information of the mobile device received from the mobile device to an external server, while charging the mobile device;
determine whether to activate a voice recognition function based on a control command received from the external server, while charging the mobile device;
in response to activating the voice recognition function, recognize a voice speech of a user comprising a trigger voice and a voice command by using the microphone;
transmit voice speech data of the user to the mobile device; and
based on response data regarding the voice command received from the mobile device, output at least a portion of the response data.

8. A method for operating an electronic device, the method comprising:
charging a battery of the electronic device with power received from an external wireless charger;
transmitting identification information of the external wireless charger received from the external wireless charger to an external server, while charging the battery;
determining whether to activate a voice recognition function based on a control command received from the external server, while charging the battery;
in response to activating the voice recognition function, recognizing a voice speech of a user comprising a trigger voice and a voice command by using a microphone of the electronic device;
transmitting voice speech data of the user to the external server;
receiving response data regarding the voice command and output information of the response data from the external server; and
transmitting at least a part of the response data, based on the output information, to the external wireless charger so as to be output by the external wireless charger.

9. The method as claimed in claim 8, wherein the transmitting at least a part of the received response data to the external wireless charger comprises:
outputting a first portion of the received response data, based on the received output information, by using a speaker and/or a display; and
transmitting a second portion of the received response data, based on the received output information, to the external wireless charger.

10. The method as claimed in claim 9, wherein the received response data comprises sound data and image data, the first portion is one of the sound data and the image data, and the second portion is the other of the sound data and the image data.

11. The method as claimed in claim 9, wherein the received response data comprises sound data, the first portion is data regarding a first sound range of the sound data, and the second portion is data regarding a second sound range of the sound data.

12. The method as claimed in claim 8, wherein the recognizing the voice speech of the user comprising the trigger voice and the voice command by using the microphone of the electronic device comprises recognizing the voice speech of the user by using sound data recognized by using the microphone and voice data received from the external wireless charger.

13. The method as claimed in claim 8, wherein the outputting at least a part of the received response data by using a speaker and/or a display of the electronic device comprises:
outputting a first portion of the received response data, based on the received output information, by using the speaker and/or the display; and
transmitting a second portion of the received response data, based on the received output information, to a different device other than the electronic device and the external wireless charger, and
wherein the different device is a device related to a user position estimated by the external server.

14. A method for operating a wireless charger, the method comprising:
receiving, from a mobile device comprising a display, identification information of the mobile device;
charging the mobile device wirelessly;
transmitting the identification information of the mobile device to an external server, while charging the mobile device;
determining whether to activate a voice recognition function based on a control command received from the external server, while charging the mobile device;
in response to activating the voice recognition function, recognizing a voice speech of a user comprising a trigger voice and a voice command;
transmitting voice speech data of the user to the mobile device; and based on response data regarding the voice command received from the mobile device, outputting at least a portion of the response data.

\* \* \* \* \*